United States Patent
Ota et al.

(10) Patent No.: US 8,730,587 B2
(45) Date of Patent: May 20, 2014

(54) ZOOM LENS AND IMAGE PICKUP APPARATUS USING THE SAME

(75) Inventors: Ryu Ota, Tokyo (JP); Shinichi Mihara, Tama (JP)

(73) Assignee: Olympus Corporation, Tokyo (JP)

( * ) Notice: Subject to any disclaimer, the term of this patent is extended or adjusted under 35 U.S.C. 154(b) by 151 days.

(21) Appl. No.: 13/488,579

(22) Filed: Jun. 5, 2012

(65) Prior Publication Data

US 2012/0314298 A1 Dec. 13, 2012

(30) Foreign Application Priority Data

| Jun. 8, 2011 | (JP) | 2011-128533 |
| Jun. 8, 2011 | (JP) | 2011-128543 |
| Jun. 8, 2011 | (JP) | 2011-128552 |
| Jun. 8, 2011 | (JP) | 2011-128573 |

(51) Int. Cl.
*G02B 15/14* (2006.01)
(52) U.S. Cl.
USPC .......................... 359/683; 359/684; 359/714
(58) Field of Classification Search
USPC ......... 359/676, 683, 684, 687, 695, 714, 708, 359/715
See application file for complete search history.

(56) References Cited

FOREIGN PATENT DOCUMENTS

| JP | 62-178917 A | 8/1987 | |
| JP | 63-029718 A | 2/1988 | |
| JP | 63-123009 A | 5/1988 | |
| JP | 03-154014 A | 7/1991 | |
| JP | 05-264902 A | 10/1993 | |
| JP | 05264902 A | * 10/1993 | ........... G02B 15/167 |
| JP | 06-027375 A | 2/1994 | |
| JP | 07-151967 A | 6/1995 | |

\* cited by examiner

*Primary Examiner* — James Greece
*Assistant Examiner* — Sharrief Broome
(74) *Attorney, Agent, or Firm* — Brosemer, Kolefas & Assoc., LLC

(57) ABSTRACT

A zoom lens includes in order from an object side, a first lens group having a positive refractive power, a second lens group having a negative refractive power, a third lens group having a positive refractive power, a fourth lens group having a positive refractive, and a last lens group having a positive refractive index, and at the time of zooming from the wide angle end to the telephoto end, the first lens group is fixed, the second lens group moves toward a side of an image plane, the third lens group is fixed, and the fourth lens group moves, and at the time of focusing, the fourth lens group moves. The zoom lens satisfies the following conditional expression (101)

$$0.20 < \log(\beta 34T/\beta 34W) < 0.9 \cdot \log \gamma \quad (101).$$

72 Claims, 17 Drawing Sheets

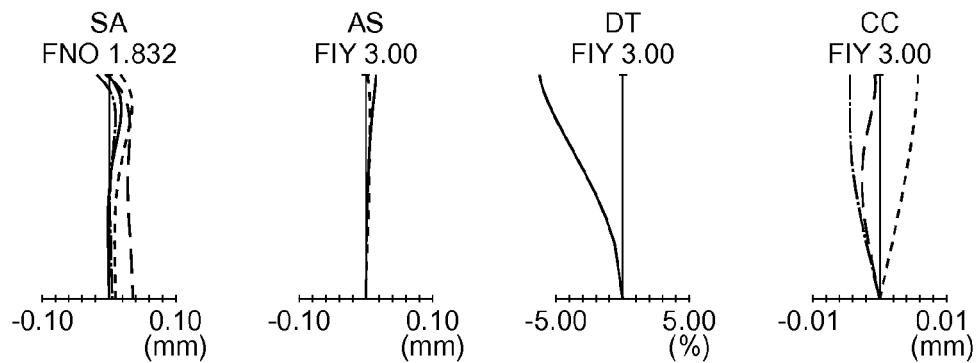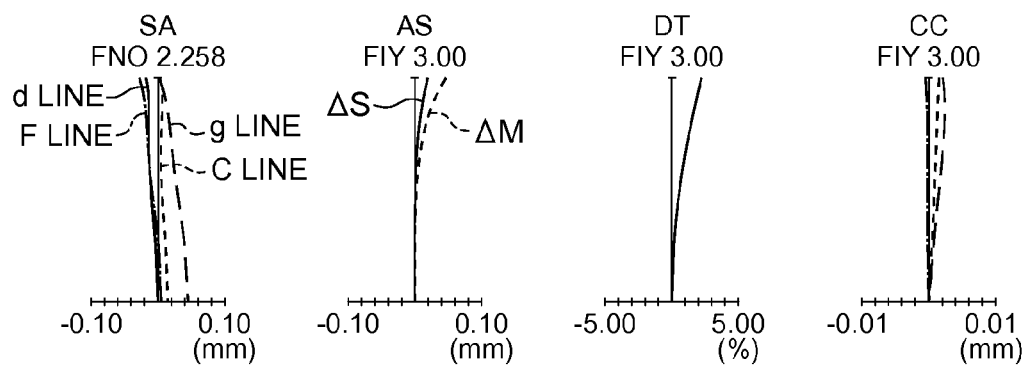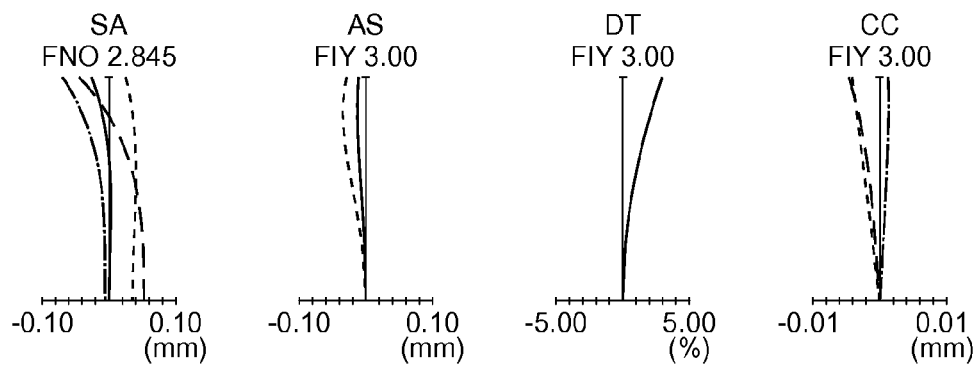

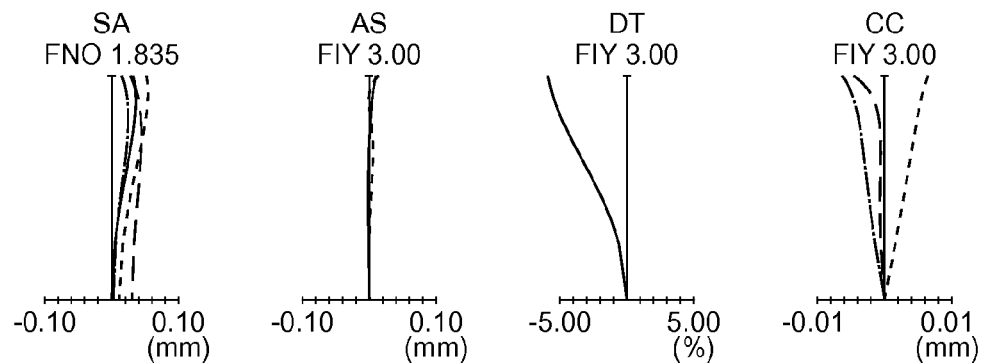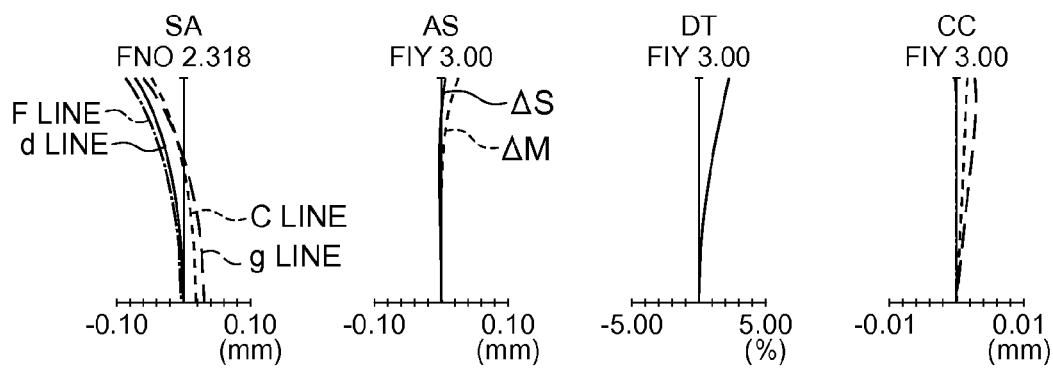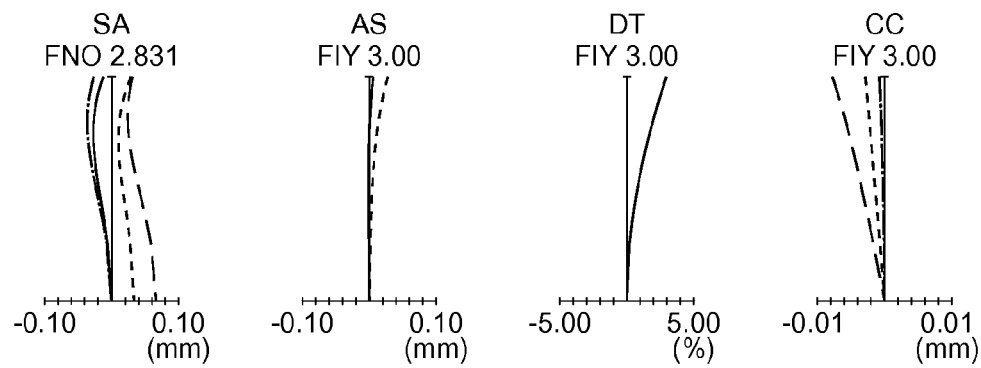

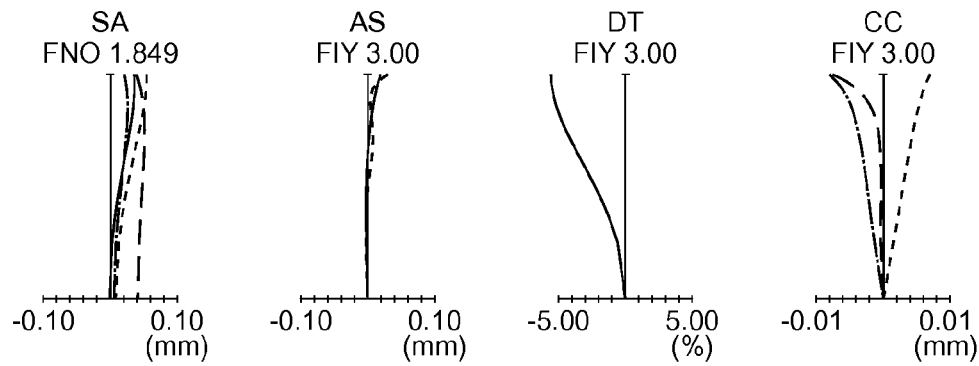
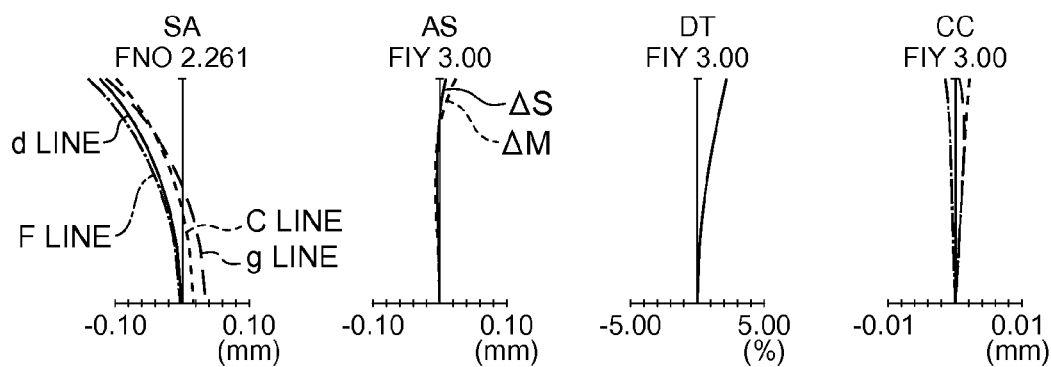
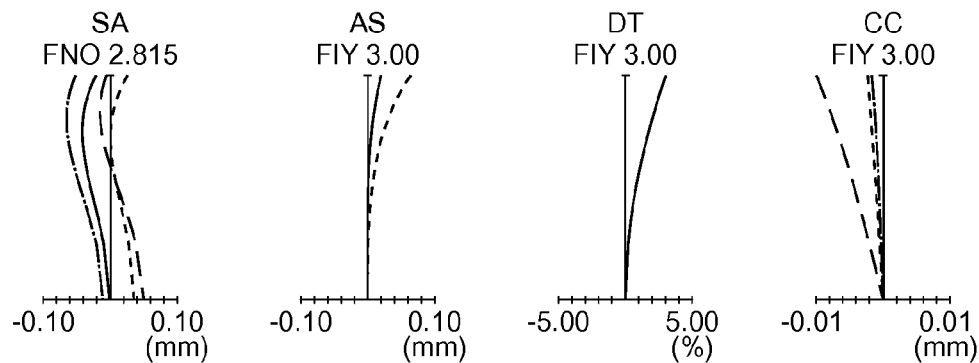

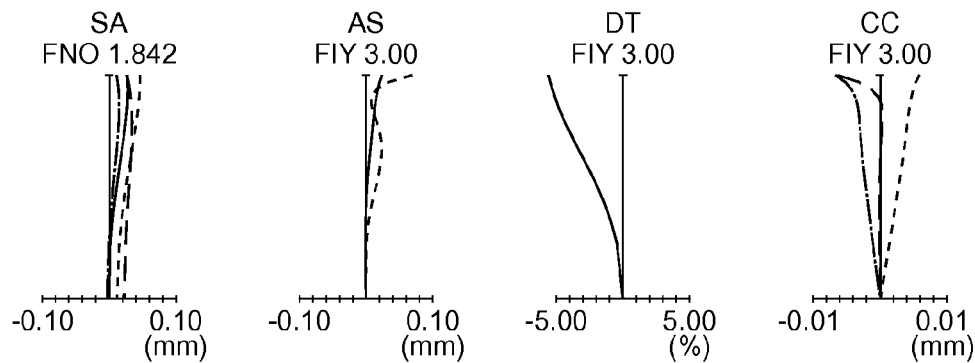
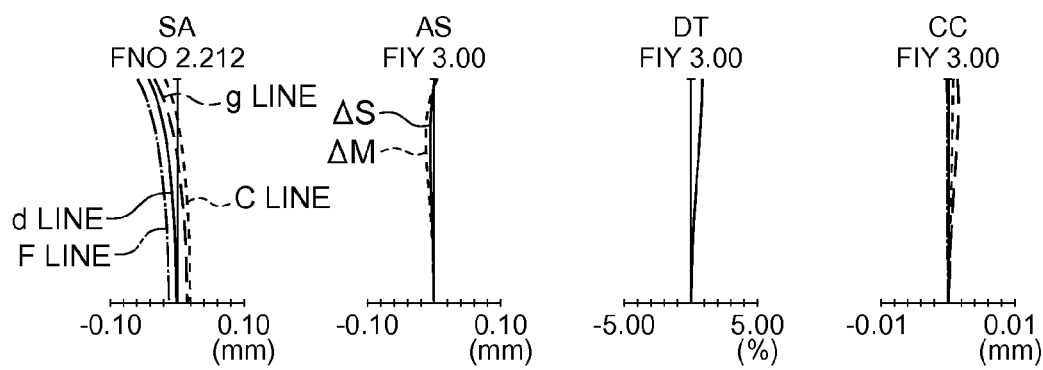
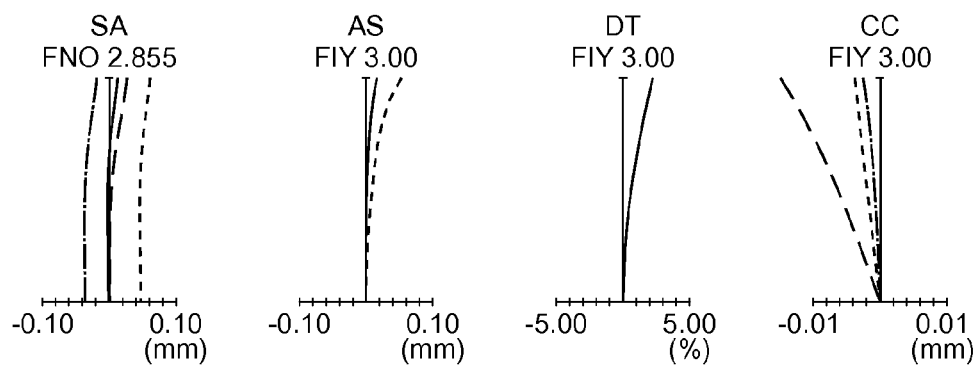

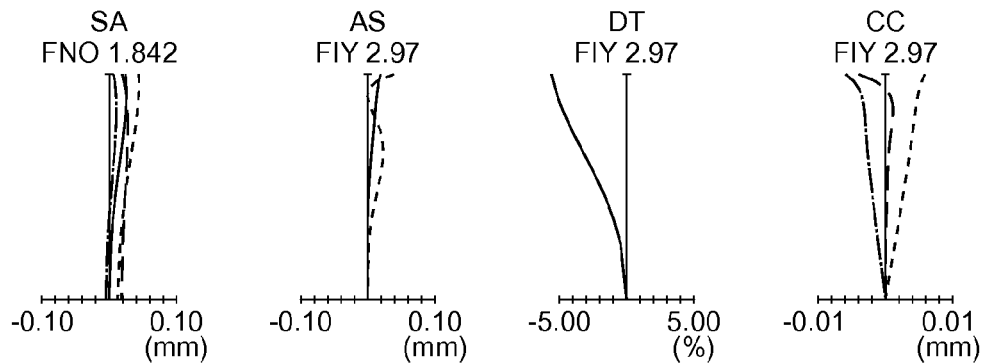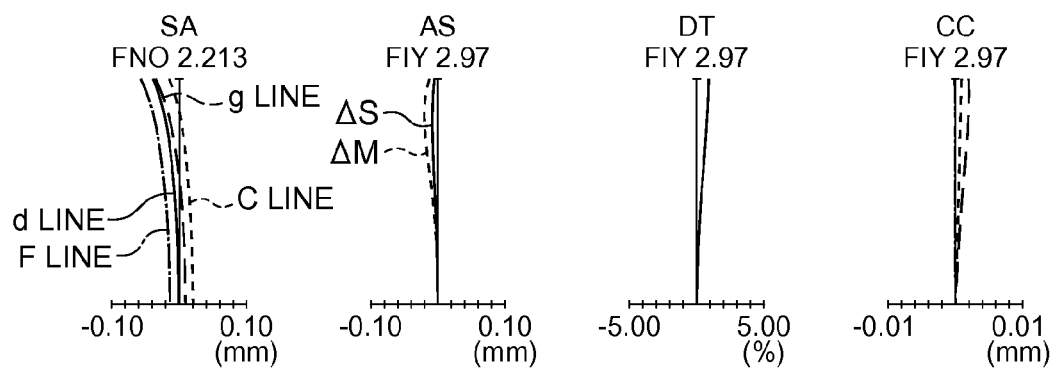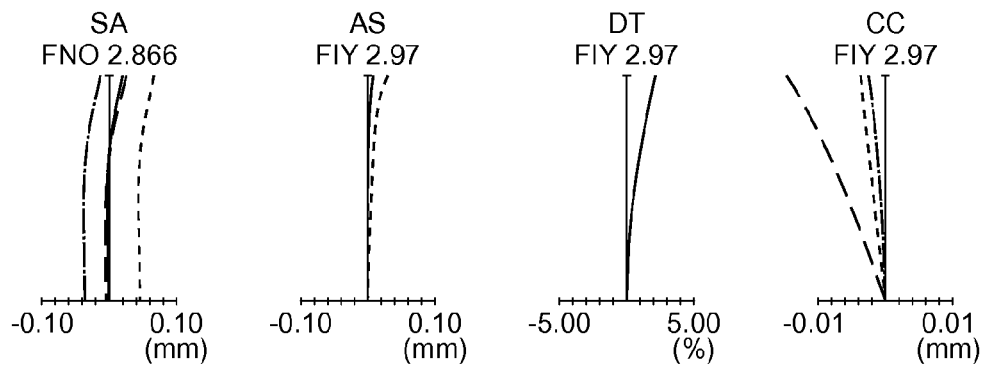

ZOOM LENS AND IMAGE PICKUP APPARATUS USING THE SAME

CROSS-REFERENCE TO RELATED APPLICATION

The present application is based upon and claims the benefit of priority from the prior Japanese Patent Application No. 2011-128543 filed on Jun. 8, 2011, No. 2011-128533 filed on Jun. 8, 2011, No. 2011-128552 filed on Jun. 8, 2011 and No. 2011-128573 filed on Jun. 8, 2011; the entire contents of which are incorporated herein by reference.

BACKGROUND OF THE INVENTION

1. Field of the Invention

The present invention relates to a zoom lens and an image pickup apparatus using the same.

2. Description of the Related Art

In video photography, capturing is carried out while zooming and focusing all the time. Zooming and focusing are carried out all the time means that lens groups of an optical system move all the time. As a lens group moves, a sliding sound is generated with the movement of the lens group. When the sliding sound is high, the sliding sound is recorded as a noise. Therefore, a zoom lens in which the number of lens groups which move is made smaller has been proposed.

As an example of the zoom lens in which, the number of lens groups is made smaller, a zoom lens which includes in order from an object side, a first lens group having a positive refractive power, a second lens group having a negative refractive power, a third lens group having a positive refractive power, and a fourth lens group having a positive refractive power, and in which, at the time of zooming, the first lens group is fixed, the second lens group moves to a side of an image plane, the third lens group is fixed, and the fourth lens group is moved, and the focusing is carried out by moving the fourth lens group has been proposed (Patent literature 1 to Patent literature 3).

Furthermore, a zoom lens in which a fifth lens group (fixed group) having a positive refractive power is added on an image side of the fourth lens group has been proposed (Patent literature 4 to Patent literature 7).

[Patent literature 1] Japanese Patent Application Laid-open Publication No. Sho. 62-178917
[Patent literature 2] Japanese Patent Application Laid-open Publication No. Sho. 63-29718
[Patent literature 3] Japanese Patent Application Laid-open Publication No. Sho. 63-123009
[Patent literature 4] Japanese Patent Application Laid-open Publication No. Hei. 3-154014
[Patent literature 5] Japanese Patent Application Laid-open publication No. Hei 5-264902
[Patent literature 6] Japanese Patent Application Laid-open Publication No. Hei 6-27375
[Patent literature 7] Japanese Patent Application Laid-open Publication No. Hei 7-151967

SUMMARY OF THE INVENTION

A zoom lens according to the present invention includes in order from an object side a first lens group having a positive refractive power, a second lens group having a negative refractive power, a third lens group having a positive refractive power, a fourth lens group having a positive refractive power, and a last lens group having a positive refractive power, and at the time of zooming from a wide angle end to a telephoto end, the first lens group is fixed, the second lens group moves, the third lens group is fixed, and the fourth lens group moves, and at the time of focusing the fourth lens group moves, and the zoom lens satisfies the following conditional expression (101).

$$0.20 < \log(\beta 34T/\beta 34W) < 0.9 \cdot \log \gamma \quad (101)$$

where,
$\beta 34W$ denotes a magnification of a combined system of the third lens group and the fourth lens group at the wide angle end,
$\beta 34T$ denotes a magnification of the combined system of the third lens group and the fourth lens group at the telephoto end,
fW denotes a focal length of the overall zoom lens system at the wide angle end,
fT denotes a focal length of the overall zoom lens system at the telephoto end, and
$\gamma = fT/fW > 7$, and
each of the magnification or the focal length is a magnification or a focal length at the time of infinite object point focusing.

Moreover, a zoom lens according to the present invention includes in order from an object side, a first lens group having a positive refractive power, a second lens group having a negative refractive power, a third lens group having a positive refractive power, a fourth lens group having a positive refractive power, and a last lens group having a positive refractive power, and at the time of zooming from a wide angle end to a telephoto end, the first lens group is fixed, the second lens group moves toward a side of an image plane, the third lens group is fixed, and the fourth lens group moves, and at the time of focusing, the fourth lens group moves, and the zoom lens satisfies the following conditional expressions (201) and (202).

$$0.35 < (\beta 34T/(\beta 34W)/(\beta 2T/\beta 2W) < 1.2 \quad (201)$$

$$3.0 < \beta 2T/\beta 2W < fT/fW \quad (202)$$

where,
$\beta 2W$ denotes a magnification of the second lens group at the wide angle end;
$\beta 2T$ denotes a magnification of the second lens group at the telephoto end,
$\beta 34W$ denotes a magnification of a combined system of the third lens group and the fourth lens group at the wide angle end,
$\beta 34T$ denotes a magnification of the combined system of the third lens group and the fourth lens group at the telephoto end,
fW denotes a focal length of the overall zoom lens system at the wide angle end,
fT denotes a focal length of the overall zoom lens system at the telephoto end,
fT/fW > 7, and
each of the magnification or the focal length is a magnification or a focal length at the time of infinite object point focusing.

Moreover, a zoom lens according the present invention includes in order from an object side, a first lens group having a positive refractive power, a second lens group having a negative refractive power, a third lens group having a positive refractive power, a fourth lens group having a positive refractive power, and a last lens group having a positive refractive power, and at the time of zooming from a wide angle end to a telephoto end, the first lens group is fixed, the second lens group moves toward a side of an image plane, the third lens group is fixed, and the fourth lens group moves, and at the time of focusing, the fourth lens group moves, and the second lens group includes in order from the object side, an object-side negative lens of which, a surface on an image side has a sharp curvature, a lens having a refractive power weaker than the refractive power of the overall second lens group, and a cemented lens of a negative lens and a positive lens, and the zoom lens satisfies the following conditional expression (301)

$$0.07<|f2|/fT<0.35 \quad (301)$$

where, f2 denotes a focal length of the second lens group, and fT denotes a focal length of the overall zoom lens system at the telephoto end, and is a focal length at the time of infinite object point focusing.

A zoom lens according to the present invention includes in order from an object side, a first lens group having a positive refractive power, a second lens group having a negative refractive power, a third lens group having a positive refractive power, a fourth lens group having a positive refractive power, and a last lens group having a positive refractive power, and at the time of zooming from a wide angle end to a telephoto end, the first lens group is fixed, the second lens group moves toward a side of an image plane, the third lens group is fixed, the fourth lens group moves, and at the time of focusing, the fourth lens group moves, and the fourth lens group includes in order from the object side, a lens component having a positive refractive power and a lens component having a negative refractive power, and the zoom lens satisfies the following conditional expression (401).

$$-0.3<(R42F-R42R)/(R42F+R42R)<0.6 \quad (401)$$

where,

R42F denotes a paraxial radius of curvature of a surface nearest to the object side of the lens component having a negative refractive power in the fourth lens group, R42R denotes a paraxial radius of curvature of a surface nearest to an image side of the lens component having a negative refractive power in the fourth lens group, and each of the lens components is one of a single lens and a cemented lens, and has two optical surfaces which are in contact with air.

Moreover, an image pickup apparatus according to the present invention includes the zoom lens described above, and an image pickup element which is disposed at an image plane of the zoom lens.

BRIEF DESCRIPTION OF THE DRAWINGS

FIG. 1A is a cross-sectional view at a wide angle end, FIG. 1B is a cross-sectional view in an intermediate state, and FIG. 1C is a cross-sectional view at a telephoto end;

FIG. 2A, FIG. 2B, FIG. 2C, FIG. 2D, FIG. 2E, FIG. 2F, FIG. 2G, FIG. 2H, FIG. 2I, FIG. 2J, FIG. 2K, and FIG. 2L are aberration diagrams at the time of infinite object point focusing of the first embodiment;

FIG. 3A is a cross-sectional view at a wide angle end, FIG. 3B is a cross-sectional view in an intermediate state, and FIG. 3C is a cross-sectional view at a telephoto end;

FIG. 4A, FIG. 4B, FIG. 4C, FIG. 4D, FIG. 4E, FIG. 4F, FIG. 4G, FIG. 4H, FIG. 4I, FIG. 4J, FIG. 4K, and FIG. 4L are aberration diagrams at the time of infinite object point focusing of the second embodiment;

FIG. 5A is a cross-sectional view at a wide angle end, FIG. 5B is a cross-sectional view in an intermediate state, and FIG. 5C is a cross-sectional view at a telephoto end;

FIG. 6A, FIG. 6B, FIG. 6C, FIG. 6D, FIG. 6E, FIG. 6F, FIG. 6G, FIG. 6H, FIG. 6I, FIG. 6J, FIG. 6K, and FIG. 6L are aberration diagrams at the time of infinite object point focusing of the third embodiment;

FIG. 7A is a cross-sectional view at a wide angle end, FIG. 7B is a cross-sectional view in an intermediate state, and FIG. 7C is a cross-sectional view at a telephoto end;

FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L are aberration diagrams at the time of infinite object point focusing of the fourth embodiment;

FIG. 9A is a cross-sectional view at a wide angle end, FIG. 9B is a cross-sectional view in an intermediate state, and FIG. 9C is a cross-sectional view at a telephoto end;

FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L are aberration diagrams at the time of infinite object point focusing of the fifth embodiment;

FIG. 17A is a front view of a mobile telephone 400, FIG. 17B is a side view of the mobile telephone 400, and FIG. 17C is a cross-sectional view of a photographic optical system 405.

DETAILED DESCRIPTION OF THE PREFERRED EMBODIMENTS

Figure 1A:
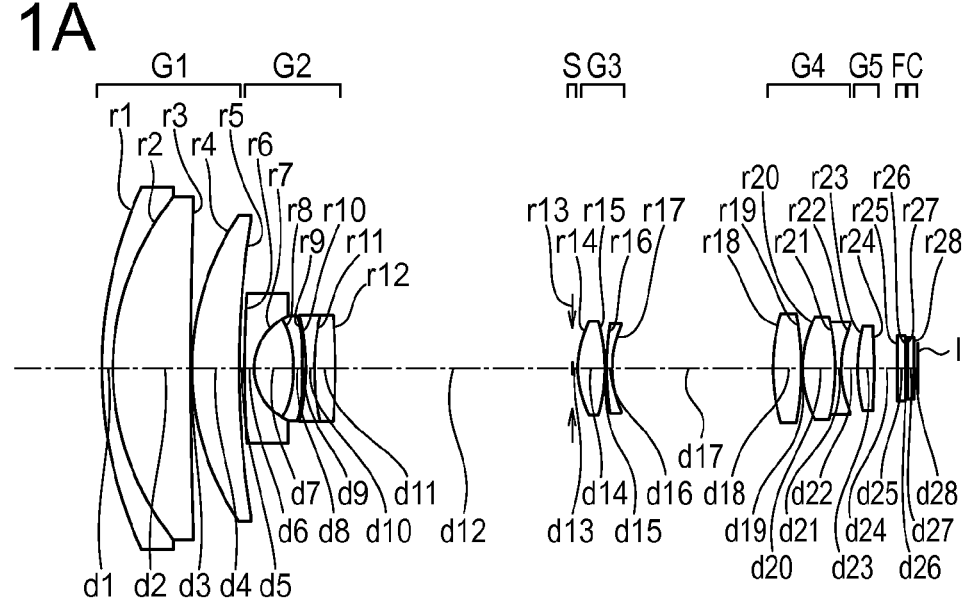
FIG. 1A, FIG. 1B, and FIG. 1C are cross-sectional views along an optical axis showing an optical arrangement at the time of infinite object point focusing of a zoom lens (an image pickup optical system) according to a first embodiment of the present invention, where.

A zoom lens according to embodiments of the present invention will be described below. In the following description, a lens having a positive value of a paraxial focal length is let to be a positive lens, and a lens having a negative value of the paraxial focal length is let to be a negative lens.

The zoom lens according to the embodiments of the present invention includes in order from an object side, a first lens group having a positive refractive power, a second lens group having a negative refractive power, a third lens group having a positive refractive power, a fourth lens group having a positive refractive power, and a last lens group having a positive refractive power, and at the time of zooming from a wide angle end to a telephoto end, the first lens group is fixed, the second lens group moves toward a side of an image plane, the third lens group is fixed, and the fourth lens group moves, and at the time of focusing, the fourth lens group moves, and the zoom lens satisfies the following conditional expression (101).

$$0.20 < \log(\beta 34T/\beta 34W) < 0.9 \cdot \log \gamma \quad (101)$$

where, $\beta 34W$ denotes a magnification of a combined system of the third lens group and the fourth lens group at the wide angle end, $\beta 34T$ denotes a magnification of the combined system of the third lens group and the fourth lens group at the telephoto end, fW denotes a focal length of the overall zoom lens system at the wide angle end, fT denotes a focal length of the overall zoom lens system at the telephoto end, and $\gamma = fT/fW > 7$, and each of the magnification or the focal length is a magnification or a focal length at the time of infinite object point focusing.

In the zoom lens according to the embodiment of the present invention, the zoom lens includes at least five lens groups. Accordingly, it is possible to realize widening of an angle of field of an optical system, a large aperture ratio, and a high zooming ratio. Moreover, at the time of zooming from the wide angle end to the telephoto end, in the zoom lens according to the embodiment of the present invention, only the second lens group and the fourth lens group are moved. By making such an arrangement, minimizing the number of movable lens groups as well as reducing weight of the movable lens groups is realized. Moreover, the fourth lens group is imparted a role of focusing and correcting focal position, in addition to zooming. Accordingly, the number of movable lens groups is minimized. For minimizing the number of movable lens groups, both the first lens group and the third lens group are fixed at the time of zooming, at the time of correcting focal position, and at the time of focusing. Moreover, the last lens group may be let to be fixed at the time of zooming, at the time of correcting focal position, and at the time of focusing, similarly as the first lens group and the third lens group.

Incidentally, in the conventional zoom lenses, an arrangement has been such that, majority of the zooming ratio is achieved by movement of the second lens group, and the fourth lens group mainly carries out the correction of focal position and focusing. In such an arrangement, it is extremely difficult to realize a zoom lens with a wide angle of field and a high zooming ratio (for example, diagonal angle of field more than 75 degrees, and zooming ratio more than 10 times). Therefore, in the zoom lens according to the embodiment of the present invention, an arrangement is made such that a zooming function is assigned to a lens group positioned on an image side of the third lens group. By making such an arrangement, it is possible to increase the zooming ratio while widening the angle of field. Furthermore, as the angle of field is widened more and more, although an aberration correction in the first lens group and the second lens group becomes difficult, by making the arrangement as described above, it is possible to ease the difficulty.

An arrangement of lens groups may be made such that, the first lens group includes one negative lens, the second lens group includes one positive lens, the third lens group includes two lens components, the fourth lens group includes two lens components, and the last lens group includes one lens component.

Furthermore, the zoom lens according to the embodiment of the present invention satisfies conditional expression (101). By satisfying conditional expression (101), it is possible to realize a zoom lens for which an F-value at the wide angle end is small, the angle of field is wide, and the zooming ratio is high.

Conditional expression (101) is an expression in which, the zooming (increase in magnification) ratio of a combined system of the third lens group and the fourth lens group is regulated. By satisfying conditional expression (101), it is possible to widen the angle of field as well as to make the zooming ratio high, in a state of a spherical aberration and a coma aberration corrected favorably.

When an upper limit value of conditional expression (101) is surpassed, either a difference in an F-value at the wide angle end and an F-value at the telephoto end becomes large or an axial ray height at the telephoto end becomes high. As the axial beam (light ray) height at the telephoto end becomes high, correction of the spherical aberration and the coma aberration becomes difficult. Whereas, when a lower limit value of conditional expression (101) is surpassed, the zooming is carried out almost by the movement of the second lens group only. In this case, the second lens group has to have a strong refractive power similarly as the first lens group. As a result, particularly at the wide angle end, since the beam height at these lens groups becomes high, further widening of the angle of field becomes difficult.

Here, it is preferable that the zoom lens satisfies the following conditional expression (101') instead of conditional expression (101).

$$0.30 < \log(\beta 34T/\beta 34W) < 0.7 \cdot \log \gamma \quad (101')$$

Moreover, it is more preferable that the zoom lens satisfies the following conditional expression (101") instead of conditional expression (101).

$$0.35 < \log(\beta 34T/\beta 34W) < 0.55 \cdot \log \gamma \quad (101")$$

where, $\gamma = fT/fW > 9$.

Moreover, it is even more preferable that the zoom lens satisfies the following conditional expression (101''') instead of conditional expression (101).

$$0.38 < \log(\beta 34T/\beta 34W) < 0.5 \cdot \log \gamma \quad (101''')$$

where, $\gamma = fT/fW > 10$.

It is more preferable that the zooming ratio $\gamma$ ($=fT/fW$) is 9 or more than 9, and zooming ratio $\gamma$ of 10 is even more preferable.

Moreover, it is preferable that the zoom lens according to the embodiment of the present invention satisfies the following conditional expression (102).

$$0.1 < |\beta 2W| < 0.30 \quad (102)$$

where,

β2W denotes a magnification of the second lens group at the wide angle end, and is a magnification at the time of infinite object point focusing.

Conditional expression (102) is an expression in which, the magnification (at the time of infinite object point focusing) of the second lens group at the wide angle end is regulated. When the magnification of the second lens group at the wide angle end is made small, an absolute value of magnification at the telephoto end of the second lens group does not exceed 1 by far. Therefore, it becomes easy to increase magnification by the combined system of the third lens group and the fourth lens group. As a result, it becomes easy to satisfy conditional expression (101). Moreover, a focal length of the first lens group becomes longer. Therefore, correction of an oblique aberration at the wide angle end, and correction of aberration throughout from longitudinal to oblique at the telephoto end becomes easy. Whereas, as the magnification at the wide angle end of the second lens group is made further smaller, taking to the extreme, that is zero, or in other words, when a state in which, there is no refractive power of the first lens group, the zooming effect of the second lens group ceases (in other words, it becomes a negative-lead type zoom lens). As the zooming effect of the second lens group ceases, since it becomes difficult to secure a high zooming ratio, it is not preferable to make the magnification at the wide angle end of the second lens group excessively small. Therefore, by satisfying conditional expression (102), it is possible to achieve a high zooming ratio in a state of the oblique aberration corrected favorably.

As an upper limit value of conditional expression (102) is surpassed, when the angle of field is widened, correction of the oblique aberration in particular, becomes difficult. Whereas, when a lower limit value of conditional expression (102) is surpassed, securing of a high zooming ratio becomes difficult.

Here, it is preferable that the zoom lens satisfies the following conditional expression (102') instead of conditional expression (102).

$$0.1 < |\beta 2W| < 0.24 \quad (102')$$

Moreover, it is more preferable that the zoom lens satisfies the following conditional expression (102") instead of conditional expression (102).

$$0.1 < |\beta 2W| < 0.22 \quad (102'')$$

Moreover, it is preferable that the zoom lens according to the embodiments of the present invention satisfies the following conditional expression (103).

$$0.3 < \log(\beta 2T/\beta 2W)/\log \gamma < 0.8 \quad (103)$$

where,

β2W denotes a magnification of the second lens group at the wide angle end,

β2T denotes a magnification of the second lens group at the telephoto end, fW denotes the focal length of the overall zoom lens system at the wide angle end, fT denotes the focal length of the overall zoom lens system at the telephoto end, and γ=fT/fW>7, and each of the magnification or the focal length is a magnification or a focal length at the time of infinite object point focusing.

Conditional expression (103) is an expression in which, the zooming (increase in magnification) of the second lens group with respect to the zooming ratio of the overall zoom lens system is regulated. Conditional expression (103) is a condition which suppresses an effect of increase in magnification of the second lens group such that an absolute value of magnification at the telephoto end of the second lens group does not exceed 1 by far. By satisfying conditional expression (103), it is possible to realize favorable correction of spherical aberration and coma aberration, and widening of angle (of field).

When an upper limit value of conditional expression (103) is surpassed, the zooming is carried out almost by the movement of the second lens group only. In this case, the second lens group has to have a strong refractive power similarly as the first lens group. As the second lens group assumes strong refractive power, particularly at the wide angle end, since the beam height at these lens groups becomes high, further widening of the angle of field becomes difficult. Whereas, when a lower limit value of conditional expression (103) is surpassed, either a difference in an F-value at the wide angle end and an F-value at the telephoto end becomes large, or an axial beam height at the telephoto end becomes high. As the axial beam height at the telephoto end becomes high, correction of the spherical aberration and the coma aberration becomes difficult.

Here, it is preferable that the zoom lens satisfies the following conditional expression (103') instead of conditional expression (103).

$$0.45 < \log(\beta 2T/\beta 2W)/\log \gamma < 0.67 \quad (103')$$

Moreover, it is more preferable that the zoom lens satisfies the following conditional expression (103") instead of conditional expression (103).

$$0.50 < \log(\beta 2T/\beta 2W)/\log \gamma < 0.64 \quad (103'')$$

Moreover, it is preferable that the zoom lens according to the embodiments of the present invention satisfies the following conditional expression (104).

$$0.30 < |\beta 34W| < 0.70 \quad (104)$$

where,

β34W denotes the magnification of the combined system of the third lens group and the fourth lens group at the wide angle end, and is a magnification at the time of infinite object point focusing.

Conditional expression (104) is an expression which regulates the magnification of the combined system of the third lens group and the fourth lens group at the wide angle end. By satisfying conditional expression (104), it is possible to widen the angle of field of the zoom lens and to slim the zoom lens.

When an upper limit value of conditional expression (104) is surpassed, it is necessary to shorten the focal length of the first lens group. When the focal length of the first lens group is shortened, the widening of the angle of field becomes difficult. Whereas, when a lower limit value of conditional expression (104) is surpassed, the fourth lens group and a lens group on the image side adjacent to the fourth lens group are susceptible to interfere. When a distance between the fourth lens group and the lens group on the image side adjacent to the fourth lens group is widened to prevent the interference, the overall length of the optical system becomes long.

Here, it is preferable that the zoom lens satisfies the following conditional expression (104') instead of conditional expression (104).

$$0.36 < |\beta 34W| < 0.56 \quad (104')$$

Moreover, it is more preferable that the zoom lens satisfies the following conditional expression (104") instead of conditional expression (104).

$$0.39<|\beta 34W|<0.53 \quad (104")$$

It is preferable that the zoom lens according to the embodiments of the present invention satisfies the following conditional expression (105).

$$1.10<f34W/f34T<2.00 \quad (105)$$

where, f34W denotes a focal length of a combined system of the third lens group and the fourth lens group at the wide angle end, f34T denotes a focal length of the combined system of the third lens group and the fourth lens group at the telephoto end, and each focal length is a focal length at the time of infinite object point focusing.

Conditional expression (105) is an expression in which, a ratio of the focal length at the wide angle end of the combined system of the third lens group and the fourth lens group and the focal length at the telephoto end of the combined system of the third lens group and the fourth lens group is regulated. By satisfying conditional expression (105), it is possible to maintain or to shorten the focal length of the combined system at the time of zooming from the wide angle end to the telephoto end. As a result, since it is possible to make high the ratio of zooming (increase in magnification) by the combined system of the third lens group and the fourth lens group, it is possible to make high the zooming ratio of the overall zoom lens system.

When an upper limit value of conditional expression (105) is surpassed, since a relative decentering sensitivity of the third lens group and the fourth lens group, particularly, the spherical aberration and the comma aberration are deteriorated. Therefore, an image forming function is susceptible to be degraded. Whereas, when a lower limit value of conditional expression (105) is surpassed, even when an amount of movement of the fourth lens group is increased, it becomes difficult to increase the ratio of zooming (increase in magnification) by the combined system of the third lens group and the fourth lens group.

Here, it is preferable that the zoom lens satisfies the following conditional expression (105') instead of conditional expression (105).

$$1.20<f34W/f34T<2.00 \quad (105')$$

Moreover, it is more preferable that the zoom lens satisfies the following conditional expression (105") instead of conditional expression (105).

$$1.25<f34W/f34T<2.00 \quad (105")$$

Moreover, it is preferable that the zoom lens according to the embodiments of the present invention satisfies the following conditional expression (106).

$$-0.5<fW/f123T<0.10 \quad (106)$$

where, fW denotes the focal length of the overall zoom lens system at the wide angle end, f123T denotes a focal length of a combined system from the first lens group up to the third lens group at the telephoto end, and each of fW and f123T is a focal length at the time of infinite object focusing.

Conditional expression (106) is an expression which regulates a ratio of the focal length of the overall zoom lens system at the wide angle end and the focal length of the combined system from the first lens group up to the third lens group at the telephoto end. By satisfying conditional expression (106), it is possible to achieve a high zooming ratio and to suppress occurrence of various aberrations.

When an upper limit value of conditional expression (106) is surpassed, it is disadvantageous for widening of angle (of field) and correction of a meridional curvature of field and the coma aberration at the wide angle end, and correction of a longitudinal chromatic aberration and the spherical aberration at the telephoto end. Whereas, when a lower limit value of conditional expression (106) is surpassed, it is disadvantageous for achieving a high zooming ratio.

Here, it is preferable that the zoom lens satisfies the following conditional expression (106') instead of conditional expression (106).

$$-0.4<fW/f123T<0.04 \quad (106')$$

Moreover, it is more preferable that the zoom lens satisfies the following conditional expression (106") instead of conditional expression (106).

$$-0.3<fW/f123T<0.02 \quad (106")$$

Moreover, it is preferable that the zoom lens according to the embodiments of the present invention satisfies the following conditional expression (107).

$$9<f1/fW<18 \quad (107)$$

where, f1 denotes a focal length of the first lens group, and fW denotes the focal length of the overall zoom lens system at the wide angle end, and is the focal length at the time of infinite object point focusing.

Conditional expression (107) is a conditional expression which regulates a ratio of the focal length of the first lens group and the focal length of the overall zoom lens system at the wide angle end. By satisfying conditional expression (107), it is possible to achieve a high zooming ratio and to suppress occurrence of various aberrations.

When an upper limit value of conditional expression (107) is surpassed, it is disadvantageous for achieving a high zooming ratio. Whereas, when a lower limit value of conditional expression (107) is surpassed, widening of the angle of field, correction of the meridional curvature of field and the coma aberration at the wide angle end, and correction of longitudinal chromatic aberration and the spherical aberration at the telephoto end become difficult.

Here, it is preferable that the zoom lens satisfies the following conditional expression (107') instead of conditional expression (107).

$$10.5<f1/fW<17 \quad (107')$$

Moreover, it is more preferable that the zoom lens satisfies the following conditional expression (107") instead of conditional expression (107).

$$11.5<f1/fW<16 \quad (107")$$

Moreover, it is preferable that the zoom lens according to the embodiments of the present invention satisfies the following conditional expression (108).

$$-0.18<f2/f1<-0.06 \quad (108)$$

where, f1 denotes a focal length of the first lens group, and f2 denotes a focal length of the second lens group.

Conditional expression (108) is an expression in which, a ratio of the focal length of the first lens group and the focal length of the second lens group is regulated, and is a condition for acquiring a high zooming ratio while widening the angle (of field).

When an upper limit of conditional expression (108) is surpassed, it becomes difficult to widen further the angle (of field). Whereas, when a lower limit of conditional expression (108) is surpassed, it becomes difficult to achieve a high zooming ratio.

Here, it is preferable that the zoom lens satisfies the following conditional expression (108') instead of conditional expression (108).

$$-0.16 < f2/f1 < -0.06 \quad (108')$$

Moreover, it is more preferable that the zoom lens satisfies the following conditional expression (108") instead of conditional expression (108).

$$-0.15 < f2/f1 < -0.06 \quad (108'')$$

Moreover, it is preferable that the zoom lens according to the embodiments of the present invention satisfies the following conditional expression (109).

$$4.0 < f4/fW < 10.0 \quad (109)$$

where, f4 denotes a focal length of the fourth lens group, and fW denotes the focal length of the overall zoom lens system at the wide angle end, and is a focal length at the time of infinite object point focusing.

Conditional expression (109) is an expression which regulates a ratio of the focal length of the fourth lens group and the focal length of the overall zoom lens system at the wide angle end. By satisfying conditional expression (109), it is possible to achieve a zoom lens which is slim, and to suppress the occurrence of aberration due to decentering.

When an upper limit value of conditional expression (109) is surpassed, since the focal length of the fourth lens group becomes long, an amount of movement of the fourth lens group at the time of zooming and focusing becomes large. Whereas, when a lower limit value of conditional expression (109) is surpassed, a decentering sensitivity and an aberration fluctuation due to zooming are susceptible to increase. As a result, the spherical aberration and the coma aberration in particular, are deteriorated.

Here, it is preferable that the zoom lens satisfies the following conditional expression (109') instead of conditional expression (109).

$$4.8 < f4/fW < 7.0 \quad (109')$$

Moreover, it is more preferable that the zoom lens satisfies the following conditional expression (109") instead of conditional expression (109).

$$5.1 < f4/fW < 6.0 \quad (109'')$$

Moreover, it is preferable that the zoom lens according to the embodiments of the present invention satisfies the following conditional expression (110).

$$-2.00 < ff4/f4 < -1.00 \quad (110)$$

where, f4 denotes a focal length of the fourth lens group, and ff4 denotes a distance from an apex of a lens nearest to the object side of the fourth lens group up to a front-side focal position of the fourth lens group.

Conditional expression (110) is an expression which regulates a ratio of the focal length of the fourth lens group and the distance from the apex of the lens nearest to the object side of the fourth lens group up to the front-side focal position of the fourth lens group. By satisfying conditional expression (110), it is possible to make the overall zoom lens system slim, and to suppress the occurrence of an oblique aberration.

When an upper limit value of conditional expression (110) is surpassed, the third lens group and the fourth lens group are susceptible to come closer. In this case, securing of focusing space at the telephoto end of the fourth lens group is susceptible to become difficult. Whereas, when a lower limit value of conditional expression (110) is surpassed, since an off-axis beam height in particular, at the fourth lens group becomes high, correction of the oblique aberration becomes difficult.

Here, it is more preferable that the zoom lens satisfies the following conditional expression (110') instead of conditional expression (110).

$$-1.50 < ff4/f4 < -1.10 \quad (110')$$

Moreover, it is more preferable that the zoom lens satisfies the following conditional expression (110") instead of conditional expression (110).

$$-1.35 < ff4/f4 < -1.15 \quad (110'')$$

Moreover, in the zoom lens according to the embodiments of the present invention, it is preferable that a direction of movement of the fourth lens group at the time of zooming is toward the object side all the time.

When such an arrangement is made, an effect of increase in magnification in the combined system of the third lens group and the fourth lens group increases. Therefore, it is possible to improve an efficiency of zooming in the overall zoom lens system. Particularly, the effect is exerted at the time of carrying out zooming more toward the telephoto end while maintaining a state of focusing to an object. An order of focusing and zooming may be arbitrary and focusing and zooming may be carried out simultaneously or concurrently.

Moreover, in the zoom lens according to the embodiments of the present invention, it is preferable that the fourth lens group includes in order from the object side, a lens component having a positive refractive power and a lens component having a negative refractive power.

By making such an arrangement, it is possible to position principal points of the fourth lens group on the object side. Accordingly, at the telephoto end, where an amount of drawing is the maximum, it is possible to keep a distance from the third lens group substantially widened in advance. As a result, it is possible to carry out focusing to an object at a closer distance by drawing the fourth lens group toward the object side. Each of the lens components is one of a single lens and a cemented lens, and has two optical surfaces which are in contact with air.

Moreover, it is preferable that the zoom lens according to the embodiments of the present invention satisfies the following conditional expression (111).

$$-0.3 < (R42F - R42R)/(R42F + R42R) < 0.6 \quad (111)$$

where,

R42F denotes a paraxial radius of curvature of a surface nearest to the object side of the lens component having a negative refractive power in the fourth lens group, and R42R denotes a paraxial radius of curvature of a surface nearest to an image side of the lens component having a negative refractive power in the fourth lens group.

Conditional expression (111) is an expression which regulates a shape (indicated by a reciprocal (inverse number) of a shape factor) of the negative lens component in the fourth lens group. By satisfying conditional expression (111), it is possible to suppress the occurrence of the coma aberration and the curvature of field.

When an upper limit value of conditional expression (111) is surpassed, correction of the spherical aberration, the coma aberration, and the meridional curvature of field is susceptible to become difficult. Whereas, when a lower limit value of conditional expression (111) is surpassed, it becomes difficult to position the principal points of the fourth lens group on the object side. In this case, at the telephoto end, it becomes difficult to secure a space for moving for focusing of the fourth lens group. As a result, it is difficult to shorten the overall length of the optical system.

Here, it is preferable that the zoom lens satisfies the following conditional expression (111') instead of conditional expression (111).

$$-0.2<(R42F-R42R)/(R42F+R42R)<0.4 \quad (111')$$

Moreover, it is more preferable that the zoom lens satisfies the following conditional expression (111") instead of conditional expression (111).

$$-0.1<(R42F-R42R)/(R42F+R42R)<0.2 \quad (111'')$$

Moreover, in the zoom lens according to the embodiments of the present invention, it is preferable that the lens component having a negative refractive power in the fourth lens group is a cemented lens, and the cemented lens includes in order from the object side, a single lens having a positive refractive power and a single lens having a negative refractive power, and, the zoom lens satisfies the following conditional expression (112).

$$-0.5<(R422F+R422R)/(R422F-R422R)<1.2 \quad (112)$$

where,
R422F denotes a paraxial radius of curvature of a surface nearest to the object side of the single lens having a negative refractive power in the fourth lens group, and
R422R denotes a paraxial radius of curvature of a surface nearest to an image side of the single lens having a negative refractive power in the fourth lens group.

Conditional expression (112) is an expression which regulates a shape (indicated by a reciprocal of a shape factor) of the negative lens in the cemented lens of the fourth lens group. By satisfying conditional expression (112), it is possible to suppress the occurrence of the coma aberration and the curvature of field.

When an upper limit value of conditional expression (112) is surpassed, correction of the coma aberration and the meridional curvature of field is susceptible to become difficult. Whereas, when a lower limit value of conditional expression (112) is surpassed, it becomes difficult to position the principal points of the fourth lens group on the object side. In this case, at the telephoto end, it becomes difficult to secure a space for moving for focusing of the fourth lens group. As a result, it is difficult to shorten the overall length of the optical system.

Here, it is preferable that the zoom lens satisfies the following conditional expression (112') instead of conditional expression (112).

$$-0.2<(R422F+R422R)/(R422F-R422R)<0.6 \quad (112')$$

Moreover, it is more preferable that the zoom lens satisfies the following conditional expression (112") instead of conditional expression (112).

$$-0.1<(R422F+R422R)/(R422F-R422R)<0.4 \quad (112'')$$

Moreover, it is preferable that the zoom lens according to the embodiments of the present invention satisfies the following conditional expression (113).

$$0.50<fb3/f3<1.5 \quad (113)$$

where,
f3 denotes a focal length of the third lens group, and
fb3 denotes a distance from an apex of a lens nearest to an image side of the third lens group up to a rear-side focal position of the third lens group.

Conditional expression (113) is an expression which regulates a ratio of the distance from the apex of the lens nearest to the image side of the third lens group up to the rear-side focal position of the third lens group and the focal length of the third lens group. By satisfying conditional expression (113), it is possible to make the zoom lens slim, and to suppress the occurrence of the oblique aberration.

When an upper limit value of conditional expression (113) is surpassed, it is disadvantageous for shortening the overall length of the zoom lens. Whereas, when a lower limit value of conditional expression (113) is surpassed, the coma aberration is susceptible to be deteriorated.

Here, it is preferable that the zoom lens satisfies the following conditional expression (113') instead of conditional expression (113).

$$0.72<fb3/f3<1.1 \quad (113')$$

Moreover, it is more preferable that the zoom lens satisfies the following conditional expression (113") instead of conditional expression (113).

$$0.82<fb3/f3<1.0 \quad (113'')$$

Moreover, in the zoom lens according to the embodiments of the present invention, it is preferable that the third lens group includes in order from the object side, two lens components namely, a lens component having a positive refractive power and a lens component having a negative refractive power.

When such an arrangement is made, it is possible to position the principal points of the fourth lens group on the object side. As a result, it is possible to shorten the overall length of the zoom lens. Each lens component is one of a single lens and a cemented lens, and has two optical surfaces which are in contact with air.

Moreover, it is preferable that the zoom lens according to the embodiments of the present invention satisfies the following conditional expression (114).

$$0.1<(R32F-R32R)/(R32F+R32R)<5.0 \quad (114)$$

where,
R32F denotes a paraxial radius of curvature of a surface nearest to the object side of the lens component having a negative refractive power in the third lens group, and
R32R denotes a paraxial radius of curvature of a surface nearest to an image side of the lens component having a negative refractive power in the third lens group.

Conditional expression (114) is an expression which regulates a shape (indicated by a reciprocal of a shape factor) of the lens component having a negative refractive power in the third lens group. By satisfying conditional expression (114), it is possible to shorten the overall length of the zoom lens.

When an upper limit value of conditional expression (114) is surpassed, although it is advantageous for shortening the overall length of the zoom lens, correction of the spherical aberration and the coma aberration over the entire zooming area is susceptible to become difficult. Whereas, when a lower limit value of conditional expression (114) is surpassed, since it becomes difficult to position principal points of the third lens group on the object side, shortening of the overall length of the zoom lens becomes difficult.

Here, it is preferable that the zoom lens satisfies the following conditional expression (114') instead of conditional expression (114).

$$0.2<(R32F-R32R)/(R32F+R32R)<2.5 \quad (114')$$

Moreover, it is more preferable that the zoom lens satisfies the following conditional expression (114") instead of conditional expression (114).

$$0.4<(R32F-R32R)/(R32F+R32R)<1.2 \quad (114'')$$

Moreover, it is preferable that the zoom lens according to the embodiments of the present invention satisfies the following conditional expression (115).

$$0.7<|\beta 2T|<2.0 \quad (115)$$

where,

β2T denotes a magnification of the second lens group at the telephoto end, and is a magnification at the time of infinite object point focusing.

Conditional expression (115) is a conditional expression in which, the magnification (at the time of infinite object point focusing) of the second lens group at the telephoto end is regulated. It is preferable to make an arrangement such that the magnification (at the time of infinite object point focusing) of the second lens group at the telephoto end does not exceed |−1| by far, or in other words, to make an arrangement such that the zoom lens satisfies conditional expression (115). When such an arrangement is made, it is possible to make high the zooming (increase in magnification) by the combined system of the third lens group and the fourth lens group.

When an upper limit value of conditional expression (115) is surpassed, the zooming ratio of the combined system of the third lens group and the fourth lens group becomes small. As a result, it becomes difficult to achieve a high zooming ratio. Whereas, when a lower limit value of conditional expression (115) is surpassed, the zooming ratio in the second lens group becomes small. In this case, there arises a need to increase further the zooming ratio in the combined system of the third lens group and the fourth lens group. As the zooming ratio in the combined system of the third lens group and the fourth lens group is increased further, at the telephoto end, it becomes difficult to secure a space for moving for focusing of the fourth lens group. Here, when an attempt is made to secure the moving space forcedly, correction of fluctuation in various aberrations due to focusing and shortening of the overall length becomes difficult.

An image point P by the second lens group becomes an object point for the combined system of the third lens group and the fourth lens group. With approaching toward the telephoto end, the magnification of the second lens group exceeds |−1| by far, or in other words, as the zoom lens does not satisfy conditional expression (115) any more, the image point P moves toward the object side. Therefore, the magnification (at the time of infinite object point focusing) of the combined system of the third lens group and the fourth lens group becomes small.

Here, it is preferable that the zoom lens satisfies the following conditional expression (115') instead of conditional expression (115).

$$0.7<|2T|<1.4 \quad (115')$$

Moreover, it is more preferable that the zoom lens satisfies the following conditional expression (115") instead of conditional expression (115).

$$0.7<|\beta 2T|<1.2 \quad (115'')$$

It is preferable that the zoom lens according to the embodiments of the present invention satisfies the following conditional expression (116).

$$0.90<|\beta 34T|<1.80 \quad (116)$$

where,

β34T denotes the magnification of the combined system of the third lens group and the fourth lens group at the telephoto end, and is a magnification at the time of infinite object point focusing.

Conditional expression (116) is an expression which regulates the magnification of the combined system of the third lens group and the fourth lens group at the telephoto end. By satisfying conditional expression (116), widening of the angle (of field) and slimming are possible.

When an upper limit value of conditional expression (116) is surpassed, the F-value at the telephoto end is susceptible to become high. Whereas, when a lower limit value of conditional expression (116) is surpassed, the magnification β2W (at the time of infinite object point focusing) of the second lens group at the wide angle end becomes excessively small. Therefore, it becomes difficult to achieve a zooming (increase in magnification) ratio as the overall zoom lens system.

Here, it is preferable that the zoom lens satisfies the following conditional expression (116') instead of conditional expression (116).

$$1.00<|\beta 34T|<1.35 \quad (116')$$

Moreover, it is more preferable that the zoom lens satisfies the following conditional expression (116") instead of conditional expression (116).

$$1.04<|\beta 34T|<1.28 \quad (116'')$$

In the zoom lens according to the embodiments of the present invention, it is preferable that the last lens group includes a lens component having a positive refractive power.

As a zoom lens system, the zoom lens may be complete with lens groups from the first lens group up to the fourth lens group. However, in the zoom lens having a high zooming ratio with a wide angle of field as in the embodiments of the present invention, since the focal length of the first lens group is long, since the zooming from the second lens group up to the fourth lens group and a region of appropriate magnification of a focal position correction lens group tend to be somewhat high, for letting the focal length to be a desired focal length, a lens group which lowers (reduces) the overall magnification is necessary. Therefore, in the zoom lens according to the embodiments of the present invention, the last lens group is provided at the image side of the fourth lens group, and the last lens group is let to have a positive refractive power, and is let to have magnification of less than +1. The lens component is a single lens or a cemented lens, and has two optical surfaces which are in contact with air.

It is preferable that the zoom lens according to the embodiments of the present invention satisfies the following conditional expression (117).

$$0.70<|\beta FW|<0.98 \quad (117)$$

where,

βFW denotes a magnification of the last lens group at the wide angle end, and is a magnification at the time of infinite object point focusing.

Conditional expression (117) is an expression which regulates the magnification of the last lens group at the wide angle end. By satisfying conditional expression (117), it is possible to suppress the occurrence of various oblique aberrations.

When an upper limit value of conditional expression (117) is surpassed, it becomes difficult to achieve a zoom lens having a high zooming ratio with a wide angle of field. Whereas, when a lower limit value of conditional expression (117) is surpassed, since the refractive power of the last lens group becomes strong, the height of oblique (off-axis) beam passing through the last lens group is susceptible to become high. As a result, correction of various oblique aberrations becomes difficult.

Here, it is preferable that the zoom lens satisfies the following conditional expression (117') instead of conditional expression (117).

$$0.73<|\beta FW|<0.94 \quad (117')$$

Moreover, it is more preferable that the zoom lens satisfies the following conditional expression (117") instead of conditional expression (117).

$$0.76<|\beta FW|<0.90 \quad (117")$$

When the last lens group is moved toward the object side at the time of zooming from the wide angle end to the telephoto end, it is advantageous since there is an effect of negating a fluctuation in the meridional curvature of field and the coma aberration at the time of zooming. However, when the last lens group is moved toward the object side, particularly near the telephoto end, error sensitivity for an error such as decentering tends to increase. When it is taken into consideration that the error sensitivity increases due to making the last lens group movable, it is preferable to let the last lens group to be fixed at the time of zooming.

An image pickup apparatus according to the embodiments of the present invention includes in order from an object side the zoom lens described above, and an image pickup element which is disposed on an image plane of the zoom lens.

A zoom lens according to the embodiment of the present invention includes in order from an object side, a first lens group having a positive refractive power, a second lens group having a negative refractive power, a third lens group having a positive refractive power, a fourth lens group having a positive refractive power, and a last lens group having a positive refractive power, and at the time of zooming from a wide angle end to a telephoto end, the first lens group is fixed, the second lens group moves toward a side of an image plane, the third lens group is fixed, and the fourth lens group moves, and at the time of focusing, the fourth lens group moves, and the zoom lens satisfies the following conditional expressions (201) and (202).

$$0.35<(\beta 34T/(\beta 34W)/(\beta 2T/\beta 2W)<1.2 \quad (201)$$

$$3.0<\beta 2T/\beta 2W<fT/fW \quad (202)$$

where, $\beta 2W$ denotes a magnification of the second lens group at the wide angle end;

$\beta 2T$ denotes a magnification of the second lens group at the telephoto end, $\beta 34W$ denotes a magnification of a combined system of the third lens group and the fourth lens group at the wide angle end, $\beta 34T$ denotes a magnification of the combined system of the third lens group and the fourth lens group at the telephoto end, fW denotes a focal length of the overall zoom lens system at the wide angle end, fT denotes a focal length of the overall zoom lens system at the telephoto end, fT/fW>7, and each of the magnification or the focal length is a magnification or a focal length at the time of infinite object point focusing.

In the zoom lens according to the embodiments of the present invention, the zoom lens includes at least five lens groups. Accordingly, it is possible to realize a high zooming ratio, a large aperture ratio, and a wide angle of field of the optical system. Moreover, at the time of zooming from the wide angle end to the telephoto end, in the zoom lens according to the embodiment of the present invention, only the second lens group and the fourth lens group are moved. By making such an arrangement, the number of movable lens groups is minimized as well as light weight of the movable lens groups is realized. Moreover, the fourth lens group is imparted the role of focusing and correcting focal position in addition to zooming. Accordingly, the number of movable lens groups is minimized. For minimizing the number of movable lens groups, the first lens group and the third lens group are fixed at the time of zooming, at the time of correcting focal position, and at the time of focusing. Moreover, the last lens group may be let to be fixed at the time of zooming, at the time of correcting focal position, and at the time of focusing, similarly as the first lens group and the third lens group.

Incidentally, in the conventional zoom lenses, an arrangement has been such that, majority of the zooming ratio is achieved by movement of the second lens group, and the fourth lens group mainly carries out the correction of focal position and focusing. In such an arrangement, it is extremely difficult to realize a zoom lens with a wide angle of field and a high zooming ratio (for example, diagonal angle of field more than 75 degrees, and zooming ratio more than 10 times). Therefore, in the zoom lens according to the embodiment of the present invention, an arrangement is made such that a zooming function is assigned to a lens group positioned on an image side of the third lens group. By making such an arrangement it is possible to increase the zooming ratio while widening the angle of field. Furthermore, as the angle of field is widened more and more, although an aberration correction in the first lens group and the second lens group becomes difficult, by making the arrangement as described above, it is possible to ease the difficulty.

An arrangement of lens groups may be made such that, the first lens group includes one negative lens, the second lens group includes one positive lens, the third lens group includes two lens components, the fourth lens group includes two lens components, and the last lens group includes one lens component.

Furthermore, the zoom lens according to the embodiment of the present invention satisfies conditional expressions (201) and (202). By satisfying conditional expressions (201) and (202), it is possible to realize a zoom lens for which the F-value at the wide angle end is small, the angle of field is wide, and the zooming ratio is high.

Conditional expression (201) is an expression in which, the zooming (increase in magnification) ratio of a combined system of the third lens group and the fourth lens group with respect to the zooming (increase in magnification) ratio of the second lens group from the wide angle end to the telephoto end is regulated. By satisfying conditional expression (201), it is possible to widen the angle of field as well as to make the zooming ratio high in a state of the oblique aberration corrected favorably.

When an upper limit value of conditional expression (201) is surpassed, it becomes difficult to secure a space for moving of the fourth lens group for focusing. Here, when an attempt is made to secure the moving space forcedly, correction of fluctuation in various aberrations due to focusing and shortening of the overall length becomes difficult. Whereas, when a lower limit value of conditional expression (201) is surpassed, when the angle of field is widened such as the diagonal angle of field is 75 degrees, it becomes difficult to make small a lens diameter of the first lens group and to correct the oblique aberration favorably.

Conditional expression (202) is an expression in which, a ratio of the magnification at the wide angle end of the second lens group and the magnification at the telephoto end of the second lens group is regulated. By satisfying conditional expression (202), it is possible to achieve a high zooming ratio upon suppressing the occurrence of aberration in the second lens group.

When an upper limit value of conditional expression (202) is surpassed, the zooming ratio of the second lens group becomes high. In this case, at the wide angle end, the oblique aberration, particularly, an astigmatism, a distortion, and a chromatic aberration of magnification are susceptible to be deteriorated. Moreover, at the telephoto end, the spherical aberration, the coma aberration, and the longitudinal chromatic aberration are susceptible to be deteriorated. Whereas, when a lower limit value of conditional expression (202) is surpassed, since the zooming ratio of the second lens group becomes small, it becomes difficult to achieve a high zooming ratio (such as a zooming ratio of more than 10 times).

It is preferable that the zoom lens satisfies the following conditional expression (201') instead of conditional expression (201).

$$0.45 < (\beta 34T/\beta 34W)/(\beta 2T/\beta 2W) < 1.2 \qquad (201')$$

Moreover, it is more preferable that the zoom lens satisfies the following conditional expression (201") instead of conditional expression (201).

$$0.50 < (\beta 34T/\beta 34W)/(\beta 2T/\beta 2W) < 1.2 \qquad (201")$$

Here, it is preferable that the zoom lens satisfies the following conditional expression (202') instead of conditional expression (202).

$$3.6 < \beta 2T/\beta 2W < 0.8 \times fT/fW \qquad (202')$$

Moreover, it is more preferable that the zoom lens satisfies the following conditional expression (202") instead of conditional expression (202).

$$3.9 < \beta 2T/\beta 2W < 0.7 \times fT/fW \qquad (202")$$

It is preferable that $\beta 34T/\beta 34W$ is not less than 1.8, and 2.1 or higher is more preferable, and 2.4 or higher is even more preferable. Moreover, zooming ratio $\gamma$ (=fT/fW) of 9 or more is more preferable, and zooming ratio $\gamma$ of 10 or more is even more preferable.

Moreover, it is preferable that the zoom lens according to the embodiments of the present invention satisfies the following conditional expression (203).

$$0.1 < |\beta 2W| < 0.30 \qquad (203)$$

where,
$\beta 2W$ denotes a magnification of the second lens group at the wide angle end, and is a magnification at the time of infinite object point focusing.

Conditional expression (203) is an expression in which, the magnification (at the time of infinite object point focusing) of the second lens group at the wide angle end is regulated. When the magnification of the second lens group at the wide angle end is let to be a small value, the focal length of the first lens group becomes long. Therefore, correction of the oblique aberration at the wide angle end and aberration throughout from longitudinal to oblique at the telephoto end becomes easy. Whereas, as the magnification at the wide angle end of the second lens group is made further smaller, taking to the extreme, that is zero, or in other words, when a state in which, there is no refractive power of the first lens group, the zooming effect of the second lens group ceases (in other words, it becomes a negative-lead type zoom lens). As the zooming effect of the second lens group ceases, since it becomes difficult to secure a high zooming ratio, it is not preferable to make the magnification at the wide angle end of the second lens group excessively small. Therefore, by satisfying conditional expression (203), it is possible to achieve a high zooming ratio in a state of the oblique aberration corrected favorably.

As an upper limit value of conditional expression (203) is surpassed, when the angle of field is widened, correction of the oblique aberration in particular, becomes difficult. Whereas, when a lower limit value of conditional expression (203) is surpassed, securing of a high zooming ratio becomes difficult.

Here, it is preferable that the zoom lens satisfies the following conditional expression (203') instead of conditional expression (203).

$$0.1 < |\beta 2W| < 0.24 \qquad (203')$$

Moreover, it is more preferable that the zoom lens satisfies the following conditional expression (203") instead of conditional expression (203).

$$0.1 < |\beta 2W| < 0.22 \qquad (203")$$

Moreover, it is preferable that the zoom lens according to the embodiments of the present invention satisfies the following conditional expression (204).

$$0.7 < |\beta 2T| < 2.0 \qquad (204)$$

where,
$\beta 2T$ denotes a magnification of the second lens group at the telephoto end, and is a magnification at the time of infinite object point focusing.

Conditional expression (204) is a conditional expression in which, the magnification (at the time of infinite object point focusing) of the second lens group at the telephoto end is regulated. It is preferable to make an arrangement such that the magnification (at the time of infinite object point focusing) of the second lens group at the telephoto end does not exceed |−1| by far, or in other words, to make an arrangement such that the zoom lens satisfies conditional expression (204). When such an arrangement is made, it is possible to make high the zooming (increase in magnification) ratio by the combined system of the third lens group and the fourth lens group.

When an upper limit value of conditional expression (204) is surpassed, the zooming ratio of the combined system of the third lens group and the fourth lens group becomes small. As a result, it becomes difficult to achieve a high zooming ratio. Whereas, when a lower limit value of conditional expression (204) is surpassed, the zooming rate in the second lens group becomes small. In this case, there arises a need to increase further the zooming ratio in the combined system of the third lens group and the fourth lens group. As the zooming ratio in the combined system of the third lens group and the fourth lens group is increased further, at the telephoto end, it becomes difficult to secure a space for moving for focusing of the fourth lens group. Here, when an attempt is made to secure the moving space forcedly, correction of fluctuation in various aberrations due to focusing and shortening of the overall length becomes difficult.

An image point P by the second lens group becomes an object point for the combined system of the third lens group and the fourth lens group. With approaching toward the telephoto end, the magnification of the second lens group exceeds |−1| by far, or in other words, as the zoom lens does not satisfy conditional expression (204) any more, the image point P moves toward the object side. Therefore, the magnification (at the time of infinite object point focusing) of the combined system of the third lens group and the fourth lens group becomes small.

Here, it is preferable that the zoom lens satisfies the following conditional expression (204') instead of conditional expression (204).

$$0.7<|\beta 2T|<1.4 \tag{204'}$$

Moreover, it is more preferable that the zoom lens satisfies the following conditional expression (204") instead of conditional expression (204).

$$0.7<|\beta 2T|<1.2 \tag{204"}$$

Moreover, it is preferable that the zoom lens according to the embodiments of the present invention satisfies the following conditional expression (205).

$$1.10<f34W/f34T<2.00 \tag{205}$$

where,

β34W denotes the magnification of a combined system of the third lens group and the fourth lens group at the wide angle end, β34T denotes the magnification of the combined system of the third lens group and the fourth lens group at the telephoto end, and each of the magnification or the focal length is a magnification or a focal length at the time of infinite object point focusing.

Conditional expression (205) is an expression in which, a ratio of the focal length at the wide angle end of the combined system of the third lens group and the fourth lens group and the focal length at the telephoto end of the combined system of the third lens group and the fourth lens group is regulated. By satisfying conditional expression (205), it is possible to maintain or to shorten the focal length of the combined system at the time of zooming from the wide angle end to the telephoto end. As a result, since it is possible to make high the ratio of zooming (increase in magnification) by the combined system of the third lens group and the fourth lens group, it is possible to make high the zooming ratio of the overall zoom lens system.

When an upper limit value of conditional expression (205) is surpassed, since the relative decentering sensitivity of the third lens group and the fourth lens group becomes high, particularly, the spherical aberration and the coma aberration are deteriorated. Therefore, the image forming function is susceptible to be degraded. Whereas, when a lower limit value of conditional expression (205) is surpassed, even when the amount of movement of the fourth lens group is increased, it becomes difficult to increase the ratio of zooming (increase in magnification) by the combined system of the third lens group and the fourth lens group.

Here, it is preferable that the zoom lens satisfies the following conditional expression (205') instead of conditional expression (205).

$$1.20<f34W/f34T<2.00 \tag{205'}$$

Moreover, it is more preferable that the zoom lens satisfies the following conditional expression (205") instead of conditional expression (205).

$$1.25<f34W/f34T<2.00 \tag{205"}$$

Moreover, it is preferable that the zoom lens according to the embodiments of the present invention satisfies the following conditional expression (206).

$$0.30<|\beta 34W|<0.70 \tag{206}$$

where,

β34W denotes the magnification of the combined system of the third lens group and the fourth lens group at the wide angle end, and is a magnification at the time of infinite object point focusing.

Conditional expression (206) is an expression which regulates the magnification of the combined system of the third lens group and the fourth lens group at the wide angle end. By satisfying conditional expression (206), it is possible to widen the angle of field of the zoom lens and to slim the zoom lens.

When an upper limit value of conditional expression (206) is surpassed, it is necessary to shorten the focal length of the first lens group. When the focal length of the first lens group is shortened, the widening of the angle of field becomes difficult. Whereas, when a lower limit value of conditional expression (206) is surpassed, the fourth lens group and a lens group on the image side adjacent to the fourth lens group are susceptible to interfere. When a distance between the fourth lens group and the lens group on the image side adjacent to the fourth lens group is widened to prevent the interference, the overall length of the optical system becomes long.

Here, it is preferable that the zoom lens satisfies the following conditional expression (206') instead of conditional expression (206).

$$0.36<|\beta 34W|<0.56 \tag{206'}$$

Moreover, it is more preferable that the zoom lens satisfies the following conditional expression (206") instead of conditional expression (206).

$$0.39<|\beta 34W|<0.53 \tag{206"}$$

It is preferable that the zoom lens according to the embodiments of the present invention satisfies the following conditional expression (207).

$$0.90<|\beta 34T|<1.80 \tag{207}$$

where,

β34T denotes the magnification of the combined system of the third lens group and the fourth lens group at the telephoto end, and is a magnification at the time of infinite object point focusing.

Conditional expression (207) is an expression which regulates the magnification of the combined system of the third lens group and the fourth lens group at the telephoto end. By satisfying conditional expression (207), widening of the angle of field and slimming are possible.

When an upper limit value of conditional expression (207) is surpassed, the F-value at the telephoto end is susceptible to become high. Whereas, when a lower limit value of conditional expression (207) is surpassed, the magnification β2W (at the time of infinite object point focusing) of the second lens group at the wide angle end becomes excessively small. Therefore, it becomes difficult to make high the zooming (increase in magnification) ratio as the overall zoom lens system.

Here, it is preferable that the zoom lens satisfies the following conditional expression (207') instead of conditional expression (207).

$$1.00 < |\beta 34T| < 1.35 \quad (207')$$

Moreover, it is more preferable that the zoom lens satisfies the following conditional expression (207") instead of conditional expression (207).

$$1.04 < |\beta 34T| < 1.28 \quad (207'')$$

Moreover, in the zoom lens according to the embodiments of the present invention, it is preferable that the direction of movement of the fourth lens group at the time of zooming is toward the object side all the time.

When such an arrangement is made, an effect of increase in magnification in the combined system of the third lens group and the fourth lens group increases. Therefore, it is possible to improve an efficiency of zooming in the overall zoom lens system. Particularly, the effect is exerted at the time of carrying out zooming more toward the telephoto end while maintaining a focusing state toward an object. An order of focusing and zooming may be arbitrary, and the focusing and zooming may be carried out simultaneously or concurrently.

Moreover, in the zoom lens according to the embodiments of the present invention, it is preferable that the fourth lens group includes in order from the object side, a lens component having a positive refractive power and a lens component having a negative refractive power.

By making such an arrangement, it is possible to position principal points of the fourth lens group on the object side. Accordingly, at the telephoto end where an amount of drawing is the maximum, it is possible to keep a distance from the third lens group substantially widened in advance. As a result, it is possible to carry out focusing to an object at a closer distance by drawing the fourth lens group toward the object side. Each of the lens components is one of a single lens and a cemented lens, and has two optical surfaces which are in contact with air.

Moreover, it is preferable that the zoom lens according to the embodiments of the present invention satisfies the following conditional expression (208).

$$-0.3 < (R42F - R42R)/(R42F + R42R) < 0.6 \quad (208)$$

where,

R42F denotes a paraxial radius of curvature of a surface nearest to the object side of the lens component having a negative refractive power in the fourth lens group, and R42R denotes a paraxial radius of curvature of a surface nearest to an image side of the lens component having a negative refractive power in the fourth lens group.

Conditional expression (208) is an expression which regulates a shape (indicated by a reciprocal of a shape factor) of the negative lens component in the fourth lens group. By satisfying conditional expression (208), it is possible to suppress the occurrence of the coma aberration and curvature of field.

When an upper limit value of conditional expression (208) is surpassed, correction of the spherical aberration, the coma aberration, and the meridional curvature of field is susceptible to be difficult. Whereas, when a lower limit value of conditional expression (208) is surpassed, it becomes difficult to position the principal points of the fourth lens group on the object side. In this case, at the telephoto end, it becomes difficult to secure a space for moving for focusing of the fourth lens group. As a result, it is difficult to shorten the overall length of the optical system.

Here, it is preferable that the zoom lens satisfies the following conditional expression (208') instead of conditional expression (208).

$$-0.2 < (R42F - R42R)/(R42F + R42R) < 0.4 \quad (208')$$

Moreover, it is more preferable that the zoom lens satisfies the following conditional expression (208") instead of conditional expression (208).

$$-0.1 < (R42F - R42R)/(R42F + R42R) < 0.2 \quad (208'')$$

In the zoom lens according to the embodiments of the present invention, it is preferable that the lens component having a negative refractive power in the fourth lens group is a cemented lens, and the cemented lens includes in order from the object side, a single lens having a positive refractive power, and a single lens having a negative refractive power, and the zoom lens satisfies the following conditional expression (209).

$$-0.5 < (R422F + R422R)/(R422F - R422R) < 1.2 \quad (209)$$

where,

R422F denotes a paraxial radius of curvature of a surface nearest to the object side of the single lens having a negative refractive power in the fourth lens group, and R422R denotes a paraxial radius of curvature of a surface nearest to an image side of the single lens having a negative refractive power in the fourth lens group.

Conditional expression (209) is an expression which regulates a shape (indicated by a reciprocal of a shape factor) of the negative lens in the cemented lens of the fourth lens group. By satisfying conditional expression (209), it is possible to suppress the occurrence of the coma aberration and the curvature of field.

When an upper limit value of conditional expression (209) is surpassed, correction of the coma aberration and the meridional curvature of field are susceptible to become difficult. Whereas, when a lower limit value of conditional expression (209) is surpassed, it becomes difficult to position the principal points of the fourth lens group on the object side. In this case, at the telephoto end, it becomes difficult to secure a space for moving for focusing of the fourth lens group. As a result, it is difficult to shorten the overall length of the optical system.

Here, it is preferable that the zoom lens satisfies the following conditional expression (209') instead of conditional expression (209).

$$-0.2 < (R422F + R422R)/(R422F - R422R) < 0.6 \quad (209')$$

Moreover, it is more preferable that the zoom lens satisfies the following conditional expression (209") instead of conditional expression (209).

$$-0.1 < (R422F + R422R)/(R422F - R422R) < 0.4 \quad (209'')$$

Moreover, in the zoom lens according to the embodiments of the present invention, it is preferable that the third lens group includes in order from the object side, two lens components namely, a lens component having a positive refractive power and a lens component having a negative refractive power.

When such an arrangement is made, it is possible to position the principal points of the fourth lens group on the object side. As a result, it is possible to shorten the overall length of the zoom lens. Each lens component is one of a single lens and a cemented lens, and has two optical surfaces which are in contact with air.

Moreover, it is preferable that the zoom lens according to the embodiments of the present invention satisfies the following conditional expression (210).

$$0.1 < (R32F - R32R)/(R32F + R32R) < 5.0 \quad (210)$$

where,

R32F denotes a paraxial radius of curvature of a surface nearest to the object side of the lens component having a negative refractive power in the third lens group, and R32R denotes a paraxial radius of curvature of a surface nearest to an image side of the lens component having a negative refractive power in the third lens group.

Conditional expression (210) is an expression which regulates a shape (indicated by a reciprocal of a shape factor) of the lens component having a negative refractive power in the third lens group. By satisfying conditional expression (210), it is possible to shorten the overall length of the zoom lens.

When an upper limit value of conditional expression (210) is surpassed, although it is advantageous for shortening the overall length of the zoom lens, correction of the spherical aberration and the coma aberration over the entire zooming area is susceptible to become difficult. Whereas, when a lower limit value of conditional expression (210) is surpassed, since it becomes difficult to position principal points of the third lens group on the object side, shortening of the overall length of the zoom lens becomes difficult.

Here, it is preferable that the zoom lens satisfies the following conditional expression (210') instead of conditional expression (210).

$$0.2 < (R32F - R32R)/(R32F + R32R) < 2.5 \quad (210')$$

Moreover, it is more preferable that the zoom lens satisfies the following conditional expression (210") instead of conditional expression (210).

$$0.4 < (R32F - R32R)/(R32F + R32R) < 1.2 \quad (210'')$$

In the zoom lens according to the embodiments of the present invention, it is preferable that the last lens group includes a lens component having a positive refractive power.

As a zoom lens system, the zoom lens may be complete with lens groups from the first lens group up to the fourth lens group. However, in the zoom lens having a high zooming ratio with a wide angle of field (at the wide angle end) as in the embodiments of the present invention, since the focal length of the first lens group is long and the zooming from the second lens group up to the fourth lens group and a region of appropriate magnification of a focal position correction lens group tend to be somewhat high, for letting the focal length to be a desired focal length, a lens group which reduces the overall magnification is necessary. Therefore, in the zoom lens according to the embodiments of the present invention, the last lens group is provided at the image side of the fourth lens group, and the last lens group is let to have a positive refractive power, and is let to have a magnification of less than +1. The lens component is a single lens or a cemented lens, and has two optical surfaces which are in contact with air.

It is preferable that the zoom lens according to the embodiments of the present invention satisfies the following conditional expression (211).

$$0.70 < |\beta FW| < 0.98 \quad (211)$$

where,

βFW denotes a magnification of the last lens group at the wide angle end, and is a magnification at the time of infinite object point focusing.

Conditional expression (211) is an expression which regulates the magnification of the last lens group at the wide angle end. By satisfying conditional expression (211), it is possible to suppress the occurrence of various oblique aberrations.

When an upper limit value of conditional expression (211) is surpassed, it becomes difficult to achieve a zoom lens having a high zooming ratio with a wide angle of field (at the wide angle end). Whereas, when a lower limit value of conditional expression (211) is surpassed, since the refractive power of the last lens group becomes strong, the height of oblique beam passing through the last lens group is susceptible to become high. As a result, correction of various oblique aberrations becomes difficult.

Here, it is preferable that the zoom lens satisfies the following conditional expression (211') instead of conditional expression (211).

$$0.73 < |\beta FW| < 0.94 \quad (211')$$

Moreover, it is more preferable that the zoom lens satisfies the following conditional expression (211") instead of conditional expression (211).

$$0.76 < |\beta FW| < 0.90 \quad (211'')$$

It is preferable that the zoom lens according to the embodiments of the present invention satisfies the following conditional expression (212).

$$0.4 < f4/fF < 1.2 \quad (212)$$

where, f4 denotes a focal length of the fourth lens group, and fF denotes a focal length of the last lens group.

Conditional expression (212) is an expression which regulates a ratio of the focal length of the fourth lens group and the focal length of the last lens group. By satisfying conditional expression (212), it is possible to realize a zoom lens which is slim, and which has a wide angle of field and a high zooming ratio.

When an upper limit value of conditional expression (212) is surpassed, since the focal length of the fourth lens group becomes long, an amount of movement of the fourth lens group at the time of zooming and focusing becomes large. Whereas, when a lower limit value of conditional expression (212) is surpassed, since the focal length of the last lens group becomes long, it becomes difficult to achieve a wide angle of field and a high zooming ratio.

Here, it is preferable that the zoom lens satisfies the following conditional expression (212') instead of conditional expression (212).

$$0.5 < f4/fF < 1.0 \quad (212')$$

Moreover, it is more preferable that the zoom lens satisfies the following conditional expression (212") instead of conditional expression (212).

$$0.6 < f4/fF < 0.95 \quad (212'')$$

It is preferable that the zoom lens according to the embodiments of the present invention satisfies the following conditional expression (213).

$$0.40 < f4/f3 < 1.00 \quad (213)$$

where, f3 denotes a focal length of the third lens group, and f4 denotes a focal length of the fourth lens group.

Conditional expression (213) is an expression which regulates a ratio of the focal length of the fourth lens group and the focal length of the third lens group. By satisfying conditional expression (213), it is possible to realize a zoom lens which is slim, and in which the focusing is carried out by the fourth lens group.

When an upper limit value of conditional expression (213) is surpassed, since the focal length of the fourth lens group becomes long, the amount of movement of the fourth lens group at the time of zooming and focusing becomes large. Or, since the focal length of the third lens group becomes short, back focus becomes excessively short. Whereas, when a lower limit value of conditional expression (213) is surpassed, the focal length of the third lens group becomes long. In this case, since the magnification of the fourth lens group either exceeds −1 or comes closer to −1, the focusing by the fourth lens group becomes impossible.

Here, it is preferable that the zoom lens satisfies the following conditional expression (213') instead of conditional expression (213).

$$0.65 < f4/f3 < 0.85 \quad (213')$$

It is more preferable that the zoom lens satisfies the following conditional expression (213") instead of conditional expression (213).

$$0.72 < f4/f3 < 0.80 \quad (213'')$$

Moreover, it is preferable that the zoom lens according to the embodiments of the present invention satisfies the following conditional expression (214).

$$4.0 < f4/fW < 10.0 \quad (214)$$

where,
f4 denotes a focal length of the fourth lens group, and
fW denotes the focal length of the overall zoom lens system at the wide angle end, and is a focal length at the time of infinite object point focusing.

Conditional expression (214) is an expression which regulates a ratio of the focal length of the fourth lens group and the focal length of the overall zoom lens system at the wide angle end. By satisfying conditional expression (214), it is possible to have a zoom lens which is slim, and to suppress the occurrence of aberration due to decentering.

When an upper limit value of conditional expression (214) is surpassed, since the focal length of the fourth lens group becomes long, the amount of movement of the fourth lens group at the time of zooming and focusing becomes large. Whereas, when a lower limit value of conditional expression (214) is surpassed, a decentering sensitivity and an aberration fluctuation due to zooming are susceptible to increase. As a result, the spherical aberration and the coma aberration in particular, are deteriorated.

Here, it is preferable that the zoom lens satisfies the following conditional expression (214') instead of conditional expression (214).

$$4.8 < f4/fW < 7.0 \quad (214')$$

Moreover, it is more preferable that the zoom lens satisfies the following conditional expression (214") instead of conditional expression (214).

$$5.1 < f4/fW < 6.0 \quad (214'')$$

It is preferable that the zoom lens according to the embodiments of the present invention satisfies the following conditional expression (215).

$$-2.00 < ff4/f4 < -1.00 \quad (215)$$

where,
f4 denotes a focal length of the fourth lens group, and
ff4 denotes a distance from an apex of a lens nearest to the object side of the fourth lens group up to a front-side focal position of the fourth lens group.

Conditional expression (215) is an expression which regulates a ratio of the focal length of the fourth lens group and the distance from the apex of the lens nearest to the object side of the fourth lens group up to the front-side focal position of the fourth lens group. By satisfying conditional expression (215), it is possible to make the overall zoom lens system slim, and to suppress the occurrence of the oblique aberration.

When an upper limit value of conditional expression (215) is surpassed, the third lens group and the fourth lens group are susceptible to come closer. In this case, securing of focusing space at the telephoto end of the fourth lens group is susceptible to become difficult. Whereas, when a lower limit value of conditional expression (215) is surpassed, since an off-axis beam height in particular, at the fourth lens group becomes high, correction of the oblique aberration becomes difficult.

Here, it is more preferable that the zoom lens satisfies the following conditional expression (215') instead of conditional expression (215).

$$-1.50 < ff4/f4 < -1.10 \quad (215')$$

Moreover, it is more preferable that the zoom lens satisfies the following conditional expression (215") instead of conditional expression (215).

$$-1.35 < ff4/f4 < -1.15 \quad (215'')$$

It is preferable that the zoom lens according to the embodiments of the present invention satisfies the following conditional expression (216).

$$0.50 < fb3/f3 < 1.5 \quad (216)$$

where,
f3 denotes a focal length of the third lens group, and
fb3 denotes a distance from an apex of a lens nearest to an image side of the third lens group up to a rear-side focal position of the third lens group.

Conditional expression (216) is an expression which regulates a ratio of the distance from the apex of the lens nearest to the image side of the third lens group up to the rear-side focal position of the third lens group and the focal length of the third lens group. By satisfying conditional expression (216), it is possible to make the zoom lens slim, and to suppress the occurrence of the oblique aberration.

When an upper limit value of conditional expression (216) is surpassed, it is disadvantageous for shortening the overall length of the zoom lens. Whereas, when a lower limit value of conditional expression (216) is surpassed, the coma aberration is susceptible to be deteriorated.

Here, it is preferable that the zoom lens satisfies the following conditional expression (216') instead of conditional expression (216).

$$0.72 < fb3/f3 < 1.1 \quad (216')$$

Moreover, it is more preferable that the zoom lens satisfies the following conditional expression (216") instead of conditional expression (216).

$$0.82 < fb3/f3 < 1.0 \quad (216'')$$

It is preferable that the zoom lens according to the embodiments of the present invention satisfies the following conditional expression (217).

$$9 < f1/fW < 18 \quad (217)$$

where,
f1 denotes a focal length of the first lens group, and
fW denotes the focal length of the overall zoom lens system at the wide angle end, and is the focal length at the time of infinite object point focusing.

Conditional expression (217) is an expression which regulates a ratio of the focal length of the first lens group and the focal length of the overall zoom lens system at the wide angle end. By satisfying conditional expression (217), it is possible to achieve a high zooming ratio, and to suppress occurrence of various aberrations.

When an upper limit value of conditional expression (217) is surpassed, it is disadvantageous for making the zooming ratio high. Whereas, when a lower limit of conditional expression (217) is surpassed, widening of the angle of field, correction of the meridional curvature of field and coma aberration at the wide angle end, and correction of longitudinal chromatic aberration and the spherical aberration at the telephoto end become difficult.

Here, it is preferable that the zoom lens satisfies the following conditional expression (217') instead of conditional expression (217).

$$10.5 < f1/fW < 17 \qquad (217')$$

Moreover, it is more preferable that the zoom lens satisfies the following conditional expression (217") instead of conditional expression (217).

$$11.5 < f1/fW < 16 \qquad (217'')$$

It is preferable that the zoom lens according to the embodiments of the present invention satisfies the following conditional expression (218).

$$-0.5 < fW/f123T < 0.10 \qquad (218)$$

where, fW denotes the focal length of the overall zoom lens system at the wide angle end, f123T denotes a focal length of a combined system from the first lens group up to the third lens group at the telephoto end, and each of fW and f123T is a focal length at the time of infinite object focusing.

Conditional expression (218) is an expression which regulates a ratio of the focal length of the overall zoom lens system at the wide angle end and the focal length of the combined system from the first lens group up to the third lens group at the telephoto end. By satisfying conditional expression (218), it is possible to achieve a high zooming ratio and to suppress occurrence of various aberrations.

When an upper limit value of conditional expression (218) is surpassed, it is disadvantageous for widening of angle (of field) and correction of the meridional curvature of field and the coma aberration at the wide angle end, and correction of the longitudinal chromatic aberration and the spherical aberration at the telephoto end. Whereas, when a lower limit value of conditional expression (218) is surpassed, it is disadvantageous for achieving a high zooming ratio.

Here, it is preferable that the zoom lens satisfies the following conditional expression (218') instead of conditional expression (218).

$$-0.4 < fW/f123T < 0.04 \qquad (218')$$

Moreover, it is more preferable that the zoom lens satisfies the following conditional expression (218") instead of conditional expression (218).

$$-0.3 < fW/f123T < 0.02 \qquad (218'')$$

When the last lens group is moved toward the object side at the time of zooming from the wide angle end to the telephoto end, it is advantageous since there is an effect of negating a fluctuation in the meridional curvature of field and the coma aberration at the time of zooming. However, when the last lens group is moved toward the object side, particularly near the telephoto end, error sensitivity for an error such as decentering tends to increase. When it is taken into consideration that the error sensitivity increases due to making the last lens group movable, it is preferable to let the last lens group to be fixed at the time of zooming.

A zoom lens according to the embodiments of the present invention includes in order from an object side, a first lens group having a positive refractive power, a second lens group having a negative refractive power, a third lens group having a positive refractive power, a fourth lens group having a positive refractive power, and a last lens group having a positive refractive power, and at the time of zooming from the wide angle end to the telephoto end, the first lens group is fixed, the second lens group moves toward a side of an image plane, the third lens group is fixed, and the fourth lens group moves, and at the time of focusing, the fourth lens group moves, and the second lens group includes in order from the object side, an object-side negative lens of which, a surface on an image side has a sharp curvature, a lens having a refractive power smaller than the refractive power of the overall second lens group, and a cemented lens of a negative lens and a positive lens, and the zoom lens satisfies the following conditional expression (301).

$$0.07 < |f2|/fT < 0.35 \qquad (301)$$

where, f2 denotes a focal length of the second lens group, and fT denotes a focal length of the overall zoom lens system at the telephoto end, and is a focal length at the time of infinite object point focusing.

In the zoom lens according to the embodiments of the present invention, the zoom lens includes at least five lens groups. Accordingly, it is possible to realize widening of an angle of field of an optical system, a high aperture ratio, and a high zooming ratio. Moreover, at the time of zooming from the wide angle end to the telephoto end, in the zoom lens according to the embodiments of the present invention, only the second lens group and the fourth lens group are moved. By making such an arrangement, minimizing number of movable lens groups as well as reducing weight of the movable lens groups is realized. Moreover, the fourth lens group is imparted a role of focusing and correcting focal position in addition to zooming. Accordingly, the number of movable lens groups is minimized. For minimizing the number of movable lens groups, both the first lens group and the third lens group are fixed at the time of zooming, at the time of correcting focal position, and at the time of focusing. Moreover, the last lens group may be let to be fixed at the time of zooming, at the time of correcting focal position, and at the time of focusing, similarly as the first lens group and the third lens group.

Incidentally, in the conventional zoom lenses, an arrangement has been such that, majority of the zooming ratio is achieved by movement of the second lens group, and the fourth lens group mainly carries out the correction of focal position and focusing. In such arrangement, it is extremely difficult to realize a zoom lens with a wide angle of field and high zooming ratio (for example, diagonal angle of field more than 75 degrees, and zooming ratio more than 10 times). Therefore, in the zoom lens according to the embodiments of the present invention, an arrangement is made such that a zooming function is assigned to a lens group positioned on an image side of the third lens group. By making such an arrangement, it is possible to increase the zooming ratio while widening the angle of field. Furthermore, as the angle of field is widened more and more, although an aberration correction in the first lens group and the second lens group becomes difficult, by making the arrangement as described above, it is possible to ease the difficulty.

An arrangement of lens groups may be made such that, the first lens group includes one negative lens, the second lens group includes one positive lens, the third lens group includes two lens components, the fourth lens group includes two lens components, and the last lens group includes one lens component.

Furthermore, in the zoom lens according to the embodiments of the present invention, the second lens group includes in order from the object side, an object-side negative lens of which, a surface on an image side has a sharp curvature, a lens having a smaller refractive power, and a cemented lens of a negative lens and a positive lens, and the zoom lens satisfies the following conditional expression (301). Conditional expression (301) is an expression in which, a ratio of the focal length of the second lens group with respect to the ratio of the focal length of the overall zoom lens system at the wide angle end is regulated. By satisfying conditional expression (301), it is possible to realize a zoom lens in which the curvature of field and the coma aberration are corrected favorably, and which has a high zooming ratio.

When an upper limit value of conditional expression (301) is surpassed, it becomes difficult to achieve a high zooming ratio. Whereas, when a lower limit value of conditional expression (301) is surpassed, it becomes difficult to correct the coma aberration and the meridional curvature of field of an area around image, at the wide angle end.

Here, it is preferable that the zoom lens satisfies the following conditional expression (301') instead of conditional expression (301).

$$0.10 < |f21|/fT < 0.28 \tag{301'}$$

Moreover, it is more preferable that the zoom lens satisfies the following conditional expression (301") instead of conditional expression (301).

$$0.12 < |f21|/fT < 0.24 \tag{301''}$$

Furthermore, it is even more preferable that the zoom lens satisfies the following conditional expression (301''') instead of conditional expression (301).

$$0.14 < |f21|/fT < 0.20 \tag{301'''}$$

It is preferable that the zoom lens according to the embodiments of the present invention satisfies the following conditional expression (302).

$$-0.18 < f2/f1 < -0.06 \tag{302}$$

where,
f1 denotes a focal length of the first lens group, and
f2 denotes a focal length of the second lens group.

Conditional expression (302) is an expression in which, a ratio of the focal length of the first lens group and the focal length of the second lens group is regulated, and is a condition for acquiring a high zooming ratio while widening the angle (of field).

When an upper limit value of conditional expression (302) is surpassed, it becomes difficult to widen further the angle of field. Whereas, when a lower limit of conditional expression (302) is surpassed, it becomes difficult to achieve a high zooming ratio.

Here, it is preferable that the zoom lens satisfies the following conditional expression (302') instead of conditional expression (302).

$$-0.16 < f2/f1 < -0.06 \tag{302'}$$

Moreover, it is more preferable that the zoom lens satisfies the following conditional expression (302") instead of conditional expression (302).

$$-0.15 < f2/f1 < -0.06 \tag{302''}$$

It is preferable that the zoom lens according to the embodiments of the present invention satisfies the following conditional expression (303).

$$0.07 < R21R/(fT \cdot \tan \omega W) < 0.28 \tag{303}$$

where,
R21R denotes a paraxial radius of curvature of the image-side surface of the object-side negative lens in the second lens group,
fT denotes a focal length of the overall zoom lens system at the telephoto end, and is a focal length at the time of infinite object point focusing, and
ωW denotes the maximum half angle of field at the wide angle end (including distortion).

Conditional expression (303) is an expression in which, the curvature of the surface on the image side of the objet-side negative lens is regulated. It is necessary to make a focal length of the object-side negative lens in the second lens group significantly shorter than a focal length at the telephoto end. However, when aberration correction is also taken into consideration, it is necessary to make the curvature of the surface on the image side of the object-side negative lens significantly sharp. Therefore, it is necessary that the zoom lens satisfies conditional expression (303).

When an upper limit value of conditional expression (303) is surpassed, it becomes difficult to achieve a high zooming ratio. Whereas, when a lower limit value of conditional expression (303) is surpassed, since an occurrence of the oblique aberration at the wide angle end becomes large, it becomes difficult to further widen the angle (of field).

It is preferable that the zoom lens satisfies the following conditional expression (303') instead of conditional expression (303).

$$0.10 < R21R/(fT \cdot \tan \omega W) < 0.26 \tag{303'}$$

Moreover, it is more preferable that the zoom lens satisfies the following conditional expression (303") instead of conditional expression (303).

$$0.12 < R21R/(fT \cdot \tan \omega W) < 0.24 \tag{303''}$$

It is preferable that the zoom lens according to the embodiments of the present invention satisfies the following conditional expression (304).

$$-0.10 < f21/f2B < 0.25 \tag{304}$$

where,
f21 denotes a focal length of the object-side negative lens in the second lens group, and
f2B denotes a focal length of the cemented lens in the second lens group.

Conditional expression (304) is an expression in which, a ratio of the focal length of the object-side negative lens and the focal length of the cemented lens in the second lens group is regulated. When the angle of field is widened, since the height of the off-axis (oblique) beam in the first lens group and the second lens group increases, correction of aberration becomes difficult. Therefore, it is preferable that the zoom lens satisfies conditional expression (304).

When an upper limit value of conditional expression (304) is surpassed, the refractive power is biased (inclined) to the object-side negative lens. Therefore, correction of distortion and the coma aberration in the second lens group becomes difficult. Whereas, when a lower limit value of conditional expression (304) is surpassed, an entrance-pupil position becomes excessively far from a surface nearest to the object side. In this case, the oblique beam height in the first lens group and the second lens group is susceptible to increase (to become high). As a result, a fluctuation in the oblique aberration which occurs due to magnification, such as the chromatic aberration of magnification, is susceptible to increase (to become large).

Here, it is preferable that the zoom lens satisfies the following conditional expression (304') instead of conditional expression (304).

$$-0.09 < f21/f2B < 0.21 \tag{304'}$$

Moreover, it is more preferable that the zoom lens satisfies the following conditional expression (304") instead of conditional expression (304).

$$-0.08 < f21/f2B < 0.19 \tag{304''}$$

It is preferable that the zoom lens according to the embodiments of the present invention satisfies the following conditional expression (305).

$$-30 < v21 - v23 < 15 \tag{305}$$

where, v21 denotes Abbe's number for the object-side negative lens in the second lens group, v23 denotes Abbe's number for the negative lens in the cemented lens in the second lens group, and v24 denotes Abbe's number for the positive lens in the cemented lens in the second lens group, and v24≤24.

Larger the amount of aberration occurring in each lens group, larger is the fluctuation in the longitudinal chromatic aberration and the chromatic aberration of magnification occurring due to magnification. Therefore, it is preferable to correct the aberration for each lens group. However, in a case of a lens group which is thick, even when cancelled for the lens group as a whole, when there is an insufficient correction at one of the two ends and an excess correction at the other end, the fluctuation in aberration is susceptible to occur. Therefore, it is preferable that the zoom lens satisfies conditional expression (305).

When one of an upper limit value and a lower limit value of conditional expression (305) is surpassed, even when the fluctuation in the longitudinal chromatic aberration has been corrected, it becomes difficult to correct sufficiently the fluctuation in the chromatic aberration of magnification.

Here, it is more preferable that the zoom lens satisfies the following conditional expression (305') instead of conditional expression (305).

$$-25 < v21 - v23 < 12 \tag{305'}$$

Moreover, it is more preferable that the zoom lens satisfies the following conditional expression (305") instead of conditional expression (305).

$$-22 < v21 - v23 < 10 \tag{305''}$$

In the zoom lens according to the embodiments of the present invention, it is preferable that the first lens group includes in order from the object side, a cemented lens of a negative lens and a positive lens, and a positive meniscus lens having a convex surface directed toward the object side, and the zoom lens satisfies the following conditional expression (306).

$$-0.5 < R13R/R21F < 1.2 \tag{306}$$

where,

R13R denotes a paraxial radius of curvature of a surface nearest to the image side of the first lens group, and R21F denotes a paraxial radius of curvature of a surface nearest to the object side of the second lens group.

For widening the angle of field of a zoom lens with a high zooming ratio, it is necessary to make a refractive power of the object-side negative lens in the second lens group relatively strong. Therefore, although a shape of a surface of the object-side negative lens is a meniscus shape, it is preferable to set a curvature of a surface on the object side to a value from a small positive value to a negative value (becomes biconcave), so that a curvature of a surface on the image plane side does not become excessively large. On the other hand, it is preferable that the first lens group includes in order from the object side, a cemented lens component of a negative lens and a positive lens, and a positive meniscus lens having a convex surface directed toward the object side. At this time, for avoiding interference between the positive meniscus lens and the object-side negative lens, it is preferable that the zoom lens satisfies conditional expression (306).

When an upper limit value of conditional expression (306) is surpassed, it becomes difficult to achieve both of a high zooming rate and a wide angle (of field) at the same time. Whereas, when a lower limit value of conditional expression (306) is surpassed, there is an interference (contact) between the positive meniscus lens (lens nearest to the image side in the first lens group) and the object-side negative lens (lens nearest to the object side in the second lens group).

Here, it is preferable that the zoom lens satisfies the following conditional expression (306') instead of conditional expression (306).

$$-0.2 < R13R/R21F < 1.1 \tag{306'}$$

Moreover, it is more preferable that the zoom lens satisfies the following conditional expression (306") instead of conditional expression (306).

$$0.0 < R13R/R21F < 1.0 \tag{306''}$$

In the zoom lens according to the embodiments of the present invention, it is preferable that the first lens group includes in order from the object side, a cemented lens of a negative lens and a positive lens, and a positive meniscus lens having a convex surface directed toward the object side, and the zoom lens satisfies the following conditional expression (307).

$$-1.6 < (R11F + R12R)/(R11F - R12R) < 0.6 \tag{307}$$

where,

R11F denotes a paraxial radius curvature of a surface nearest to the object side of the cemented lens in the first lens group, and R12R denotes a paraxial radius of curvature of a surface nearest to the image side of the cemented lens in the first lens group.

To achieve widening of the angle (of field) simultaneously with a high zooming ratio, it is preferable that the first lens group includes two positive lens components (out of which at least one is a cemented lens component). Concretely, it is preferable that the first lens group includes in order from the object side, the cemented lens component of the negative lens and the positive lens, and the positive meniscus lens having the convex surface directed toward the object side. Moreover, it is preferable that the zoom lens satisfies conditional expression (307).

Conditional expression (307) is an expression which regulates a shape (indicated by a reciprocal of a shape factor) of the cemented lens component in the first lens group. As an upper limit value of conditional expression (307) is surpassed, when the angle of field is widened, correction of the coma aberration and the meridional curvature of field (astigmatism) around the angle of field becomes difficult. Whereas, when a lower limit value of conditional expression (307) is surpassed, correction of the spherical aberration at the telephoto end becomes difficult.

Here, it is preferable that the zoom lens satisfies the following conditional expression (307') instead of conditional expression (307).

$$-1.5<(R11F+R12R)/(R11F-R12R)<0.7 \tag{307'}$$

Moreover, it is more preferable that the zoom lens system satisfies the following conditional expression (307") instead of conditional expression (307).

$$-1.4<(R11F+R12R)/(R11F-R12R)<0.8 \tag{307"}$$

Moreover, it is preferable that the zoom lens according to the embodiments of the present invention satisfies the following conditional expression (308).

$$9<f1/fW<18 \tag{308}$$

where, f1 denotes a focal length of the first lens group, and fW denotes the focal length of the overall zoom lens system at the wide angle end, and is the focal length at the time of infinite object point focusing.

Conditional expression (308) is an expression which regulates a ratio of the focal length of the first lens group and the focal length of the overall zoom lens system at the wide angle end. By satisfying conditional expression (308), it is possible to achieve a high zooming ratio, and to suppress occurrence of various aberrations.

When an upper limit value of conditional expression (308) is surpassed, it is disadvantageous for making the zooming ratio high. Whereas, when a lower limit value of conditional expression (308) is surpassed, it becomes difficult to carry out favorably, widening of the angle of field, correction of the meridional curvature of field and coma aberration at the wide angle end, and correction of longitudinal chromatic aberration and the spherical aberration at the telephoto end.

Here, it is preferable that the zoom lens satisfies the following conditional expression (308') instead of conditional expression (308).

$$10.5<f1/fW<17 \tag{308'}$$

Moreover, it is more preferable that the zoom lens satisfies the following conditional expression (308") instead of conditional expression (308).

$$11.5<f1/fW<16 \tag{308"}$$

In the zoom lens according to the embodiments of the present invention, it is preferable that the fourth lens group includes in order from the object side, a lens component having a positive refractive power and a lens component having a negative refractive power.

By making such an arrangement, it is possible to position principal points of the fourth lens group on the object side. Accordingly, at the telephoto end where the amount of drawing is large, it is possible to keep a distance from the third lens group substantially widened in advance. As a result, it is possible to carryout focusing to an object at a closer distance by drawing the fourth lens group toward the object side. Each of the lens components is one of a single lens and a cemented lens, and has two optical surfaces which are in contact with air.

It is preferable that the zoom lens according to the embodiments of the present invention satisfies the following conditional expression (309).

$$-0.3<(R42F-R42R)/(R42F+R42R)<0.6 \tag{309}$$

where,

R42F denotes a paraxial radius of curvature of a surface nearest to the object side of the lens component having a negative refractive power in the fourth lens group, and R42R denotes a paraxial radius of curvature of a surface nearest to an image side of the lens component having a negative refractive power in the fourth lens group.

Conditional expression (309) is an expression which regulates a shape (indicated by a reciprocal of a shape factor) of the negative lens component in the fourth lens group. By satisfying conditional expression (309), it is possible to suppress the occurrence of the coma aberration and the curvature of field.

When an upper limit value of conditional expression (309) is surpassed, correction of the spherical aberration, the coma aberration, and the meridional curvature of field is susceptible to become difficult. Whereas, when a lower limit value of conditional expression (309) is surpassed, it becomes difficult to position the principal points of the fourth lens group on the object side. In this case, at the telephoto end, it becomes difficult to secure a space for moving for focusing of the fourth lens group. As a result, it is difficult to shorten the overall length of the optical system.

Here, it is preferable that the zoom lens satisfies the following conditional expression (309') instead of conditional expression (309).

$$-0.2<(R42F-R42R)/(R42F+R42R)<0.4 \tag{309'}$$

Moreover, it is more preferable that the zoom lens satisfies the following conditional expression (309") instead of conditional expression (309).

$$-0.1<(R42F-R42R)/(R42F+R42R)<0.2 \tag{309"}$$

In the zoom lens according to the embodiments of the present invention, it is preferable that the lens component having a negative refractive power in the fourth lens group is a cemented lens, and the cemented lens includes in order from the object side, a single lens having a positive refractive power, and a single lens having a negative refractive power, and the zoom lens satisfies the following conditional expression (310).

$$-0.5<(R422F+R422R)/(R422F-R422R)<1.2 \tag{310}$$

where,

R422F denotes a paraxial radius of curvature of a surface nearest to the object side of the single lens having a negative refractive power in the fourth lens group, and R422R denotes a paraxial radius of curvature of a surface nearest to an image side of the single lens having a negative refractive power in the fourth lens group.

Conditional expression (310) is an expression which regulates a shape (indicated by a reciprocal of a shape factor) of the negative lens in the cemented lens of the fourth lens group. By satisfying conditional expression (310), it is possible to suppress the occurrence of the coma aberration and the curvature of field.

When an upper limit value of conditional expression (310) is surpassed, correction of the coma aberration and the meridional curvature of field is susceptible to become difficult. Whereas, when a lower limit value of conditional expression (310) is surpassed, it becomes difficult to position the principal points of the fourth lens group on the object side. In this case, at the telephoto end, it becomes difficult to secure a space for moving for focusing of the fourth lens group. As a result, it is difficult to shorten the overall length of the optical system.

Here, it is preferable that the zoom lens satisfies the following conditional expression (310') instead of conditional expression (310).

$$-0.2<(R422F+R422R)/(R422F-R422R)<0.6 \quad (310')$$

Moreover, it is more preferable that the zoom lens satisfies the following conditional expression (310") instead of conditional expression (310).

$$-0.1<(R422F+R422R)/(R422F-R422R)<0.4 \quad (310")$$

In the zoom lens according to the embodiments of the present invention, it is preferable that the lens component having a positive refractive power in the fourth lens group is a single lens, and the zoom lens satisfies the following conditional expression (311).

$$-0.1<(R41F+R41R)/(R41F-R41R)<0.5 \quad (311)$$

where,

R41F denotes a paraxial radius of curvature of a surface nearest to the object side of the lens component having a positive refractive power in the fourth lens group, and R41R denotes a paraxial radius of curvature of a surface nearest to the image side of the lens component having a positive refractive power in the fourth lens group.

Conditional expression (311) is an expression which regulates a shape (indicated by a reciprocal of a shape factor) of the lens component having a positive refractive power in the fourth lens group. When an upper limit value of conditional expression (311) is surpassed, it is disadvantageous for shortening of the overall length of the zoom lens. Whereas, when a lower limit value of conditional expression (311) is surpassed, correction of the coma aberration and the meridional curvature of field (astigmatism) becomes difficult.

Here, it is preferable that the zoom lens satisfies the following conditional expression (311') instead of conditional expression (311).

$$0.0<(R41F+R41R)/(R41F-R41R)<0.4 \quad (311')$$

Moreover, it is more preferable that the zoom lens satisfies the following conditional expression (311") instead of conditional expression (311).

$$0.1<(R41F+R41R)/(R41F-R41R)<0.3 \quad (311")$$

In the zoom lens according to the embodiments of the present invention, it is preferable that the third lens group includes in order from the object side, two lens components namely a lens component having a positive refractive power and a lens component having a negative refractive power.

When such an arrangement is made, it is possible to position the principal points of the fourth lens group on the object side. As a result, it is possible to shorten the overall length of the zoom lens. Each lens component is one of a single lens and a cemented lens, and has two optical surfaces which are in contact with air.

It is preferable that the zoom lens according to the embodiments of the present invention satisfies the following conditional expression (312).

$$0.1<(R32F-R32R)/(R32F+R32R)<5.0 \quad (312)$$

where,

R32F denotes a paraxial radius of curvature of a surface nearest to the object side of the lens component having a negative refractive power in the third lens group, and R32R denotes a paraxial radius of curvature of a surface nearest to an image side of the lens component having a negative refractive power in the third lens group.

Conditional expression (312) is an expression which regulates a shape (indicated by a reciprocal of a shape factor) of the lens component having a negative refractive power in the third lens group. By satisfying conditional expression (312), it is possible to shorten the overall length of the zoom lens.

When an upper limit value of conditional expression (312) is surpassed, although it is advantageous for shortening the overall length of the zoom lens, correction of the spherical aberration and the coma aberration over the entire zooming area is difficult. Whereas, when a lower limit value of conditional expression (312) is surpassed, since it becomes difficult to position principal points of the third lens group on the object side, shortening of the overall length of the zoom lens becomes difficult.

Here, it is preferable that the zoom lens satisfies the following conditional expression (312') instead of conditional expression (312).

$$0.2<(R32F-R32R)/(R32F+R32R)<2.5 \quad (312')$$

Moreover, it is more preferable that the zoom lens satisfies the following conditional expression (312") instead of conditional expression (312).

$$0.4<(R32F-R32R)/(R32F+R32R)<1.2 \quad (312")$$

It is preferable that the zoom lens according to the embodiments of the present invention satisfies the following conditional expression (313).

$$0.3<\log(\beta 2T/\beta 2W)/\log \gamma <0.8 \quad (313)$$

where, $\beta 2W$ denotes a magnification of the second lens group at the wide angle end, $\beta 2T$ denotes a magnification of the second lens group at the telephoto end, fW denotes the focal length of the overall zoom lens system at the wide angle end, fT denotes the focal length of the overall zoom lens system at the telephoto end, and $\gamma=fT/fW$, and each of the magnification or the focal length is a magnification or a focal length at the time of infinite object point focusing.

Conditional expression (313) is an expression in which, the zooming (increase in magnification) of the second lens group with respect to the zooming ratio of the overall zoom lens system is regulated. Conditional expression (313) is a condition which suppresses an effect of increase in magnification of the second lens group such that an absolute value of magnification at the telephoto end of the second lens group does not exceed 1 by far. By satisfying conditional expression (313), it is possible to realize favorable correction of the spherical aberration and the coma aberration, and widening of the angle (of field).

When an upper limit value of conditional expression (313) is surpassed, the zooming is carried out almost by the movement of the second lens group only. In this case, the second lens group has to have a strong refractive power similarly as the first lens group. As the second lens group assumes strong refractive power, particularly at the wide angle end, since the beam height at these lens groups becomes high, further widening of the angle of field becomes difficult. Whereas, when a lower limit value of conditional expression (313) is surpassed, either a difference in an F-value at the wide angle end and an F-value at the telephoto end becomes large, or an axial beam height at the telephoto end becomes high. As the axial beam height at the telephoto end becomes high, correction of the spherical aberration and the coma aberration becomes difficult.

Here, it is preferable that the zoom lens satisfies the following conditional expression (313') instead of conditional expression (313).

$$0.45 < \log(\beta 2T/\beta 2W)/\log \gamma < 0.67 \quad (313')$$

Moreover, it is more preferable that the zoom lens satisfies the following conditional expression (313") instead of conditional expression (313).

$$0.50 < \log(\beta 2T/\beta 2W)/\log \gamma < 0.64 \quad (313")$$

It is preferable that the zoom lens according to the embodiments of the present invention satisfies the following conditional expression (314).

$$0.1 < |\beta 2W| < 0.30 \quad (314)$$

where,

β2W denotes a magnification of the second lens group at the wide angle end, and is a magnification at the time of infinite object point focusing.

Conditional expression (314) is an expression in which, the magnification (at the time of infinite object point focusing) of the second lens group at the wide angle end is regulated. When the magnification of the second lens group at the wide angle end is let to be a small value, an absolute value of magnification at the telephoto end of the second lens group does not exceed 1 by far. Therefore, it becomes easy to increase magnification by the combined system of the third lens group and the fourth lens group. As a result, it becomes easy for the zoom lens to satisfy conditional expression (314). Moreover, the focal length of the first lens group becomes long. Therefore, correction of the oblique aberration at the wide angle end and aberration throughout from longitudinal to oblique at the telephoto end becomes easy. Whereas, as the magnification at the wide angle end of the second lens group is made further smaller, taking to the extreme, that is zero, or in other words, when a state in which, there is no refractive power of the first lens group, the zooming effect of the second lens group ceases (in other words, it becomes a negative-lead type zoom lens). As the zooming effect of the second lens group ceases, since it becomes difficult to secure a high zooming ratio, it is not preferable to make the magnification at the wide angle end of the second lens group excessively small. Therefore, by satisfying conditional expression (314), it is possible to achieve a high zooming ratio in a state of the oblique aberration corrected favorably.

As an upper limit value of conditional expression (314) is surpassed, when the angle of field is widened, correction of the oblique aberration in particular, becomes difficult. Whereas, when a lower limit value of conditional expression (314) is surpassed, securing of a high zooming ratio becomes difficult.

Here, it is preferable that the zoom lens satisfies the following conditional expression (314') instead of conditional expression (314).

$$0.1 < |\beta 2W| < 0.24 \quad (314')$$

Moreover, it is more preferable that the zoom lens satisfies the following conditional expression (314") instead of conditional expression (314).

$$0.1 < |\beta 2W| < 0.22 \quad (314")$$

It is preferable that the zoom lens according to the embodiments of the present invention satisfies the following conditional expression (315).

$$0.20 < \log(\beta 34T/\beta 34W) < 0.9 \cdot \log \gamma \quad (315)$$

where,

β34W denotes a magnification of a combined system of the third lens group and the fourth lens group at the wide angle end, β34T denotes a magnification of the combined system of the third lens group and the fourth lens group at the telephoto end, fW denotes a focal length of the overall zoom lens system at the wide angle end, fT denotes a focal length of the overall zoom lens system at the telephoto end, and γ=fT/fW>7, and each of the magnification or the focal length is a magnification or a focal length at the time of infinite object point focusing.

Conditional expression (315) is an expression in which, the zooming (increase in magnification) ratio of a combined system of the third lens group and the fourth lens group is regulated. By satisfying conditional expression (315), it is possible to widen the angle of field as well as to make the zooming ratio high, in a state of the spherical aberration and the coma aberration corrected favorably.

When an upper limit value of conditional expression (315) is surpassed, either a difference in an F-value at the wide angle end and an F-value at the telephoto end becomes large or an axial ray height at the telephoto end becomes high. As the axial beam height at the telephoto end becomes high, correction of the spherical aberration and the coma aberration becomes difficult. Whereas, when a lower limit value of conditional expression (315) is surpassed, the zooming is carried out almost by the movement of the second lens group only. In this case, the second lens group has to have a strong refractive power similarly as the first lens group. As a result, particularly at the wide angle end, since the beam height at these lens groups becomes high, further widening of the angle of field becomes difficult.

Here, it is preferable that the zoom lens satisfies the following conditional expression (315') instead of conditional expression (315).

$$0.30 < \log(\beta 34T/\beta 34W) < 0.7 \cdot \log \gamma \quad (315')$$

Moreover, it is more preferable that the zoom lens satisfies the following conditional expression (315") instead of conditional expression (315).

$$0.35 < \log(\beta 34T/\beta 34W) < 0.55 \cdot \log \gamma \quad (315")$$

where,

γ=fT/fW>9.

Furthermore, it is even more preferable that the zoom lens satisfies the following conditional expression (315''') instead of conditional expression (315).

$$0.38 < \log(\beta 34T/\beta 34W) < 0.5 \cdot \log \gamma \quad (315''')$$

where,

γ=fT/fW>10.

It is more preferable that the zooming ratio γ (=fT/fW) is 9 or more than 9, and zooming ratio γ of 10 or more than 10 is even more preferable.

It is preferable that the zoom lens according to the embodiments of the present invention satisfies the following conditional expression (316).

$$0.30 < |\beta 34W| < 0.70 \quad (316)$$

where,

β34W denotes the magnification of the combined system of the third lens group and the fourth lens group at the wide angle end, and is a magnification at the time of infinite object point focusing.

Conditional expression (316) is an expression which regulates the magnification of the combined system of the third lens group and the fourth lens group at the wide angle end. By satisfying conditional expression (316), it is possible to widen the angle of field of the zoom lens and to slim the zoom lens.

When an upper limit value of conditional expression (316) is surpassed, it is necessary to shorten the focal length of the first lens group. When the focal length of the first lens group is shortened, the widening of the angle of field becomes difficult. Whereas, when a lower limit value of conditional expression (316) is surpassed, the fourth lens group and a lens group on the image side adjacent to the fourth lens group are susceptible to interfere. When a distance between the fourth lens group and the lens group on the image side adjacent to the fourth lens group is widened to prevent the interference, the overall length of the optical system becomes long.

Here, it is preferable that the zoom lens satisfies the following conditional expression (316') instead of conditional expression (316).

$$0.36 < |\beta 34W| < 0.56 \quad (316')$$

Moreover, it is more preferable that the zoom lens satisfies the following conditional expression (316") instead of conditional expression (316).

$$0.39 < |\beta 34W| < 0.53 \quad (316'')$$

In each of the abovementioned embodiments, the second lens group includes in order from the object side, an object-side negative lens, a lens having a refractive power smaller than a refractive power of the overall second lens group, and a cemented lens of a negative lens and a positive lens. Here, a surface on the image side of the object-side negative lens has a curvature sharper than a surface on the object side. Moreover, the fourth lens group has a function of correcting an image-plane fluctuation which occurs with zooming, and a function of focusing.

A zoom lens according to an embodiment of the present invention includes in order from an object side, a first lens group having a positive refractive power, a second lens group having a negative refractive power, a third lens group having a positive refractive power, a fourth lens group having a positive refractive power, and a last lens group having a positive refractive power, and at the time of zooming from a wide angle end to a telephoto end, the first lens group is fixed, the second lens group moves toward a side of an image plane, the third lens group is fixed, and the fourth lens group moves, and at the time of focusing, the fourth lens group moves, and the fourth lens group includes in order from the object side, a lens component having a positive refractive power and a lens component having a negative refractive power, and the zoom lens satisfies the following conditional expression (401).

$$-0.3 < (R42F - R42R)/(R42F + R42R) < 0.6 \quad (401)$$

where,

R42F denotes a paraxial radius of curvature of a surface nearest to the object side of the lens component having a negative refractive power in the fourth lens group, R42R denotes a paraxial radius of curvature of a surface nearest to an image side of the lens component having a negative refractive power in the fourth lens group, and each of the lens components is one of a single lens and a cemented lens, and has two optical surfaces which are in contact with air.

In the zoom lens according to the embodiment of the present invention, the zoom lens includes at least five lens groups. Accordingly, it is possible to realize widening of an angle of field of an optical system, a large aperture ratio, and a high zooming ratio. Moreover, at the time of zooming from the wide angle end to the telephoto end, in the zoom lens according to the embodiment of the present invention, only the second lens group and the fourth lens group are moved. By making such an arrangement, minimizing the number of movable lens groups as well as reducing weight of the movable lens groups is realized. Moreover, the fourth lens group is imparted a role of focusing and correcting focal position, in addition to zooming. Accordingly, the number of movable lens groups is minimized. For minimizing the number of movable lens groups, both the first lens group and the third lens group are fixed at the time of zooming, at the time of correcting focal position, and at the time of focusing. Moreover, the last lens group may be let to be fixed at the time of zooming, at the time of correcting focal position, and at the time of focusing, similarly as the first lens group and the third lens group.

Incidentally, in the conventional zoom lenses, an arrangement has been such that, majority of the zooming ratio is achieved by movement of the second lens group, and the fourth lens group mainly carries out the correction of focal position and focusing. In such an arrangement, it is extremely difficult to realize a zoom lens with a wide angle of field and a high zooming ratio (for example, diagonal angle of field more than 75 degrees, and zooming ratio more than 10 times). Therefore, in the zoom lens according to the embodiment of the present invention, an arrangement is made such that a zooming function is assigned to a lens group positioned on an image side of the third lens group. By making such an arrangement, it is possible to increase the zooming ratio while widening the angle of field. Furthermore, as the angle of field is widened more and more, although an aberration correction in the first lens group and the second lens group becomes difficult, by making the arrangement as described above, it is possible to ease the difficulty.

An arrangement of the lens groups may be such that, the first lens group includes one negative lens, the second lens group includes one positive lens, the third lens group includes two lens components, the fourth lens group includes two lens components, and the last lens group includes one lens component.

Furthermore, in the zoom lens according to the embodiments of the present invention, the fourth lens group includes in order from the object side, a lens component having a positive refractive power and a lens component having a negative refractive power, and the zoom lens satisfies conditional expression (401).

By the fourth lens group including in order from the object side, the lens component having a positive refractive power and the lens component having a negative refractive power, it is possible to position principal points of the fourth lens group on the object side. Accordingly, at the telephoto end where an amount of drawing is the maximum, it is possible to keep a distance from the third lens group substantially widened in advance. As a result, it is possible to carry out focusing to an object at a closer distance by drawing the fourth lens group toward the object side. Each of the lens components is one of a single lens and a cemented lens, and has two optical surfaces which are in contact with air.

Conditional expression (401) is an expression which regulates a shape (indicated by a reciprocal of a shape factor) of the negative lens component in the fourth lens group. By satisfying conditional expression (401), it is possible to suppress the occurrence of the coma aberration and the curvature of field.

When an upper limit value of conditional expression (401) is surpassed, correction of the spherical aberration, the coma aberration, and the meridional curvature of field is susceptible to become difficult. Whereas, when a lower limit value of conditional expression (401) is surpassed, it becomes difficult to position the principal points of the fourth lens group on the object side. In this case, at the telephoto end, it becomes difficult to secure a space for moving for focusing of (by) the fourth lens group. As a result, it is difficult to shorten the overall length of the optical system.

Here, it is preferable that the zoom lens satisfies the following conditional expression (401') instead of conditional expression (401).

$$-0.2<(R42F-R42R)/(R42F+R42R)<0.4 \quad (401')$$

Moreover, it is more preferable that the zoom lens satisfies the following conditional expression (401") instead of conditional expression (401).

$$-0.1<(R42F-R42R)/(R42F+R42R)<0.2 \quad (401")$$

In the zoom lens according to the embodiments of the present invention, it is preferable that the lens component having a negative refractive power in the fourth lens group is a cemented lens, and the cemented lens in the fourth lens group includes in order from the object side, a single lens having a positive refractive power and a single lens having a negative refractive power, and the zoom lens satisfies the following conditional expression (402).

$$-0.5<(R422F+R422R)/(R422F-R422R)<1.2 \quad (402)$$

where,

R422F denotes a paraxial radius of curvature of a surface nearest to the object side of the single lens having a negative refractive power in the fourth lens group, and R422R denotes a paraxial radius of curvature of a surface nearest to an image side of the single lens having a negative refractive power in the fourth lens group.

Conditional expression (402) is an expression which regulates a shape (indicated by a reciprocal of a shape factor) of the negative lens in the cemented lens of the fourth lens group. By satisfying conditional expression (402), it is possible to suppress the occurrence of the coma aberration and the curvature of field.

When an upper limit value of conditional expression (402) is surpassed, correction of the coma aberration and the meridional curvature of field is susceptible to become difficult. Whereas, when a lower limit value of conditional expression (402) is surpassed, it becomes difficult to position the principal points of the fourth lens group on the object side. In this case, at the telephoto end, it becomes difficult to secure a space for moving for focusing of the fourth lens group. As a result, it is difficult to shorten the overall length of the optical system.

Here, it is preferable that the zoom lens satisfies the following conditional expression (402') instead of conditional expression (402).

$$-0.2<(R422F+R422R)/(R422F-R422R)<0.6 \quad (402')$$

Moreover, it is more preferable that the zoom lens satisfies the following conditional expression (402") instead of conditional expression (402).

$$-0.1<(R422F+R422R)/(R422F-R422R)<0.4 \quad (402")$$

In the zoom lens according to the embodiments of the present invention, it is preferable that the lens component having a positive refractive power in the fourth lens group is a single lens, and the zoom lens satisfies the following conditional expression (403).

$$-0.1<(R41F+R41R)/(R41F-R41R)<0.5 \quad (403)$$

where,

R41F denotes a paraxial radius of curvature of a surface nearest to the object side of the lens component having a positive refractive power in the fourth lens group, and R41R denotes a paraxial radius of curvature of a surface nearest to the image side of the lens component having a positive refractive power in the fourth lens group.

Conditional expression (403) is an expression which regulates a shape (indicated by a reciprocal of a shape factor) of the lens component having a positive refractive power in the fourth lens group. When an upper limit value of conditional expression (403) is surpassed, it is disadvantageous for shortening of the overall length of the zoom lens. Whereas, when a lower limit value of conditional expression (403) is surpassed, correction of the coma aberration and the meridional curvature of field (astigmatism) becomes difficult.

Here, it is preferable that the zoom lens satisfies the following conditional expression (403') instead of conditional expression (403).

$$0.0<(R41F+R41R)/(R41F-R41R)<0.4 \quad (403')$$

Moreover, it is more preferable that the zoom lens satisfies the following conditional expression (403") instead of conditional expression (403).

$$0.1<(R41F+R41R)/(R41F-R41R)<0.3 \quad (403")$$

It is preferable that the zoom lens according to the embodiments of the present invention satisfies the following conditional expression (404).

$$4.0<f4/fW<10.0 \quad (404)$$

where, f4 denotes a focal length of the fourth lens group, and fW denotes the focal length of the overall zoom lens system at the wide angle end, and is a focal length at the time of infinite object point focusing.

Conditional expression (404) is an expression which regulates a ratio of the focal length of the fourth lens group and the focal length of the overall zoom lens system at the wide angle end. By satisfying conditional expression (404), it is possible to achieve a zoom lens which is slim, and to suppress the occurrence of aberration due to decentering.

When an upper limit value of conditional expression (404) is surpassed, since the focal length of the fourth lens group becomes long, an amount of movement of the fourth lens group at the time of zooming and focusing becomes large. Whereas, when a lower limit value of conditional expression (404) is surpassed, a decentering sensitivity and an aberration fluctuation due to zooming are susceptible to increase. As a result, the spherical aberration and the coma aberration in particular, are deteriorated.

Here, it is preferable that the zoom lens satisfies the following conditional expression (404') instead of conditional expression (404).

$$4.8<f4/fW<7.0 \quad (404')$$

Moreover, it is more preferable that the zoom lens satisfies the following conditional expression (404") instead of conditional expression (404).

$$5.1<f4/fW<6.0 \quad (404")$$

It is preferable that the zoom lens according to the embodiments of the present invention satisfies the following conditional expression (405).

$$-2.00 < ff4/f4 < -1.00 \quad (405)$$

where, f4 denotes a focal length of the fourth lens group, and ff4 denotes a distance from an apex of a lens nearest to the object side of the fourth lens group up to a front-side focal position of the fourth lens group.

Conditional expression (405) is an expression which regulates a ratio of the focal length of the fourth lens group and the distance from the apex of the lens nearest to the object side of the fourth lens group up to the front-side focal position of the fourth lens group. By satisfying conditional expression (405), it is possible to make the optical system (zoom lens) slim, and to suppress the occurrence of the oblique aberration.

When an upper limit value of conditional expression (405) is surpassed, the third lens group and the fourth lens group are susceptible to come closer. In this case, securing of focusing space at the telephoto end of the fourth lens group is susceptible to become difficult. Whereas, when a lower limit value of conditional expression (405) is surpassed, since an off-axis beam height in particular, at the fourth lens group becomes high, occurrence of the oblique aberration becomes difficult.

Here, it is preferable that the zoom lens satisfies the following conditional expression (405') instead of conditional expression (405).

$$-1.50 < ff4/f4 < -1.10 \quad (405')$$

Moreover, it is more preferable that the zoom lens satisfies the following conditional expression (405") instead of conditional expression (405).

$$-1.35 < ff4/f4 < -1.15 \quad (405'')$$

It is preferable that the zoom lens according to the embodiments of the present invention satisfies the following conditional expression (406).

$$1.10 < \beta 34W/\beta 34T < 2.00 \quad (406)$$

where, $\beta 34W$ denotes the magnification of a combined system of the third lens group and the fourth lens group at the wide angle end, $\beta 34T$ denotes the magnification of the combined system of the third lens group and the fourth lens group at the telephoto end, and each of the magnification or the focal length is a magnification or a focal length at the time of infinite object point focusing.

Conditional expression (406) is an expression in which, a ratio of the focal length at the wide angle end of the combined system of the third lens group and the fourth lens group and the focal length at the telephoto end of the combined system of the third lens group and the fourth lens group is regulated. By satisfying conditional expression (406), it is possible to maintain or to shorten the focal length of the combined system at the time of zooming from the wide angle end to the telephoto end. As a result, since it is possible to increase in magnification by the combined system of the third lens group and the fourth lens group, it is possible to make the zooming ratio of the overall zoom lens system high.

When an upper limit value of conditional expression (406) is surpassed, since a relative decentering sensitivity of the third lens group and the fourth lens group, in particular, becomes high, the spherical aberration and the coma aberration are deteriorated. Therefore, an image forming function is susceptible to be degraded. Whereas, when a lower limit value of conditional expression (406) is surpassed, even when an amount of movement of the fourth lens group is increased, it becomes difficult to increase the ratio of zooming (increase in magnification) by the combined system of the third lens group and the fourth lens group.

Here, it is preferable that the zoom lens satisfies the following conditional expression (406') instead of conditional expression (406).

$$1.20 < \beta 34W/\beta 34T < 2.00 \quad (406')$$

Moreover, it is more preferable that the zoom lens satisfies the following conditional expression (406") instead of conditional expression (406).

$$1.25 < \beta 34W/\beta 34T < 2.00 \quad (406'')$$

It is preferable that the zoom lens according to the embodiments of the present invention satisfies the following conditional expression (407).

$$0.20 < \log(\beta 34T/\beta 34W) < 0.9 \cdot \log \gamma \quad (407)$$

where, $\beta 34W$ denotes a magnification of a combined system of the third lens group and the fourth lens group at the wide angle end, $\beta 34T$ denotes a magnification of the combined system of the third lens group and the fourth lens group at the telephoto end, fW denotes a focal length of the overall zoom lens system at the wide angle end, fT denotes a focal length of the overall zoom lens system at the telephoto end, and $\gamma = fT/fW > 7$, and each of the magnification or the focal length is a magnification or a focal length at the time of infinite object point focusing.

Conditional expression (407) is an expression in which, the zooming (increase in magnification) ratio of a combined system of the third lens group and the fourth lens group is regulated. By satisfying conditional expression (407), it is possible to widen the angle of field as well as to make the zooming ratio high, in a state of the spherical aberration and the coma aberration corrected favorably.

When an upper limit value of conditional expression (407) is surpassed, either a difference in an F-value at the wide angle end and an F-value at the telephoto end becomes large or an axial beam height at the telephoto end becomes high. As the axial beam height at the telephoto end increases, correction of the spherical aberration and the coma aberration becomes difficult. Whereas, when a lower limit value of conditional expression (407) is surpassed, the zooming is carried out almost by the movement of the second lens group only. In this case, the second lens group has to have a strong refractive power similarly as the first lens group. As a result, particularly at the wide angle end, since the beam height at these lens groups becomes high, further widening of the angle of field becomes difficult.

Here, it is preferable that the zoom lens satisfies the following conditional expression (407') instead of conditional expression (407).

$$0.30 < \log(\beta 34T/\beta 34W) < 0.7 \cdot \log \gamma \quad (407')$$

Moreover, it is more preferable that the zoom lens satisfies the following conditional expression (407") instead of conditional expression (407).

$$0.35 < \log(\beta 34T/\beta 34W) < 0.55 \cdot \log \gamma \quad (407'')$$

where,

γ=fT/fW>9.

Furthermore, it is even more preferable that the zoom lens satisfies the following conditional expression (407''') instead of conditional expression (407).

$$0.38 < \log(\beta 34T/\beta 34W) < 0.5 \cdot \log \gamma \quad (407''')$$

where,

γ=fT/fW>10.

It is more preferable that the zooming ratio γ (=fT/fW) is 9 or more than 9, and zooming ratio γ of 10 or more than 10 is even more preferable.

In the zoom lens according to the embodiments of the present invention, it is preferable that the third lens group includes in order from the object side, two lens components namely, a lens component having a positive refractive power and a lens component having a negative refractive power.

When such an arrangement is made, it is possible to position the principal points of the fourth lens group on the object side. As a result, it is possible to shorten the overall length of the zoom lens. Each lens component is one of a single lens and a cemented lens, and has two optical surfaces which are in contact with air.

Moreover, it is preferable that the zoom lens according to the embodiments of the present invention satisfies the following conditional expression (408).

$$0.1 < (R32F - R32R)/(R32F + R32R) < 5.0 \quad (408)$$

where,

R32F denotes a paraxial radius of curvature of a surface nearest to the object side of the lens component having a negative refractive power in the third lens group, and R32R denotes a paraxial radius of curvature of a surface nearest to an image side of the lens component having a negative refractive power in the third lens group.

Conditional expression (408) is an expression which regulates a shape (indicated by a reciprocal of a shape factor) of the lens component having a negative refractive power in the third lens group. By satisfying conditional expression (408), it is possible to shorten the overall length of the zoom lens.

When an upper limit value of conditional expression (408) is surpassed, although it is advantageous for shortening the overall length of the zoom lens, correction of the spherical aberration and the coma aberration over the entire zooming area is susceptible to become difficult. Whereas, when a lower limit value of conditional expression (408) is surpassed, since it becomes difficult to position principal points of the third lens group on the object side, shortening of the overall length of the zoom lens becomes difficult.

Here, it is preferable that the zoom lens satisfies the following conditional expression (408') instead of conditional expression (408).

$$0.2 < (R32F - R32R)/(R32F + R32R) < 2.5 \quad (408')$$

Moreover, it is more preferable that the zoom lens satisfies the following conditional expression (408'') instead of conditional expression (408).

$$0.4 < (R32F - R32R)/(R32F + R32R) < 1.2 \quad (408'')$$

It is preferable that the zoom lens according to the embodiments of the present invention satisfies the following conditional expression (409).

$$0.30 < |\beta 34W| < 0.70 \quad (409)$$

where,

β34W denotes the magnification of the combined system of the third lens group and the fourth lens group at the wide angle end, and is a magnification at the time of infinite object point focusing.

Conditional expression (409) is an expression which regulates the magnification of the combined system of the third lens group and the fourth lens group at the wide angle end. By satisfying conditional expression (409), it is possible to widen the angle of field of the zoom lens and to slim the zoom lens.

When an upper limit value of conditional expression (409) is surpassed, it is necessary to shorten the focal length of the first lens group. When the focal length of the first lens group is shortened, the widening of the angle of field becomes difficult. Whereas, when a lower limit value of conditional expression (409) is surpassed, the fourth lens group and a lens group on the image side adjacent to the fourth lens group are susceptible to interfere. When a distance between the fourth lens group and the lens group on the image side adjacent to the fourth lens group is widened to prevent the interference, the overall length of the optical system becomes long.

Here, it is preferable that the zoom lens satisfies the following conditional expression (409') instead of conditional expression (409).

$$0.36 < |\beta 34W| < 0.56 \quad (409')$$

Moreover, it is more preferable that the zoom lens satisfies the following conditional expression (409'') instead of conditional expression (409).

$$0.39 < |\beta 34W| < 0.53 \quad (409'')$$

In the zoom lens according to the embodiments of the present invention, it is preferable that the last lens group includes a lens component having a positive refractive power.

As a zoom lens system, the zoom lens may be complete with lens groups from the first lens group up to the fourth lens group. However, in the zoom lens having a high zooming ratio with a wide angle of field as in the embodiments of the present invention, since the focal length of the first lens group is long, since the zooming from the second lens group up to the fourth lens group and a region of appropriate magnification of a focal position correction lens group tend to be somewhat high, for letting the focal length to be a desired focal length, a lens group which reduces the overall magnification is necessary. Therefore, in the zoom lens according to the embodiments of the present invention, the last lens group is provided at the image side of the fourth lens group, and the last lens group is let to have a positive refractive power, and is let to have a magnification of less than +1. The lens component is a single lens or a cemented lens, and has two optical surfaces which are in contact with air.

It is preferable that the zoom lens according to the embodiments of the present invention satisfies the following conditional expression (410).

$$0.70 < |\beta FW| < 0.98 \quad (410)$$

where,

βFW denotes a magnification of the last lens group at the wide angle end, and is a magnification at the time of infinite object point focusing.

Conditional expression (410) is an expression which regulates the magnification of the last lens group at the wide angle end. By satisfying conditional expression (410), it is possible to suppress the occurrence of various oblique aberrations.

When an upper limit value of conditional expression (410) is surpassed, it becomes difficult to achieve a zoom lens having a high zooming ratio with a wide angle of field.

Whereas, when a lower limit value of conditional expression (410) is surpassed, since the refractive power of the last lens group becomes strong, the height of oblique beam passing through the last lens group is susceptible to become high. As a result, correction of various oblique aberrations becomes difficult.

Here, it is preferable that the zoom lens satisfies the following conditional expression (410') instead of conditional expression (410).

$$0.73<|\beta FW|<0.94 \tag{410'}$$

Moreover, it is more preferable that the zoom lens satisfies the following conditional expression (410") instead of conditional expression (410).

$$0.76<|\beta FW|<0.90 \tag{410"}$$

It is preferable that the zoom lens according to the embodiments of the present invention satisfies the following conditional expression (411).

$$-0.18<f2/f1<-0.06 \tag{411}$$

where,
f1 denotes a focal length of the first lens group, and
f2 denotes a focal length of the second lens group.

Conditional expression (411) is an expression in which, a ratio of the focal length of the first lens group and the focal length of the second lens group is regulated, and is a condition for acquiring a high zooming ratio while widening the angle (of field).

When an upper limit value of conditional expression (411) is surpassed, it becomes difficult to widen further the angle of field. Whereas, when a lower limit value of conditional expression (411) is surpassed, it becomes difficult to achieve a high zooming ratio.

Here, it is preferable that the zoom lens satisfies the following conditional expression (411') instead of conditional expression (411).

$$-0.16<f2/f1<-0.06 \tag{411'}$$

Moreover, it is more preferable that the zoom lens satisfies the following conditional expression (411") instead of conditional expression (411).

$$-0.15<f2/f1<-0.06 \tag{411"}$$

It is preferable that the zoom lens according to the embodiments of the present invention satisfies the following conditional expression (412).

$$9<f1/fW<18 \tag{412}$$

where,
f1 denotes a focal length of the first lens group, and
fW denotes the focal length of the overall zoom lens system at the wide angle end, and is the focal length at the time of infinite object point focusing.

Conditional expression (412) is a conditional expression which regulates a ratio of the focal length of the first lens group and the focal length of the overall zoom lens system at the wide angle end. By satisfying conditional expression (412), it is possible to achieve a high zooming ratio and to suppress occurrence of various aberrations.

When an upper limit value of conditional expression (412) is surpassed, it is disadvantageous for making the zooming ratio high. Whereas, when a lower limit value of conditional expression (412) is surpassed, widening of the angle of field, correction of the meridional curvature of field and the coma aberration at the wide angle end, and correction of the longitudinal chromatic aberration and the spherical aberration at the telephoto end become difficult.

Here, it is preferable that the zoom lens satisfies the following conditional expression (412') instead of conditional expression (412).

$$10.5<f1/fW<17 \tag{412'}$$

Moreover, it is more preferable that the zoom lens satisfies the following conditional expression (412") instead of conditional expression (412).

$$11.5<f1/fW<16 \tag{412"}$$

It is preferable that the zoom lens according to the embodiments of the present invention satisfies the following conditional expression (413).

$$0.3<\log(\beta 2T/\beta 2W)/\log \gamma<0.8 \tag{413}$$

where,
β2W denotes a magnification of the second lens group at the wide angle end,
β2T denotes a magnification of the second lens group at the telephoto end,
fW denotes the focal length of the overall zoom lens system at the wide angle end,
fT denotes the focal length of the overall zoom lens system at the telephoto end, and
γ=fT/fW, and
each of the magnification or the focal length is a magnification or a focal length at the time of infinite object point focusing.

Conditional expression (413) is an expression in which, the zooming (increase in magnification) of the second lens group with respect to the zooming ratio of the overall zoom lens system is regulated. Conditional expression (413) is a condition which suppresses an effect of increase in magnification of the second lens group such that an absolute value of magnification at the telephoto end of the second lens group does not exceed 1 by far. By satisfying conditional expression (413), it is possible to realize favorable correction of the spherical aberration and the coma aberration, and widening of the angle (of field).

When an upper limit value of conditional expression (413) is surpassed, the zooming is carried out almost by the movement of the second lens group only. In this case, the second lens group has to have a strong refractive power similarly as the first lens group. As the second lens group assumes strong refractive power, particularly at the wide angle end, since the beam height at these lens groups (at the second lens group and the first lens group) becomes high, further widening of the angle (of field) becomes difficult. Whereas, when a lower limit value of conditional expression (413) is surpassed, either a difference in an F-value at the wide angle end and an F-value at the telephoto end becomes large, or an axial beam height at the telephoto end becomes high. As the axial beam height at the telephoto end becomes high, correction of the spherical aberration and the coma aberration becomes difficult.

Here, it is preferable that the zoom lens satisfies the following conditional expression (413') instead of conditional expression (413).

$$0.45<\log(\beta 2T/\beta 2W)/\log \gamma<0.67 \tag{413'}$$

Moreover, it is more preferable that the zoom lens satisfies the following conditional expression (413") instead of conditional expression (413).

$$0.50<\log(\beta 2T/\beta 2W)/\log \gamma<0.64 \tag{413"}$$

It is preferable that the zoom lens according to the embodiments of the present invention satisfies the following conditional expression (414).

$$0.1 < |\beta 2W| < 0.30 \qquad (414)$$

where,

β2W denotes a magnification of the second lens group at the wide angle end, and is a magnification at the time of infinite object point focusing.

Conditional expression (414) is an expression in which, the magnification (at the time of infinite object point focusing) of the second lens group at the wide angle end is regulated. When the magnification of the second lens group at the wide angle end is let to be a small value, an absolute value of magnification at the telephoto end of the second lens group does not exceed 1 by far. Therefore, it becomes easy to increase magnification by the combined system of the third lens group and the fourth lens group. As a result, it becomes easy for the zoom lens to satisfy conditional expression (414). Moreover, the focal length of the first lens group becomes long. Therefore, correction of the oblique aberration at the wide angle end and aberration throughout from longitudinal to oblique at the telephoto end becomes easy. Whereas, as the magnification at the wide angle end of the second lens group is made further smaller, taking to the extreme, that is zero, or in other words, when a state in which, there is no (refractive) power of the first lens group (a state in which, the refractive power of the first lens group is zero), the zooming effect of the second lens group ceases (in other words, it becomes a negative-lead type zoom lens). As the zooming effect of the second lens group ceases, since it becomes difficult to secure a high zooming ratio, it is not preferable to make the magnification at the wide angle end of the second lens group excessively small. Therefore, by satisfying conditional expression (414), it is possible to achieve a high zooming ratio in a state of the oblique aberration corrected favorably.

As an upper limit value of conditional expression (414) is surpassed, when the angle of field is widened, correction of the oblique aberration in particular, becomes difficult. Whereas, when a lower limit value of conditional expression (414) is surpassed, securing of a high zooming ratio becomes difficult.

Here, it is preferable that the zoom lens satisfies the following conditional expression (414') instead of conditional expression (414).

$$0.1 < |\beta 2W| < 0.24 \qquad (414')$$

Moreover, it is more preferable that the zoom lens satisfies the following conditional expression (414") instead of conditional expression (414).

$$0.1 < |\beta 2W| < 0.22 \qquad (414'')$$

It is preferable that the zoom lens according to the embodiments of the present invention satisfies the following conditional expression (415).

$$-0.5 < fW/f123T < 0.10 \qquad (415)$$

where, fW denotes the focal length of the overall zoom lens system at the wide angle end, f123T denotes a focal length of a combined system from the first lens group up to the third lens group at the telephoto end, and each of fW and f123T is a focal length at the time of infinite object focusing.

Conditional expression (415) is an expression which regulates a ratio of the focal length of the overall zoom lens system at the wide angle end and the focal length of the combined system from the first lens group up to the third lens group at the telephoto end. By satisfying conditional expression (415), it is possible to achieve a high zooming ratio and to suppress occurrence of various aberrations.

When an upper limit value of conditional expression (415) is surpassed, it is disadvantageous for widening of angle (of field) and correction of the meridional curvature of field and the coma aberration at the wide angle end, and correction of the longitudinal chromatic aberration and the spherical aberration at the telephoto end. Whereas, when a lower limit value of conditional expression (415) is surpassed, it is disadvantageous for achieving a high zooming ratio.

Here, it is preferable that the zoom lens satisfies the following conditional expression (415') instead of conditional expression (415).

$$-0.4 < fW/f123T < 0.04 \qquad (415')$$

Moreover, it is more preferable that the zoom lens satisfies the following conditional expression (415") instead of conditional expression (415).

$$-0.3 < fW/f123T < 0.02 \qquad (415'')$$

In the zoom lens according to the embodiments of the present invention, it is preferable that a direction of movement of the fourth lens group at the time of zooming is toward the object side all the time.

When such an arrangement is made, an effect of increase in magnification in the combined system of the third lens group and the fourth lens group increases. Therefore, it is possible to improve an efficiency of zooming in the overall zoom lens system. Particularly, the effect is exerted at the time of carrying out zooming more toward the telephoto end while maintaining a state of focusing to an object. An order of focusing and zooming may be arbitrary and focusing and zooming may be carried out simultaneously or concurrently.

When the last lens group is moved toward the object side at the time of zooming from the wide angle end to the telephoto end, it is advantageous since there is an effect of negating a fluctuation in the meridional curvature of field and the coma aberration at the time of zooming. However, when the last lens group is moved toward the object side, particularly near the telephoto end, error sensitivity for an error such as decentering tends to increase. When it is taken into consideration that the error sensitivity increases due to making the last lens group movable, it is preferable to let the last lens group to be fixed at the time of zooming.

Moreover, an image pickup apparatus according to an embodiment of the present invention includes the zoom lens described above, and an image pickup element which is disposed on an image plane of the zoom lens.

Exemplary embodiments of an image pickup optical system and an image pickup apparatus will be described below in detail by referring to the accompanying diagrams. However, the present invention is not restricted to the embodiments described below. A sign (positive or negative) of a refractive power is based on a paraxial radius of curvature.

Figure 1B:
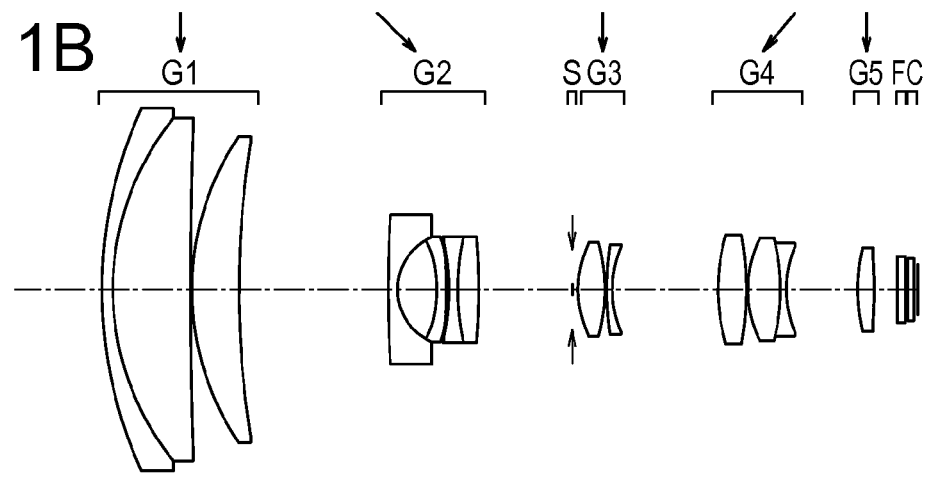
Figure 1C:
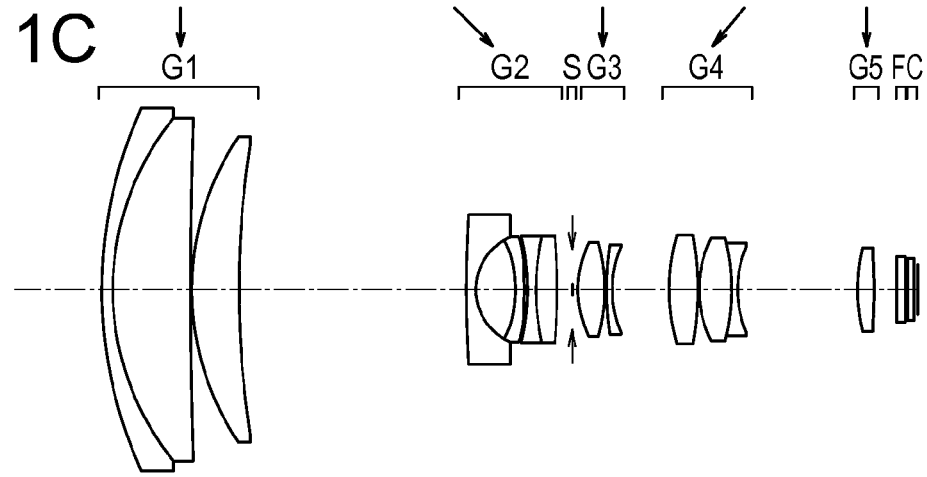

Next, an image pickup optical system (a zoom lens) according to a first embodiment of the present invention will be described below. FIG. 1A, FIG. 1B, and FIG. 1C are cross-sectional views along an optical axis showing an optical arrangement at the time of infinite object point focusing of the image pickup optical system according to the first embodiment, where, FIG. 1A is a cross-sectional view at a wide angle end, FIG. 1B is a cross-sectional view in an intermediate state, and FIG. 1C is a cross-sectional view at a telephoto end.

FIG. 2A, FIG. 2B, FIG. 2C, and FIG. 2D show spherical aberration (SA), astigmatism (AS), distortion (DT), and chromatic aberration of magnification (CC) at the wide angle end of the first embodiment.

FIG. 2E, FIG. 2F, FIG. 2G, and FIG. 2H show spherical aberration (SA), astigmatism (AS), distortion (DT), and chromatic aberration of magnification (CC) in the intermediate focal length state of the first embodiment.

FIG. 2I, FIG. 2J, FIG. 2K, and FIG. 2L show spherical aberration (SA), astigmatism (AS), distortion (DT), and chromatic aberration of magnification (CC) at the telephoto end of the first embodiment Moreover, FIY denotes an image height. Symbols in the aberration diagrams are same for all the embodiments which will be described later.

The zoom lens according to the first embodiment, as shown in FIG. 1A, FIG. 1B, and FIG. 1C, includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

At the time of zooming from the wide angle end to the telephoto end, the first lens group G1 is fixed, the second lens group G2 moves toward an image side, the third lens group G3 is fixed, the fourth lens group G4 moves toward the object side, and the fifth lens group G5 is fixed.

In order from the object side, the first lens group G1 includes a cemented lens of a negative meniscus lens having a convex surface directed toward the object side and a positive meniscus lens having a convex surface directed toward the object side, and a positive meniscus lens having a convex surface directed toward the object side. The second lens group G2 includes a negative meniscus lens having a convex surface directed toward the object side, a negative meniscus lens having a convex surface directed toward the image side, and a cemented lens of a biconcave negative lens and a biconvex positive lens. The third lens group G3 includes a biconvex positive lens and a negative meniscus lens having a convex surface directed toward the object side. The fourth lens group G4 includes a biconvex positive lens, and a cemented lens of a biconvex positive lens and a biconcave negative lens. The fifth lens group G5 includes a biconvex positive lens.

An aspheric surface is used for five surfaces namely, both surfaces of the negative meniscus lens having the convex surface directed toward the image side in the second lens group G2, both surfaces of the biconvex positive lens in the third lens group G3, and a surface on the image side of the biconvex positive lens in the fifth lens group G5.

Figure 3A:
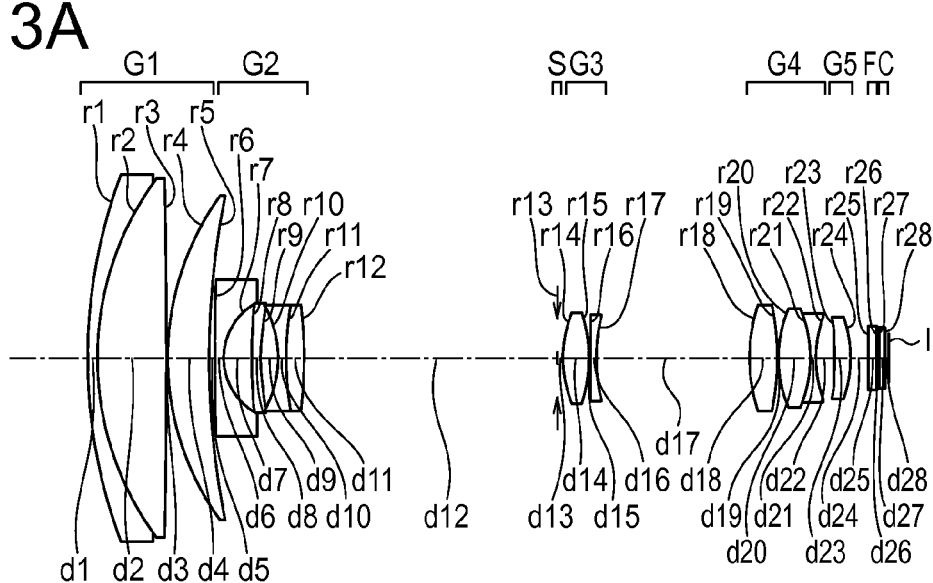
FIG. 3A, FIG. 3B, and FIG. 3C are cross-sectional views along an optical axis showing an optical arrangement at the time of infinite object point focusing of a zoom lens according to a second embodiment of the present invention, where.
Figure 3B:
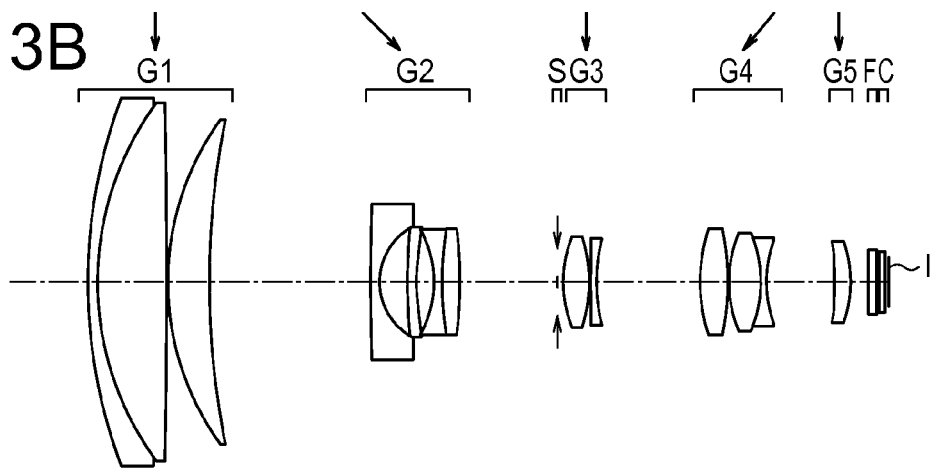
Figure 3C:
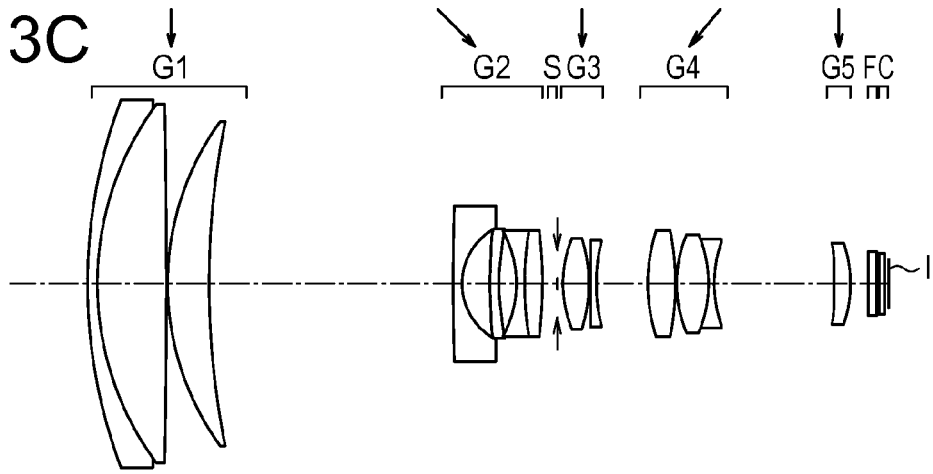

Next, an image pickup optical system (a zoom lens) according to a second embodiment of the present invention will be described below. FIG. 3A, FIG. 3B, and FIG. 3C are cross-sectional views along an optical axis showing an optical arrangement at the time of infinite object point focusing of the image pickup optical system according to the second embodiment, where, FIG. 3A is a cross-sectional view at a wide angle end, FIG. 3B is a cross-sectional view in an intermediate state, and FIG. 3C is a cross-sectional view at a telephoto end.

FIG. 4A, FIG. 4B, FIG. 4C, and FIG. 4D show spherical aberration (SA), astigmatism (AS), distortion (DT), and chromatic aberration of magnification (CC) at the wide angle end of the second embodiment.

FIG. 4E, FIG. 4F, FIG. 4G, and FIG. 4H show spherical aberration (SA), astigmatism (AS), distortion (DT), and chromatic aberration of magnification (CC) in the intermediate focal length state of the second embodiment.

FIG. 4I, FIG. 4J, FIG. 4K, and FIG. 4L show spherical aberration (SA), astigmatism (AS), distortion (DT), and chromatic aberration of magnification (CC) at the telephoto end of the second embodiment.

The zoom lens according to the second embodiment, as shown in FIG. 3A, FIG. 3B, and FIG. 3C, includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

At the time of zooming from the wide angle end to the telephoto end, the first lens group G1 is fixed, the second lens group G2 moves toward an image side, the third lens group G3 is fixed, the fourth lens group G4 moves toward the object side, and the fifth lens group G5 is fixed.

In order from the object side, the first lens group G1 includes a cemented lens of a negative meniscus lens having a convex surface directed toward the object side and a biconvex positive lens, and a positive meniscus lens having a convex surface directed toward the object side. The second lens group G2 includes a negative meniscus lens having a convex surface directed toward the object side, a negative meniscus lens having a convex surface directed toward the object side, and a cemented lens of a biconcave negative lens and a biconvex positive lens. The third lens group G3 includes a biconvex positive lens and a negative meniscus lens having a convex surface directed toward the object side. The fourth lens group G4 includes a biconvex positive lens, and a cemented lens of a biconvex positive lens and a biconcave negative lens. The fifth lens group G5 includes a biconvex positive lens.

An aspheric surface is used for six surfaces namely, both surfaces of the negative meniscus lens (second from the object side) having the convex surface directed toward the object side in the second lens group G2, both surfaces of the biconvex positive lens in the third lens group G3, and both surfaces of the biconvex positive lens in the fifth lens group G5.

Figure 5A:
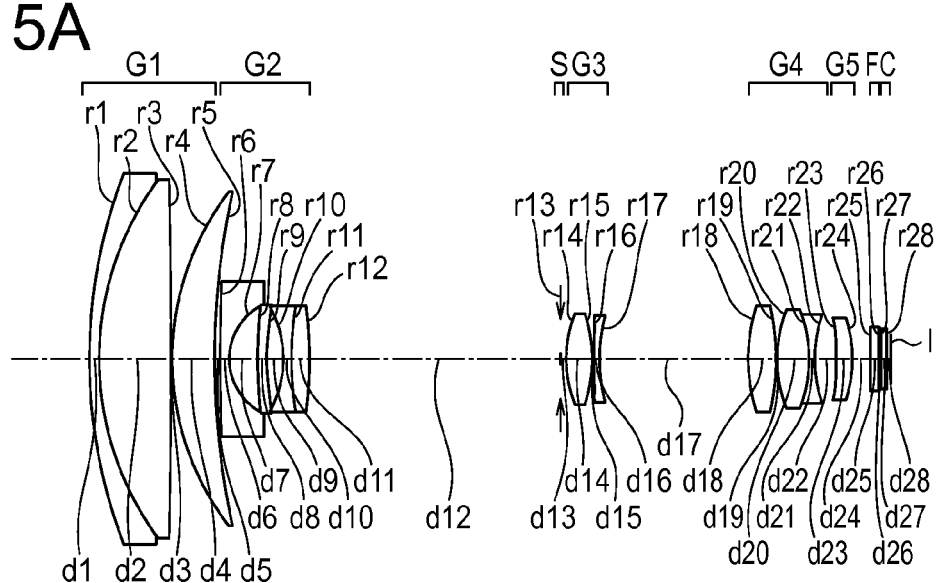
FIG. 5A, FIG. 5B, and FIG. 5C are cross-sectional views along an optical axis showing an optical arrangement at the time of infinite object point focusing of a zoom lens according to a third embodiment of the present invention, where.
Figure 5B:
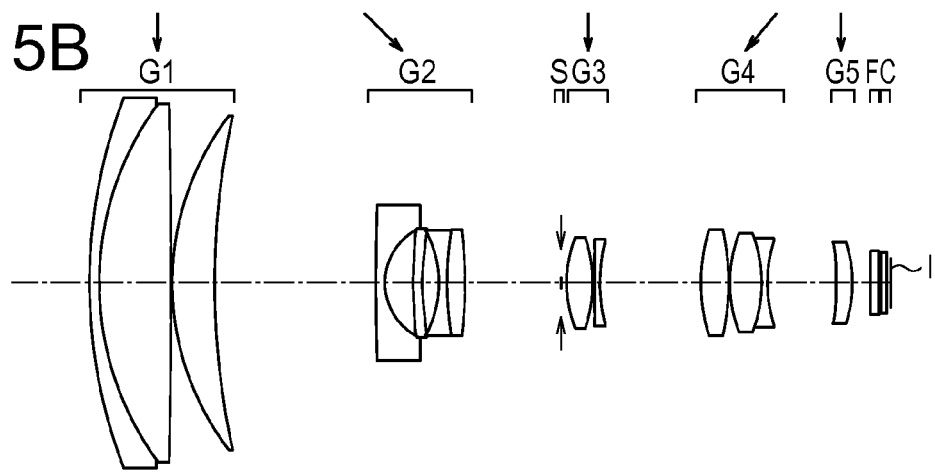
Figure 5C:
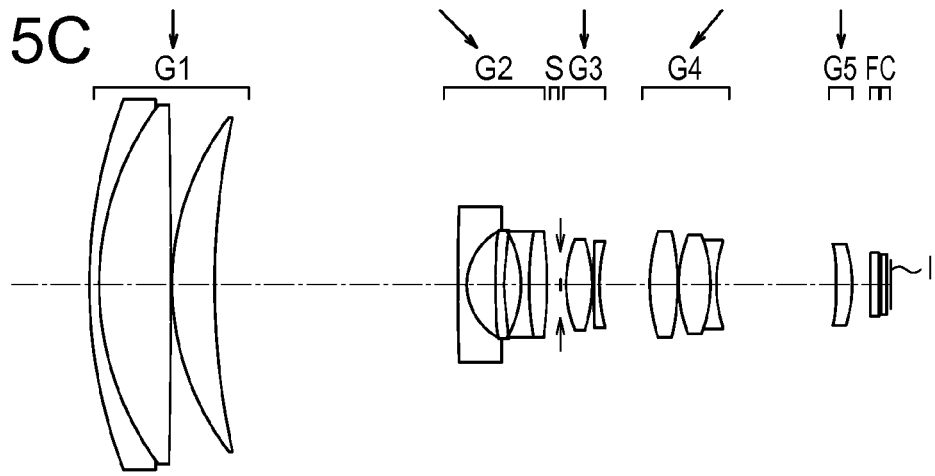

Next, an image pickup optical system (a zoom lens) according to a third embodiment of the present invention will be described below. FIG. 5A, FIG. 5B, and FIG. 5c are cross-sectional views along an optical axis showing an optical arrangement at the time of infinite object point focusing of the image pickup optical system according to the third embodiment, where, FIG. 5A is a cross-sectional view at a wide angle end, FIG. 5B is a cross-sectional view in an intermediate state, and FIG. 5C is a cross-sectional view at a telephoto end.

FIG. 6A, FIG. 6B, FIG. 6C, and FIG. 6D show spherical aberration (SA), astigmatism (AS), distortion (DT), and chromatic aberration of magnification (CC) at the wide angle end of the third embodiment.

FIG. 6E, FIG. 6F, FIG. 6G, and FIG. 6H show spherical aberration (SA), astigmatism (AS), distortion (DT), and chromatic aberration of magnification (CC) in the intermediate focal length state of the third embodiment.

FIG. 6I, FIG. 6J, FIG. 6K, and FIG. 6L show spherical aberration (SA), astigmatism (AS), distortion (DT), and chromatic aberration of magnification (CC) at the telephoto end of the third embodiment.

The zoom lens according to the third embodiment, as shown in FIG. 5A, FIG. 5B, and FIG. 5C, includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

At the time of zooming from the wide angle end to the telephoto end, the first lens group G1 is fixed, the second lens group G2 moves toward an image side, the third lens group G3 is fixed, the fourth lens group G4 moves toward the object side, and the fifth lens group G5 is fixed.

In order from the object side, the first lens group G1 includes a cemented lens of a negative meniscus lens having a convex surface directed toward the object side and a biconvex positive lens, and a positive meniscus lens having a convex surface directed toward the object side. The second lens group G2 includes a negative meniscus lens having a convex surface directed toward the object side, a negative meniscus lens having a convex surface directed toward the object side, and a cemented lens of a biconcave negative lens and a biconvex positive lens. The third lens group G3 includes a biconvex positive lens and a negative meniscus lens having a convex surface directed toward the object side. The fourth lens group G4 includes a biconvex positive lens, and a cemented lens of a biconvex positive lens and a biconcave negative lens. The fifth lens group G5 includes a positive meniscus lens having a convex surface directed toward the object side.

An aspheric surface is used for six surfaces namely, both surfaces of the negative meniscus lens (second from the object side) having the convex surface directed toward the object side in the second lens group G2, both surfaces of the biconvex positive lens in the third lens group G3, and both surfaces of the positive meniscus lens having the convex surface directed toward the object side in the fifth lens group G5.

Figure 7A:
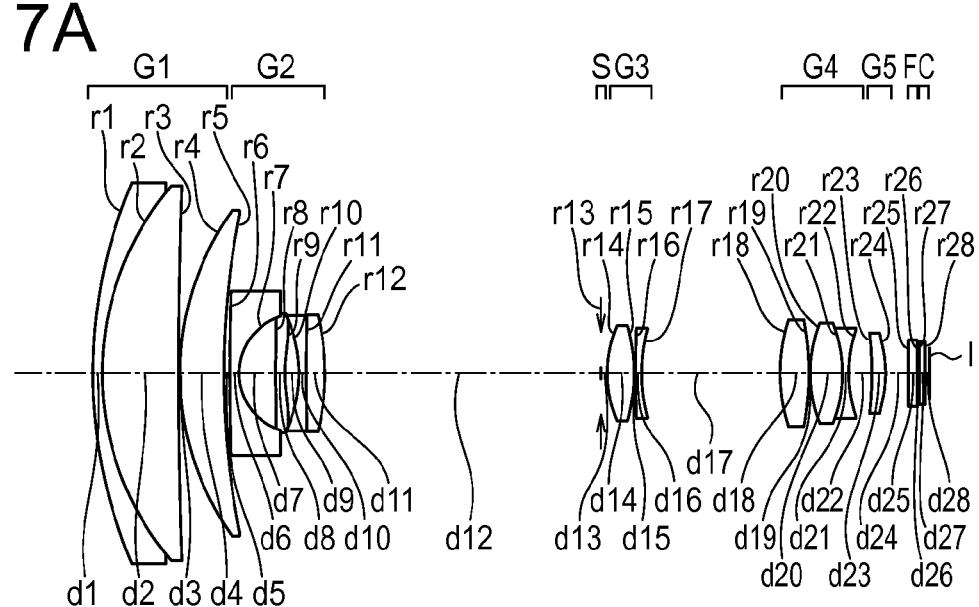
FIG. 7A, FIG. 7B, and FIG. 7C are cross-sectional views along an optical axis showing an optical arrangement at the time of infinite object point focusing of a zoom lens according to a fourth embodiment of the present invention, where.
Figure 7B:
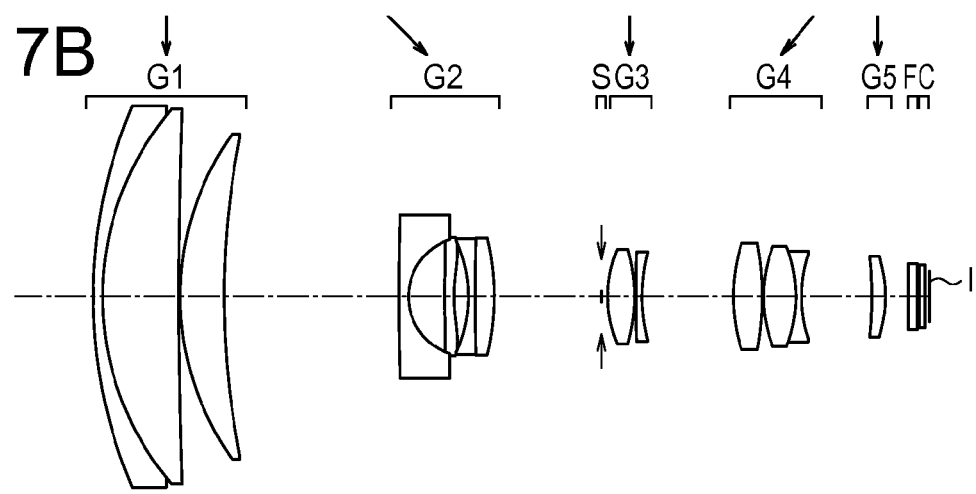
Figure 7C:
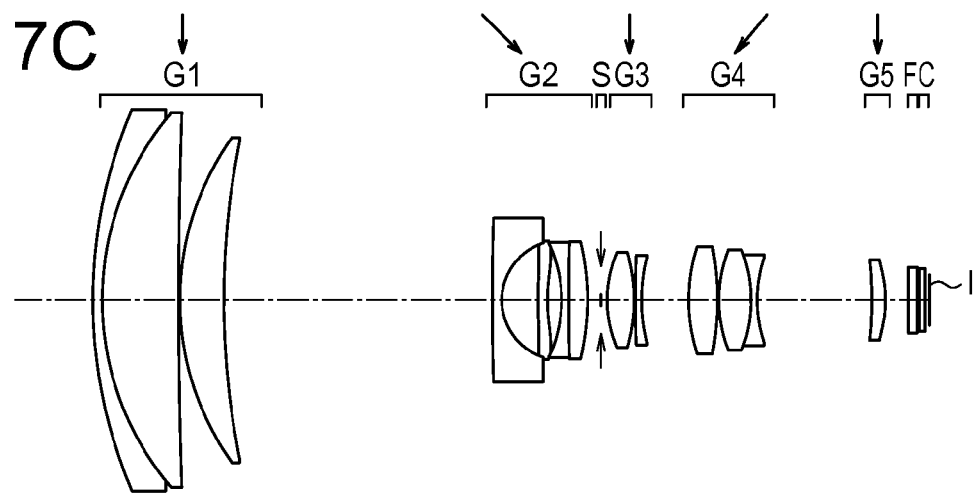

Next, an image pickup optical system (a zoom lens) according to a fourth embodiment of the present invention will be described below. FIG. 7A, FIG. 7B, and FIG. 7C are cross-sectional views along an optical axis showing an optical arrangement at the time of infinite object point focusing of the image pickup optical system according to the fourth embodiment, where, FIG. 7A is a cross-sectional view at a wide angle end, FIG. 7B is a cross-sectional view in an intermediate state, and FIG. 7C is a cross-sectional view at a telephoto end.

FIG. 8A, FIG. 8B, FIG. 8C, and FIG. 8D show spherical aberration (SA), astigmatism (AS), distortion (DT), and chromatic aberration of magnification (CC) at the wide angle end of the fourth embodiment.

FIG. 8E, FIG. 8F, FIG. 8G, and FIG. 8H show spherical aberration (SA), astigmatism (AS), distortion (DT), and chromatic aberration of magnification (CC) in the intermediate focal length state of the fourth embodiment.

FIG. 8I, FIG. 8J, FIG. 8K, and FIG. 8L show spherical aberration (SA), astigmatism (AS), distortion (DT), and chromatic aberration of magnification (CC) at the telephoto end of the fourth embodiment.

The zoom lens according to the fourth embodiment, as shown in FIG. 7A, FIG. 7B, and FIG. 7C, includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

At the time of zooming from the wide angle end to the telephoto end, the first lens group G1 is fixed, the second lens group G2 moves toward an image side, the third lens group G3 is fixed, the fourth lens group G4 moves toward the object side, and the fifth lens group G5 is fixed.

In order from the object side, the first lens group G1 includes a cemented lens of a negative meniscus lens having a convex surface directed toward the object side and a positive meniscus lens having a convex surface directed toward the object side, and a positive meniscus lens having a convex surface directed toward the object side. The second lens group G2 includes a negative meniscus lens having a convex surface directed toward the object side, a negative meniscus lens having a convex surface directed toward the object side, and a cemented lens of a biconcave negative lens and a biconvex positive lens. The third lens group G3 includes a biconvex positive lens and a negative meniscus lens having a convex surface directed toward the object side. The fourth lens group G4 includes a biconvex positive lens, and a cemented lens of biconvex positive lens and a biconcave negative lens. The fifth lens group G5 includes a positive meniscus lens having a convex surface directed toward the image side.

An aspheric surface is used for six surfaces namely, both surfaces of the negative meniscus lens (second from the object side) having the convex surface directed toward the object side in the second lens group, both surfaces of the biconvex positive lens in the third lens group G3, and both surfaces of the positive meniscus lens having the convex surface directed toward the image side in the fifth lens group.

Figure 9A:
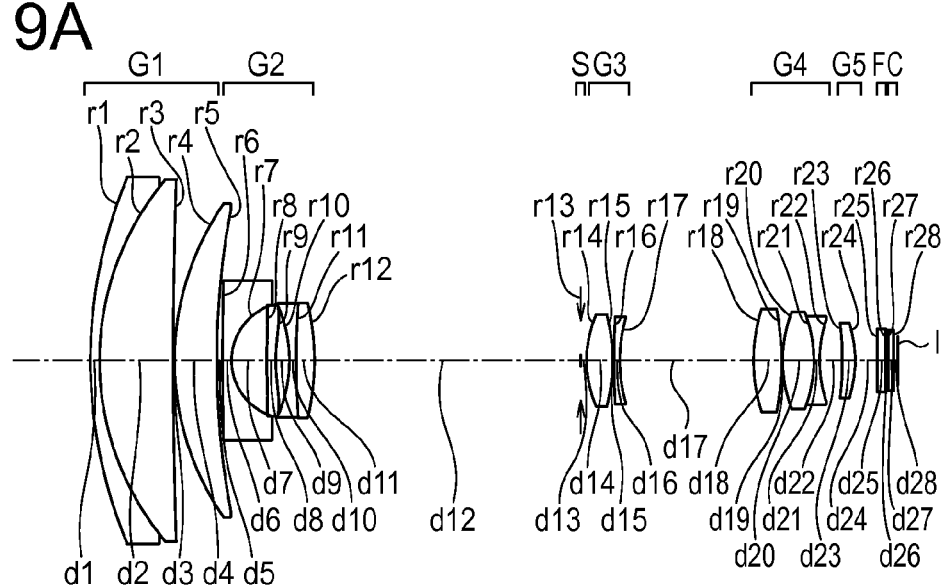
FIG. 9A, FIG. 9B, and FIG. 9C are cross-sectional views along an optical axis showing an optical arrangement at the time of infinite object point focusing of a zoom lens according to a fifth embodiment of the present invention, where.
Figure 9B:
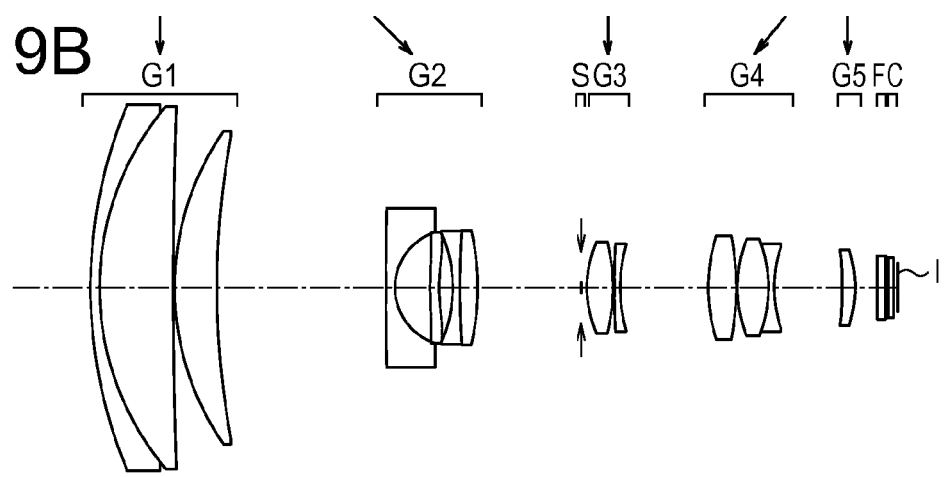
Figure 9C:
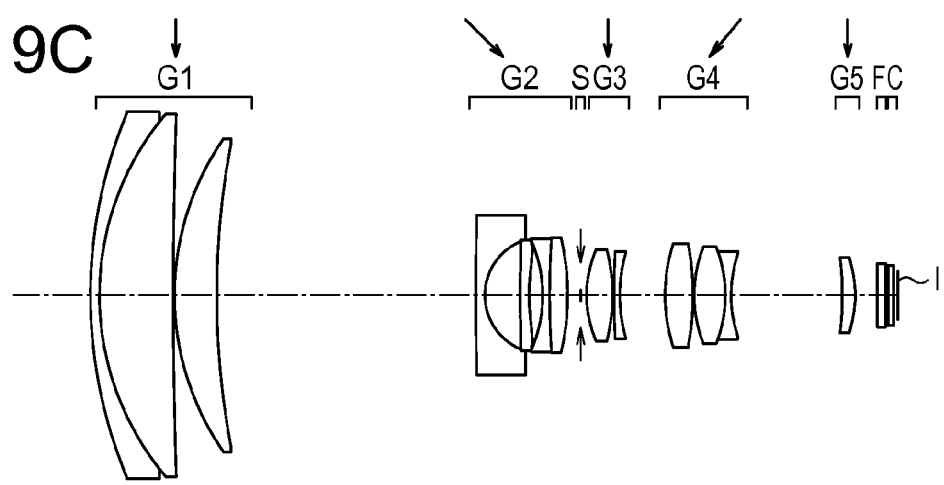

Next, an image pickup optical system (a zoom lens) according to a fifth embodiment of the present invention will be described below. FIG. 9A, FIG. 9B, and FIG. 9C are cross-sectional views along an optical axis showing an optical arrangement at the time of infinite object point focusing of the image pickup optical system according to the fifth embodiment, where, FIG. 9A is a cross-sectional view at a wide angle end, FIG. 9B is a cross-sectional view in an intermediate state, and FIG. 9C is a cross-sectional view at a telephoto end.

FIG. 10A, FIG. 10B, FIG. 10C, and FIG. 10D show spherical aberration (SA), astigmatism (AS), distortion (DT), and chromatic aberration of magnification (CC) at the wide angle end of the fifth embodiment.

FIG. 10E, FIG. 10F, FIG. 10G, and FIG. 10H show spherical aberration (SA), astigmatism (AS), distortion (DT), and chromatic aberration of magnification (CC) in the intermediate focal length state of the fifth embodiment.

FIG. 10I, FIG. 10J, FIG. 10K, and FIG. 10L show spherical aberration (SA), astigmatism (AS), distortion (DT), and chromatic aberration of magnification (CC) at the telephoto end of the fifth embodiment.

The zoom lens according to the fifth embodiment, as shown in FIG. 9A, FIG. 9B, and FIG. 9C, includes in order from an object side, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a positive refractive power.

At the time of zooming from the wide angle end to the telephoto end, the first lens group G1 is fixed, the second lens group G2 moves toward an image side, the third lens group G3 is fixed, the fourth lens group G4 moves toward the object side, and the fifth lens group G5 is fixed.

In order from the object side, the first lens group G1 includes a cemented lens of a negative meniscus lens having a convex surface directed toward the object side and a positive meniscus lens having a convex surface directed toward the object side, and a positive meniscus lens having a convex surface directed toward the object side. The second lens group G2 includes a negative meniscus lens having a convex surface directed toward the object side, a negative meniscus lens having a convex surface directed toward the object side, and a cemented lens of a biconcave negative lens and a biconvex positive lens. The third lens group G3 includes a biconvex positive lens and a negative meniscus lens having a convex surface directed toward the object side. The fourth lens group G4 includes a biconvex positive lens, and a cemented lens of a biconvex positive lens and a biconcave negative lens. The fifth lens group G5 includes a positive meniscus lens having a convex surface directed toward the image side.

An aspheric surface is used for six surfaces namely, both surfaces of the negative meniscus lens (second from the object side) having the convex surface directed toward the object side in the second lens group G2, both surfaces of the biconvex positive lens in the third lens group G3, and both surfaces of the positive meniscus lens having the convex surface directed toward the image side in the fifth lens group G5.

Numerical data of each embodiment described above is shown below. Apart from symbols described above, each of r1, r2, . . . denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe constant for each lens. FL denotes a focal length of the entire zoom lens system, $F_{NO}$ denotes an F number, ω denotes a half angle of field. Further, * denotes an aspheric data, BF denotes a back focus.

When z is let to be an optical axis with a direction of traveling of light as a positive (direction), and y is let to be in a direction orthogonal to the optical axis, a shape of the aspheric surface is described by the following expression.

$$z=(y^2/r)/[1+\{1-(K+1)(y/r)^2\}^{1/2}]+A_4y^4+A_6y^6+A_8y^8+A_{10}y^{10}$$

where, r denotes a paraxial radius of curvature, K denotes a conical coefficient, A4, A6, A8, A10 denote aspherical surface coefficients of a fourth order, a sixth order, an eight order, a tenth order. Moreover, in the aspherical surface coefficients, 'e-n' (where, n is an integral number) indicates '10$^{-n}$'.

These reference are used in common in the following examples.

Example 1

| | Unit mm | | | |
|---|---|---|---|---|
| | Surface data | | | |
| Surface no. | r | d | nd | vd |
| Object plane | ∞ | ∞ | | |
| 1 | 52.1523 | 1.3000 | 1.84666 | 23.78 |
| 2 | 32.6000 | 9.3000 | 1.49700 | 81.55 |
| 3 | 600.0000 | 0.1500 | | |
| 4 | 32.8220 | 5.6000 | 1.72916 | 54.68 |
| 5 | 110.0000 | Variable | | |
| 6 | 150.0000 | 1.1000 | 1.77250 | 49.62 |
| 7 | 6.8228 | 4.6938 | | |
| 8* | −17.6865 | 1.1000 | 1.53368 | 55.90 |
| 9* | −200.0000 | 0.3922 | | |
| 10 | −27.0451 | 1.0000 | 1.59282 | 68.62 |
| 11 | 28.3556 | 2.5000 | 1.94594 | 17.98 |
| 12 | −81.3172 | Variable | | |
| 13 (stop) | ∞ | 0.7000 | | |
| 14* | 11.6202 | 3.2000 | 1.53368 | 55.90 |
| 15* | −19.7300 | 0.2000 | | |
| 16 | 35.8407 | 0.7000 | 1.84666 | 23.78 |
| 17 | 12.8354 | Variable | | |
| 18 | 22.9800 | 3.4000 | 1.76200 | 40.26 |
| 19 | −37.4988 | 0.1500 | | |
| 20 | 13.6117 | 3.9000 | 1.58313 | 59.37 |
| 21 | −24.5294 | 0.7000 | 1.80518 | 25.43 |
| 22 | 12.9572 | Variable | | |
| 23 | 21.2494 | 2.0000 | 1.53368 | 55.90 |
| 24* | −36.3228 | 2.7000 | | |
| 25 | ∞ | 1.0000 | 1.51633 | 64.14 |
| 26 | ∞ | 0.3000 | | |
| 27 | ∞ | 0.7000 | 1.51633 | 64.14 |
| 28 | ∞ | 0.4964 | | |
| Image plane (Light receiving surface) | ∞ | | | |

Aspherical surface data

8th surface

K = 0.
A2 = 0.0000E+00, A4 = −1.3796E−04, A6 = −3.4249E−06,
A8 = 7.1817E−10, A10 = 0.0000E+00

9th surface

K = 0.
A2 = 0.0000E+00, A4 = −2.7228E−04, A6 = −4.6717E−06,
A8 = 3.7336E−08, A10 = 0.0000E+00

14th surface

K = 0.
A2 = 0.0000E+00, A4 = −1.1404E−04, A6 = −1.0637E−06,
A8 = 5.9473E−10, A10 = 0.0000E+00

15th surface

K = 0.
A2 = 0.0000E+00, A4 = 7.6388E−05, A6 = −9.1278E−07,
A8 = 0.0000E+00, A10 = 0.0000E+00

24th surface

K = 0.
A2 = 0.0000E+00, A4 = 2.9911E−04, A6 = −9.6034E−08,
A8 = 0.0000E+00, A10 = 0.0000E+00

Various data

| | Wide angle | Intermediate | Telephoto |
|---|---|---|---|
| FL | 4.14288 | 13.93198 | 47.01961 |
| Fno | 1.8316 | 2.2580 | 2.8447 |
| ω | 37.7 | 11.9 | 3.5 |
| Image height | 3.00 | 3.00 | 3.00 |
| Lens total length | 97.3953 | 97.4000 | 97.4076 |
| BF | 0.49641 | 0.50000 | 0.50862 |
| d5 | 0.70000 | 17.80941 | 27.17715 |
| d12 | 28.27700 | 11.17465 | 1.79985 |
| d17 | 19.16483 | 12.60927 | 6.80540 |
| d22 | 1.97117 | 8.52073 | 14.33060 |

Zoom lens data

| G | Initial surface | Focal length |
|---|---|---|
| 1 | 1 | 49.37862 |
| 2 | 6 | −7.14877 |
| 3 | 13 | 28.58517 |
| 4 | 18 | 22.70166 |
| 5 | 23 | 25.42808 |

Example 2

| Unit mm | | | | |
|---|---|---|---|---|
| Surface data | | | | |
| Surface no. | r | d | nd | vd |
| Object plane | ∞ | ∞ | | |
| 1 | 64.1556 | 1.2000 | 1.84666 | 23.78 |
| 2 | 37.0904 | 8.4716 | 1.49700 | 81.55 |
| 3 | −1162.2792 | 0.1500 | | |
| 4 | 34.0187 | 5.0784 | 1.72916 | 54.68 |
| 5 | 101.4155 | Variable | | |
| 6 | 297.4979 | 1.1000 | 1.72916 | 54.68 |
| 7 | 7.7542 | 3.4141 | | |
| 8* | 37.4496 | 1.1000 | 1.53368 | 55.90 |
| 9* | 18.3906 | 2.1481 | | |
| 10 | −13.3282 | 1.0000 | 1.59282 | 68.62 |
| 11 | 39.5370 | 2.2000 | 1.94594 | 17.98 |
| 12 | −52.4756 | Variable | | |
| 13 (stop) | ∞ | 0.7000 | | |
| 14* | 13.7419 | 3.2000 | 1.53368 | 55.90 |
| 15* | −16.6667 | 0.2000 | | |
| 16 | 646.8277 | 0.7000 | 1.84666 | 23.78 |
| 17 | 21.5938 | Variable | | |
| 18 | 21.0176 | 3.4000 | 1.76200 | 40.10 |
| 19 | −32.7582 | 0.1500 | | |
| 20 | 15.6826 | 3.9000 | 1.56883 | 56.36 |
| 21 | −15.6029 | 0.7000 | 1.80518 | 25.43 |
| 22 | 15.0481 | Variable | | |
| 23* | 593.4730 | 2.0000 | 1.53368 | 55.90 |
| 24* | −15.3902 | 2.2000 | | |
| 25 | ∞ | 1.0000 | 1.51633 | 64.14 |
| 26 | ∞ | 0.3000 | | |
| 27 | ∞ | 0.7000 | 1.51633 | 64.14 |
| 28 | ∞ | 0.5213 | | |
| Image plane (Light receiving surface) | ∞ | | | |

Aspherical surface data

8th surface

K = 0.
A2 = 0.0000E+00, A4 = −4.2882E−04, A6 = 7.7927E−06,
A8 = −1.3054E−08, A10 = 0.0000E+00

9th surface

K = 0.
A2 = 0.0000E+00, A4 = −6.0362E−04, A6 = 8.9092E−06,
A8 = −3.8039E−08, A10 = 0.0000E+00

14th surface

K = 0.
A2 = 0.0000E+00, A4 = −9.1865E−05, A6 = 1.0809E−07,
A8 = 0.0000E+00, A10 = 0.0000E+00

15th surface

K = 0.
A2 = 0.0000E+00, A4 = 8.8658E−05, A6 = 0.0000E+00,
A8 = 0.0000E+00, A10 = 0.0000E+00

23rd surface

K = 0.
A2 = 0.0000E+00, A4 = −4.9854E−04, A6 = 0.0000E+00,
A8 = 0.0000E+00, A10 = 0.0000E+00

24th surface

K = 0.
A2 = 0.0000E+00, A4 = −2.6516E−05, A6 = 0.0000E+00,
A8 = 0.0000E+00, A10 = 0.0000E+00

Various data

| | Wide angle | Intermediate | Telephoto |
|---|---|---|---|
| FL | 4.01483 | 13.53981 | 45.78194 |
| Fno | 1.8351 | 2.3179 | 2.8306 |
| ω | 38.4 | 12.2 | 3.6 |
| Image height | 3.00 | 3.00 | 3.00 |
| Lens total length | 98.2775 | 98.2500 | 98.2812 |
| BF | 0.52132 | 0.52000 | 0.52503 |
| d5 | 0.70000 | 19.77901 | 29.92741 |
| d12 | 31.02700 | 11.94178 | 1.79959 |
| d17 | 18.78297 | 12.69713 | 6.30809 |
| d22 | 2.23403 | 8.29987 | 14.70891 |

Zoom lens data

| G | Initial surface | Focal length |
|---|---|---|
| 1 | 1 | 53.77399 |
| 2 | 6 | −7.46979 |
| 3 | 13 | 28.58499 |
| 4 | 18 | 22.06881 |
| 5 | 23 | 28.14104 |

Example 3

| Unit mm | | | | |
|---|---|---|---|---|
| Surface data | | | | |
| Surface no. | r | d | nd | vd |
| Object plane | ∞ | ∞ | | |
| 1 | 63.5683 | 1.2000 | 1.84666 | 23.78 |
| 2 | 37.1184 | 8.8000 | 1.49700 | 81.61 |
| 3 | −1121.9823 | 0.1500 | | |
| 4 | 33.7332 | 5.2000 | 1.72916 | 54.68 |
| 5 | 96.3714 | Variable | | |
| 6 | 296.0130 | 1.1000 | 1.72916 | 54.68 |
| 7 | 7.4617 | 3.4724 | | |
| 8* | 38.0001 | 1.1000 | 1.53368 | 55.90 |
| 9* | 19.3797 | 2.0528 | | |
| 10 | −13.4317 | 1.0000 | 1.59282 | 68.63 |
| 11 | 39.8641 | 2.2000 | 1.94595 | 17.98 |
| 12 | −52.1009 | Variable | | |
| 13 (stop) | ∞ | 0.7000 | | |
| 14* | 14.2090 | 3.2000 | 1.53368 | 55.90 |
| 15* | −16.1843 | 0.2000 | | |
| 16 | 336.2294 | 0.7000 | 1.84666 | 23.78 |
| 17 | 21.0247 | Variable | | |
| 18 | 21.7948 | 3.4000 | 1.74400 | 44.78 |
| 19 | −29.6145 | 0.1500 | | |
| 20 | 16.7821 | 3.9000 | 1.57099 | 50.80 |
| 21 | −16.7735 | 0.7000 | 1.80518 | 25.42 |
| 22 | 16.8017 | Variable | | |
| 23* | −100.0000 | 2.0000 | 1.53368 | 55.90 |
| 24* | −14.8007 | 2.2000 | | |
| 25 | ∞ | 1.0000 | 1.51633 | 64.14 |
| 26 | ∞ | 0.3000 | | |
| 27 | ∞ | 0.7000 | 1.51633 | 64.14 |
| 28 | ∞ | 0.5313 | | |
| Image plane (Light receiving surface) | ∞ | | | |

Aspherical surface data

8th surface

K = 0.
A2 = 0.0000E+00, A4 = −4.2787E−04, A6 = 7.8053E−06,
A8 = 3.9279E−09, A10 = 0.0000E+00

9th surface

K = 0.
A2 = 0.0000E+00, A4 = −6.1721E−04, A6 = 9.3376E−06,
A8 = −3.7342E−08, A10 = 0.0000E+00

-continued

Unit mm

14th surface

K = 0.
A2 = 0.0000E+00, A4 = −9.3961E−05, A6 = 1.0370E−07,
A8 = 0.0000E+00, A10 = 0.0000E+00

15th surface

K = 0.
A2 = 0.0000E+00, A4 = 8.9752E−05, A6 = 0.0000E+00,
A8 = 0.0000E+00, A10 = 0.0000E+00

23rd surface

K = 0.
A2 = 0.0000E+00, A4 = −4.1583E−04, A6 = 0.0000E+00,
A8 = 0.0000E+00, A10 = 0.0000E+00

24th surface

K = 0.
A2 = 0.0000E+00, A4 = 1.2097E−04, A6 = 0.0000E+00,
A8 = 0.0000E+00, A10 = 0.0000E+00

Various data

|    | Wide angle | Intermediate | Telephoto |
|----|-----------|--------------|-----------|
| FL | 4.02662 | 13.51272 | 45.43028 |
| Fno | 1.8491 | 2.2611 | 2.8153 |
| ω | 38.3 | 12.3 | 3.7 |
| Image height | 3.00 | 3.00 | 3.00 |
| Lens total length | 98.3054 | 98.3000 | 98.3136 |
| BF | 0.53127 | 0.53000 | 0.53939 |
| d5 | 0.70000 | 19.78246 | 29.85000 |
| d12 | 30.78700 | 11.75238 | 1.63700 |
| d17 | 18.23547 | 12.37137 | 6.16873 |
| d22 | 2.62653 | 8.43863 | 14.69327 |

Zoom lens data

| G | Initial surface | Focal length |
|---|----------------|--------------|
| 1 | 1 | 53.83635 |
| 2 | 6 | −7.37469 |
| 3 | 13 | 28.78326 |
| 4 | 18 | 21.28816 |
| 5 | 23 | 32.28739 |

Example 4

Unit mm

Surface data

| Surface no. | r | d | nd | vd |
|-------------|---|---|----|----|
| Object plane | ∞ | ∞ | | |
| 1 | 57.4312 | 1.1000 | 1.84666 | 23.78 |
| 2 | 34.2144 | 8.9948 | 1.48749 | 70.23 |
| 3 | 642.8284 | 0.1500 | | |
| 4 | 33.1748 | 5.1517 | 1.72916 | 54.68 |
| 5 | 95.8748 | Variable | | |
| 6 | 400.0000 | 1.1000 | 1.72916 | 54.68 |
| 7 | 7.0807 | 4.2788 | | |
| 8* | 43.0000 | 1.1000 | 1.53368 | 55.90 |
| 9* | 17.1612 | 1.6669 | | |
| 10 | −15.8946 | 0.8500 | 1.59282 | 68.63 |
| 11 | 265.2395 | 2.2000 | 1.94595 | 17.98 |
| 12 | −29.1259 | Variable | | |
| 13 (stop) | ∞ | 0.7000 | | |
| 14* | 13.4810 | 3.2000 | 1.53368 | 55.90 |
| 15* | −18.6665 | 0.1500 | | |
| 16 | 181.9738 | 0.7000 | 1.84666 | 23.78 |
| 17 | 20.3665 | Variable | | |
| 18 | 20.6599 | 3.4000 | 1.72342 | 37.95 |
| 19 | −33.9741 | 0.1500 | | |
| 20 | 16.2761 | 3.8000 | 1.58313 | 59.38 |
| 21 | −16.2761 | 0.7000 | 1.80518 | 25.42 |
| 22 | 15.8190 | Variable | | |
| 23* | −100.0000 | 1.6000 | 1.53368 | 55.90 |
| 24* | −13.8070 | 2.7000 | | |
| 25 | ∞ | 1.0000 | 1.51633 | 64.14 |
| 26 | ∞ | 0.3000 | | |
| 27 | ∞ | 0.7000 | 1.51633 | 64.14 |
| 28 | ∞ | 0.5309 | | |
| Image plane (Light receiving surface) | ∞ | | | |

Aspherical surface data

8th surface

K = 0.
A2 = 0.0000E+00, A4 = −4.4787E−04, A6 = 7.3678E−06,
A8 = −4.4682E−08, A10 = 0.0000E+00

9th surface

K = 0.
A2 = 0.0000E+00, A4 = −7.1046E−04, A6 = 8.7428E−06,
A8 = −1.1765E−07, A10 = 0.0000E+00

14th surface

K = 0.
A2 = 0.0000E+00, A4 = −8.2921E−05, A6 = 6.5431E−08,
A8 = 0.0000E+00, A10 = 0.0000E+00

15th surface

K = 0.
A2 = 0.0000E+00, A4 = 7.9777E−05, A6 = 0.0000E+00,
A8 = 0.0000E+00, A10 = 0.0000E+00

23rd surface

K = 0.
A2 = 0.0000E+00, A4 = −4.8081E−04, A6 = 8.0925E−06,
A8 = 1.0950E−07, A10 = 0.0000E+00

24th surface

K = 0.
A2 = 0.0000E+00, A4 = 2.9366E−05, A6 = 5.2804E−06,
A8 = 1.9690E−07, A10 = 0.0000E+00

Various data

|    | Wide angle | Intermediate | Telephoto |
|----|-----------|--------------|-----------|
| FL | 3.99831 | 13.53193 | 45.87518 |
| Fno | 1.8421 | 2.2119 | 2.8553 |
| ω | 38.5 | 12.4 | 3.7 |
| Image height | 3.00 | 3.00 | 3.00 |
| Lens total length | 98.4411 | 98.4100 | 98.4452 |
| BF | 0.53091 | 0.53200 | 0.53496 |
| d5 | 0.70000 | 20.57107 | 31.58374 |
| d12 | 32.48400 | 12.62172 | 1.60026 |
| d17 | 16.30236 | 10.74618 | 5.55462 |
| d22 | 2.73164 | 8.24682 | 13.47938 |

Zoom lens data

| G | Initial surface | Focal length |
|---|----------------|--------------|
| 1 | 1 | 55.46328 |
| 2 | 6 | −7.99405 |
| 3 | 13 | 29.92609 |
| 4 | 18 | 22.98715 |
| 5 | 23 | 29.82289 |

Example 5

Unit mm

Surface data

| Surface no. | r | d | nd | vd |
|---|---|---|---|---|
| Object plane | ∞ | ∞ | | |
| 1 | 57.8120 | 1.1000 | 1.84666 | 23.78 |
| 2 | 34.2860 | 9.0000 | 1.48749 | 70.23 |
| 3 | 672.7620 | 0.1500 | | |
| 4 | 33.4940 | 5.1500 | 1.72916 | 54.68 |
| 5 | 99.7360 | Variable | | |
| 6 | 401.8870 | 1.1000 | 1.72916 | 54.68 |
| 7 | 7.1280 | 4.2800 | | |
| 8* | 43.0000 | 1.1000 | 1.53368 | 55.90 |
| 9* | 17.6153 | 1.6700 | | |
| 10 | −16.7900 | 0.8500 | 1.63854 | 55.45 |
| 11 | 104.6070 | 2.2000 | 1.94595 | 17.98 |
| 12 | −30.7220 | Variable | | |
| 13 (stop) | ∞ | 0.7000 | | |
| 14* | 13.2039 | 3.2000 | 1.53368 | 55.90 |
| 15* | −19.6413 | 0.1500 | | |
| 16 | 99.9290 | 0.7000 | 1.84666 | 23.78 |
| 17 | 18.7490 | Variable | | |
| 18 | 20.5380 | 3.4000 | 1.72342 | 37.95 |
| 19 | −34.2440 | 0.1500 | | |
| 20 | 16.1190 | 3.8000 | 1.58313 | 59.38 |
| 21 | −16.1190 | 0.7000 | 1.80518 | 25.42 |
| 22 | 15.8610 | Variable | | |
| 23* | −100.0000 | 1.6000 | 1.53368 | 55.90 |
| 24* | −13.9435 | 2.7000 | | |
| 25 | ∞ | 1.0000 | 1.51633 | 64.14 |
| 26 | ∞ | 0.3000 | | |
| 27 | ∞ | 0.7000 | 1.51633 | 64.14 |
| 28 | ∞ | 0.5330 | | |
| Image plane (Light receiving surface) | ∞ | | | |

Aspherical surface data

8th surface

$K = 0.$
$A2 = 0.0000E+00, A4 = -4.4787E-04, A6 = 7.3678E-06,$
$A8 = -4.4682E-08, A10 = 0.0000E+00$

9th surface

$K = 0.$
$A2 = 0.0000E+00, A4 = -7.0011E-04, A6 = 8.7587E-06,$
$A8 = -1.1554E-07, A10 = 0.0000E+00$

14th surface

$K = 0.$
$A2 = 0.0000E+00, A4 = -8.4732E-05, A6 = 4.6644E-08,$
$A8 = 0.0000E+00, A10 = 0.0000E+00$

15th surface

$K = 0.$
$A2 = 0.0000E+00, A4 = 7.4993E-05, A6 = 0.0000E+00,$
$A8 = 0.0000E+00, A10 = 0.0000E+00$

23rd surface

$K = 0.$
$A2 = 0.0000E+00, A4 = -5.0232E-04, A6 = 8.8113E-06,$
$A8 = 6.2288E-08, A10 = 0.0000E+00$

24th surface

$K = 0.$
$A2 = 0.0000E+00, A4 = -1.0619E-05, A6 = 5.5555E-06,$
$A8 = 1.6400E-07, A10 = 0.0000E+00$

Various data

| | Wide angle | Intermediate | Telephoto |
|---|---|---|---|
| FL | 4.00461 | 13.61600 | 46.25924 |
| Fno | 1.8421 | 2.2132 | 2.8656 |
| ω | 38.2 | 12.2 | 3.6 |
| Image height | 2.974 | 2.974 | 2.974 |
| Lens total length | 98.4600 | 98.4500 | 98.4636 |
| BF | 0.53296 | 0.53000 | 0.53657 |
| d5 | 0.70000 | 20.61039 | 31.58400 |
| d12 | 32.48400 | 12.60361 | 1.60000 |
| d17 | 16.30720 | 10.74364 | 5.52358 |
| d22 | 2.73580 | 8.26236 | 13.51942 |

Zoom lens data

| G | Initial surface | Focal length |
|---|---|---|
| 1 | 1 | 55.40660 |
| 2 | 6 | −7.99089 |
| 3 | 13 | 30.01582 |
| 4 | 18 | 22.76022 |
| 5 | 23 | 30.16510 |

Corresponding values of each of examples are shown below:

| | | Example1 | Example2 | Example3 | Example4 | Example5 |
|---|---|---|---|---|---|---|
| (101) | $\log(\beta 34T/\beta 34W)$ | 0.393 | 0.433 | 0.432 | 0.404 | 0.406 |
| (102) | $|\beta 2W|$ | 0.211 | 0.195 | 0.192 | 0.202 | 0.202 |
| (103) | $\log(\beta 2T/\beta 2W)/\log\gamma$ | 0.627 | 0.590 | 0.591 | 0.619 | 0.617 |
| (104) | $|\beta 34W|$ | 0.505 | 0.450 | 0.442 | 0.421 | 0.421 |
| (105) | f34W/f34T | 1.381 | 1.379 | 1.375 | 1.288 | 1.291 |
| (106) | fW/f123T | −0.0201 | −0.0212 | −0.0233 | −0.0139 | −0.0146 |
| (107) | f1/fW | 11.919 | 13.394 | 13.370 | 13.872 | 13.836 |
| (108) | f2/f1 | −0.145 | −0.139 | −0.137 | −0.144 | −0.144 |
| (109) | f4/fW | 5.478 | 5.491 | 5.281 | 5.744 | 5.679 |
| (110) | ff4/f4 | −1.194 | −1.192 | −1.162 | −1.174 | −1.173 |
| (111) | (R42F − R42R)/(R42F + R42R) | 0.025 | 0.021 | −0.001 | 0.014 | 0.008 |
| (112) | (R422F + R422R)/(R422F − R422R) | 0.309 | 0.018 | −0.001 | 0.014 | 0.008 |
| (113) | fb3/f3 | 0.855 | 0.879 | 0.881 | 0.881 | 0.878 |
| (114) | (R32F − R32R)/(R32F + R32R) | 0.473 | 0.935 | 0.974 | 0.799 | 0.684 |
| (115) | $|\beta 2T|$ | 0.971 | 0.820 | 0.803 | 0.912 | 0.914 |
| (116) | $|\beta 34T|$ | 1.249 | 1.220 | 1.196 | 1.067 | 1.073 |
| (117) | $|\beta FW|$ | 0.786 | 0.853 | 0.880 | 0.850 | 0.853 |

Further, parameters of each of examples are shown below:

|  | Example 1 | Example 2 | Example 3 | Example 4 | Example 5 |
|---|---|---|---|---|---|
| $\beta 34T/\beta 34W$ | 2.473 | 2.711 | 2.706 | 2.538 | 2.549 |
| $\beta 34W$ | −0.505 | −0.450 | −0.442 | −0.421 | −0.421 |
| $\beta 34T$ | −1.249 | −1.220 | −1.196 | −1.067 | −1.073 |
| $\beta 2W$ | −0.211 | −0.195 | −0.192 | −0.202 | −0.202 |
| $\beta 2T$ | −0.971 | −0.820 | −0.803 | −0.912 | −0.914 |
| $\beta 2T/\beta 2W$ | 4.602 | 4.205 | 4.182 | 4.525 | 4.525 |

|  | Example 1 | Example 2 | Example 3 | Example 4 | Example 5 |
|---|---|---|---|---|---|
| f34W | 20.020 | 19.280 | 19.178 | 18.538 | 18.554 |
| f34T | 14.497 | 13.980 | 13.946 | 14.39 | 14.369 |
| $\gamma = fT/fW$ | 11.429 | 11.391 | 11.270 | 11.463 | 11.542 |
| $\beta FW$ | 0.786 | 0.853 | 0.880 | 0.850 | 0.853 |

Corresponding values of each of examples are shown below:

|  |  | Example1 | Example2 | Example3 | Example4 | Example5 |
|---|---|---|---|---|---|---|
| (201) | $(\beta 34T/\beta 34W)/(\beta 2T/\beta 2W)$ | 0.537 | 0.645 | 0.647 | 0.560 | 0.563 |
| (202) | $\beta 2T/\beta 2W$ | 4.602 | 4.205 | 4.182 | 4.525 | 4.525 |
| (203) | $|\beta 2W|$ | 0.211 | 0.195 | 0.192 | 0.202 | 0.202 |
| (204) | $|\beta 2T|$ | 0.971 | 0.820 | 0.803 | 0.912 | 0.914 |
| (205) | f34W/f34T | 1.381 | 1.379 | 1.375 | 1.288 | 1.291 |
| (206) | $|\beta 34W|$ | 0.505 | 0.450 | 0.442 | 0.421 | 0.421 |
| (207) | $|\beta 34T|$ | 1.249 | 1.220 | 1.196 | 1.067 | 1.073 |
| (208) | (R42F − R42R)/(R42F + R42R) | 0.025 | 0.021 | −0.001 | 0.014 | 0.008 |
| (209) | (R422F + R422R)/(R422F − R422R) | 0.309 | 0.018 | −0.001 | 0.014 | 0.008 |
| (210) | (R32F − R32R)/(R32F + R32R) | 0.473 | 0.935 | 0.974 | 0.799 | 0.684 |
| (211) | $|\beta FW|$ | 0.786 | 0.853 | 0.880 | 0.850 | 0.853 |
| (212) | f4/fF | 0.893 | 0.784 | 0.659 | 0.771 | 0.755 |
| (213) | f4/f3 | 0.794 | 0.772 | 0.740 | 0.768 | 0.758 |
| (214) | f4/fW | 5.478 | 5.491 | 5.281 | 5.744 | 5.679 |
| (215) | ff4/f4 | −1.194 | −1.192 | −1.162 | −1.174 | −1.173 |
| (216) | fb3/f3 | 0.855 | 0.879 | 0.881 | 0.881 | 0.878 |
| (217) | f1/fW | 11.919 | 13.394 | 13.370 | 13.872 | 13.836 |
| (218) | fW/f123T | −0.0201 | −0.0212 | −0.0233 | −0.0139 | −0.0146 |

Further, parameters of each of examples are shown below:

|  | Example 1 | Example 2 | Example 3 | Example 4 | Example 5 |
|---|---|---|---|---|---|
| $\beta 2W$ | −0.211 | −0.195 | −0.192 | −0.202 | −0.202 |
| $\beta 2T$ | −0.971 | −0.820 | −0.803 | −0.912 | −0.914 |
| $\beta 34W$ | −0.505 | −0.450 | −0.442 | −0.421 | −0.421 |
| $\beta 34T$ | −1.249 | −1.220 | −1.196 | −1.067 | −1.073 |
| $\beta 34T/\beta 34W$ | 2.473 | 2.711 | 2.706 | 2.538 | 2.549 |
| f34W | 20.020 | 19.280 | 19.178 | 18.538 | 18.554 |
| f34T | 14.497 | 13.980 | 13.946 | 14.39 | 14.369 |
| fT/fW | 11.429 | 11.391 | 11.270 | 11.463 | 11.542 |
| $\beta FW$ | 0.786 | 0.853 | 0.880 | 0.850 | 0.853 |
| f3 | 28.585 | 28.585 | 28.783 | 29.926 | 30.016 |
| f4 | 22.702 | 22.069 | 21.288 | 22.987 | 22.760 |
| fF | 25.428 | 28.141 | 32.287 | 29.823 | 30.165 |

Corresponding values of each of examples are shown below:

|  |  | Example1 | Example2 | Example3 | Example4 | Example5 |
|---|---|---|---|---|---|---|
| (301) | $|f2|/fT$ | 0.152 | 0.163 | 0.162 | 0.174 | 0.173 |
| (302) | f2/f1 | −0.145 | −0.139 | −0.137 | −0.144 | −0.144 |
| (303) | $R21R/(fT*\tan\omega W)$ | 0.188 | 0.214 | 0.208 | 0.194 | 0.196 |
| (304) | f21/f2B | −0.0245 | 0.1755 | 0.1646 | 0.0148 | 0.0241 |
| (305) | $\nu 21 - \nu 23$ | −19.00 | −13.94 | −13.95 | −13.95 | −0.77 |
| (306) | R13R/R21F | 0.733 | 0.340 | 0.326 | 0.240 | 0.248 |
| (307) | (R11F + R12R)/(R11F − R12R) | −1.190 | −0.895 | −0.893 | −1.196 | −1.188 |
| (308) | f1/fW | 11.919 | 13.394 | 13.370 | 13.872 | 13.836 |

-continued

|  |  | Example1 | Example2 | Example3 | Example4 | Example5 |
|---|---|---|---|---|---|---|
| (309) | (R42F − R42R)/(R42F + R42R) | 0.025 | 0.021 | −0.001 | 0.014 | 0.008 |
| (310) | (R422F + R422R)/(R422F − R422R) | 0.309 | 0.018 | −0.001 | 0.014 | 0.008 |
| (311) | (R41F + R41R)/(R41F − R41R) | −0.240 | −0.218 | −0.152 | −0.244 | −0.250 |
| (312) | (R32F − R32R)/(R32F + R32R) | 0.473 | 0.935 | 0.974 | 0.799 | 0.684 |
| (313) | log($\beta$2T/$\beta$2W)/log$\gamma$ | 0.627 | 0.590 | 0.591 | 0.619 | 0.617 |
| (314) | |$\beta$2W| | 0.211 | 0.195 | 0.192 | 0.202 | 0.202 |
| (315) | log($\beta$34T/$\beta$34W) | 0.393 | 0.433 | 0.432 | 0.404 | 0.406 |
| (316) | |$\beta$34W| | 0.505 | 0.450 | 0.442 | 0.421 | 0.421 |

Further, parameters of each of examples are shown below:

|  | Example 1 | Example 2 | Example 3 | Example 4 | Example 5 |
|---|---|---|---|---|---|
| R21R | 6.823 | 7.754 | 7.462 | 7.081 | 7.128 |
| f21 | −9.284 | −10.937 | −10.515 | −9.898 | −9.964 |
| f2B | 379.298 | −62.309 | −63.882 | −668.847 | −413.801 |
| $\beta$2W | −0.211 | −0.195 | −0.192 | −0.202 | −0.202 |
| $\beta$2T | −0.971 | −0.820 | −0.803 | −0.912 | −0.914 |
| $\beta$2T/$\beta$2W | 4.602 | 4.205 | 4.182 | 4.525 | 4.525 |
| $\beta$34W | −0.505 | −0.450 | −0.442 | −0.421 | −0.421 |
| $\beta$34T | −1.249 | −1.220 | −1.196 | −1.067 | −1.073 |
| $\beta$34T/$\beta$34W | 2.473 | 2.711 | 2.706 | 2.538 | 2.549 |
| $\gamma$ = fT/fW | 11.429 | 11.391 | 11.270 | 11.463 | 11.542 |

Corresponding values of each of examples are shown below:

|  |  | Example1 | Example2 | Example3 | Example4 | Example5 |
|---|---|---|---|---|---|---|
| (401) | (R42F − R42R)/(R42F + R42R) | 0.025 | 0.021 | −0.001 | 0.014 | 0.008 |
| (402) | (R422F + R422R)/(R422F − R422R) | 0.309 | 0.018 | −0.001 | 0.014 | 0.008 |
| (403) | (R41F + R41R)/(R41F − R141R) | −0.240 | −0.218 | −0.152 | −0.244 | −0.250 |
| (404) | f4/fW | 5.478 | 5.491 | 5.281 | 5.744 | 5.679 |
| (405) | ff4/f4 | −1.194 | −1.192 | −1.162 | −1.174 | −1.173 |
| (406) | f34W/f34T | 1.381 | 1.379 | 1.375 | 1.288 | 1.291 |
| (407) | log($\beta$34T/$\beta$34W) | 0.393 | 0.433 | 0.432 | 0.404 | 0.406 |
| (408) | (R32F − R32R)/(R32F + R32R) | 0.473 | 0.935 | 0.974 | 0.799 | 0.684 |
| (409) | |$\beta$34W| | 0.505 | 0.450 | 0.442 | 0.421 | 0.421 |
| (410) | |$\beta$FW| | 0.786 | 0.853 | 0.880 | 0.850 | 0.853 |
| (411) | f2/f1 | −0.145 | −0.139 | −0.137 | −0.144 | −0.144 |
| (412) | f1/fW | 11.919 | 13.394 | 13.370 | 13.872 | 13.836 |
| (413) | log($\beta$2T/$\beta$2W)/log$\gamma$ | 0.627 | 0.590 | 0.591 | 0.619 | 0.617 |
| (414) | |$\beta$2W| | 0.211 | 0.195 | 0.192 | 0.202 | 0.202 |
| (415) | fW/f123T | −0.0201 | −0.0212 | −0.0233 | −0.0139 | −0.0146 |

Further, parameters of each of examples are shown below:

|  | Example 1 | Example 2 | Example 3 | Example 4 | Example 5 |
|---|---|---|---|---|---|
| f34W | 20.020 | 19.280 | 19.178 | 18.538 | 18.554 |
| f34T | 14.497 | 13.980 | 13.946 | 14.39 | 14.369 |
| $\beta$34W | −0.505 | −0.450 | −0.442 | −0.421 | −0.421 |
| $\beta$34T | −1.249 | −1.220 | −1.196 | −1.067 | −1.073 |
| $\beta$34T/$\beta$34W | 2.473 | 2.711 | 2.706 | 2.538 | 2.549 |
| $\gamma$ = fT/fW | 11.429 | 11.391 | 11.270 | 11.463 | 11.542 |

-continued

|  | Example 1 | Example 2 | Example 3 | Example 4 | Example 5 |
|---|---|---|---|---|---|
| $\beta$FW | 0.786 | 0.853 | 0.880 | 0.850 | 0.853 |
| $\beta$2W | −0.211 | −0.195 | −0.192 | −0.202 | −0.202 |
| $\beta$2T | −0.971 | −0.820 | −0.803 | −0.912 | −0.914 |

Thus, it is possible to use such image forming (image pickup) optical system of the present invention in an image pickup apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below.

Figure 11:
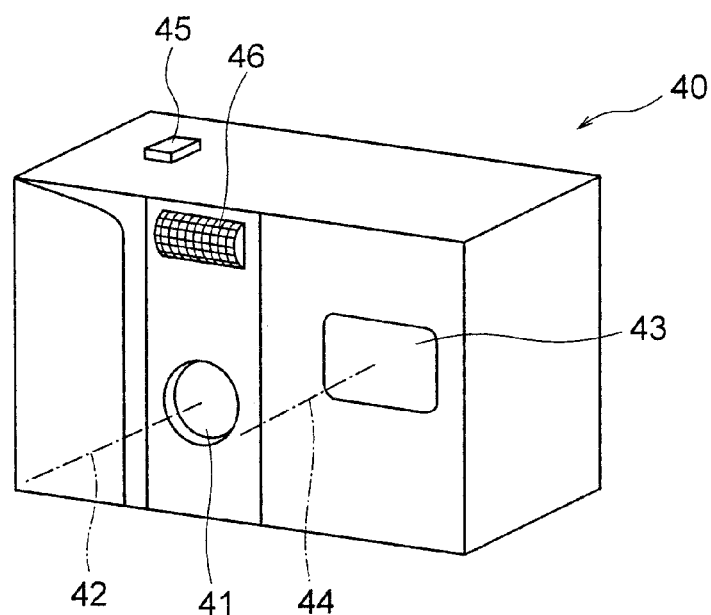
FIG. 11 is a front perspective view showing an appearance of a digital camera 40 in which, the zoom lens according to the present invention is incorporated.
Figure 12:
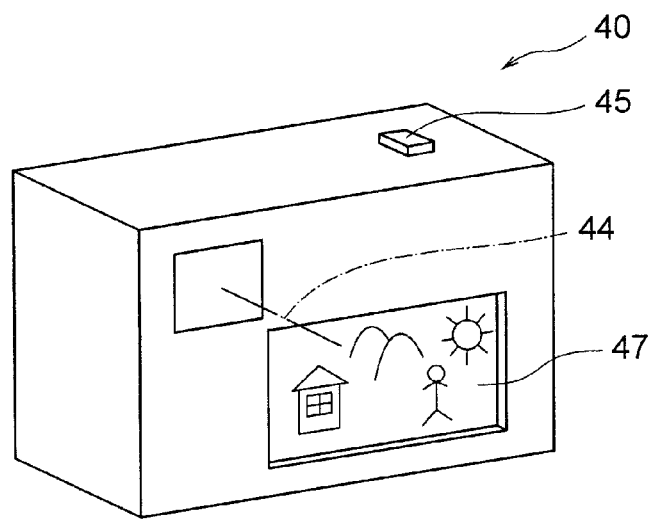
FIG. 12 is a rear perspective view of the digital camera 40.
Figure 13:
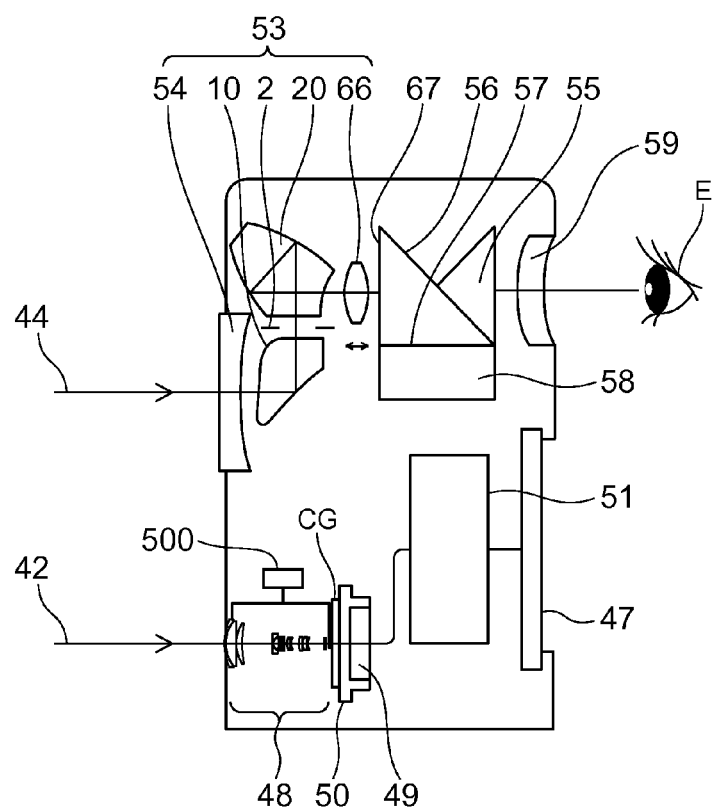
FIG. 13 is a cross-sectional view showing an optical structure of the digital camera 40.

In FIG. 11 to FIG. 13 show conceptual diagrams of structures in which the image forming optical system according to the present invention is incorporated in a photographic optical system 41 of a digital camera. FIG. 11 is a frontward perspective view showing an appearance of a digital camera 40, FIG. 12 is a rearward perspective view of the same, and FIG. 13 is a cross-sectional view showing an optical arrangement of the digital camera 40.

The digital camera 40, in a case of this example, includes the photographic optical system 41 (an objective optical system for photography 48) having an optical path for photography 42, a finder optical system 43 having an optical path for finder 44, a shutter button 45, a flash 46, and a liquid-crystal display monitor 47. Moreover, when the shutter button 45 disposed at an upper portion of the camera 40 is pressed, in conjugation with this, a photograph is taken through the photographic optical system 41 (objective optical system for photography 48) such as the zoom lens in the first embodiment.

An object image formed by the photographic optical system 41 (photographic objective optical system 48) is formed on an image pickup surface 50 of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording (recorded writing) electronically by a flexible disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame of a Porro prism which is an image erecting member equipped with a first reflecting surface 56 and a second reflecting surface 58. On a rear side of this Porro prism, an eyepiece optical system 59 which guides an image formed as an erected normal image is disposed.

By the digital camera 40 structured in such manner, it is possible to realize an optical image pickup apparatus having a zoom lens with a reduced size and thickness, in which the number of structural components is reduced.

Further, the present invention could be applied not only the above-mentioned collapsible type digital camera but also a bending type digital camera having a bending optical system.

The digital camera includes an auto-focus mechanism 500 which is integrated with an image pickup optical system. By installing the auto-focus mechanism 500, it is possible to focus at any object distance.

Moreover, it is desirable that the image pickup optical system and an electronic image pickup element chip 162 (electronic image pickup element) are integrated.

By integrating the electronic image pickup element, it is possible to convert an optical image captured by the image pickup optical system to an electric signal. Moreover, by selecting an electronic image pickup element which is capable of reducing a change in a brightness of an image in a central portion and a peripheral portion of the image, it is possible to provide a digital camera (an image pickup apparatus) having a small size and an improved performance.

Figure 14:
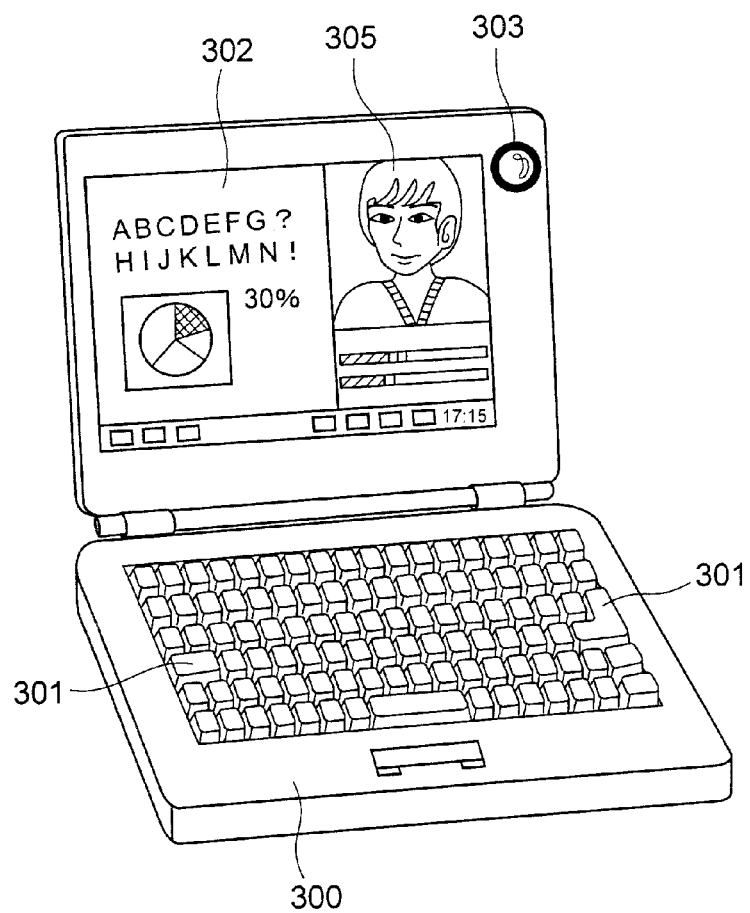
FIG. 14 is a front perspective view of a state in which a cover of a personal computer 300 which is an example of an information processing apparatus in which, an optical system of the present invention is built-in as an objective optical system.
Figure 15:
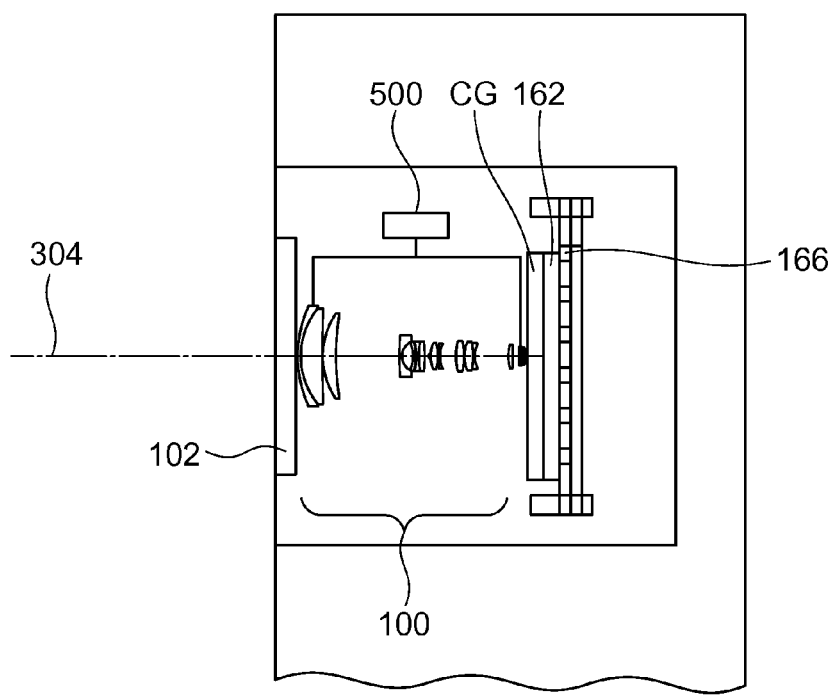
FIG. 15 is a cross-sectional view of a photographic optical system 303 of the personal computer 300.
Figure 16:
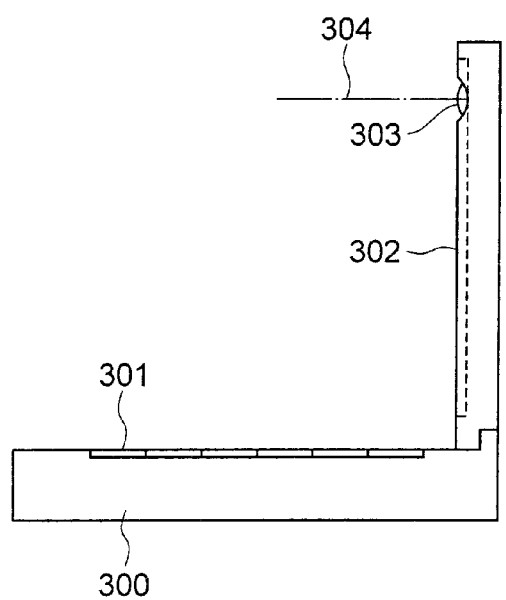
FIG. 16 is a side view of the personal computer 300.

Next, a personal computer which is an example of an information processing apparatus with a built-in image forming system as an objective optical system is shown in FIG. 14 to FIG. 16. FIG. 14 is a frontward perspective view of a personal computer 300 with its cover opened, FIG. 15 is a cross-sectional view of a photographic optical system 303 of the personal computer 300, and FIG. 16 is a side view of FIG. 14. As it is shown in FIG. 14 to FIG. 16, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the zoom lens in the first embodiment for example, and an electronic image pickup element chip 162 which receives an image. These are built into the personal computer 300.

At a front end of a mirror frame, a cover glass 102 for protecting the objective optical system 100 is disposed. At a front surface side of the electronic image pickup element chip 162, a cover glass CG is disposed.

An object image received at the electronic image pickup element chip 162 is input to a processing means of the personal computer 300 via a terminal 166. Further, the object image is displayed as an electronic image on the monitor 302. In FIG. 14, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

The personal computer includes an auto-focus mechanism 500 which is integrated with an objective optical system 100 (image pickup optical system). By installing the auto-focus mechanism 500, it is possible to focus at any object distance.

Moreover, it is desirable that the objective optical system 100 (image pickup optical system) and an electronic image pickup element chip 162 (electronic image pickup element) are integrated.

By integrating the electronic image pickup element, it is possible to convert an optical image captured by the image pickup optical system to an electric signal. Moreover, by selecting an electronic image pickup element which is capable of reducing a change in a brightness of an image in a central portion and a peripheral portion of the image, it is possible to provide a personal computer (an image pickup apparatus) having a small size and an improved performance.

Figure 17A:
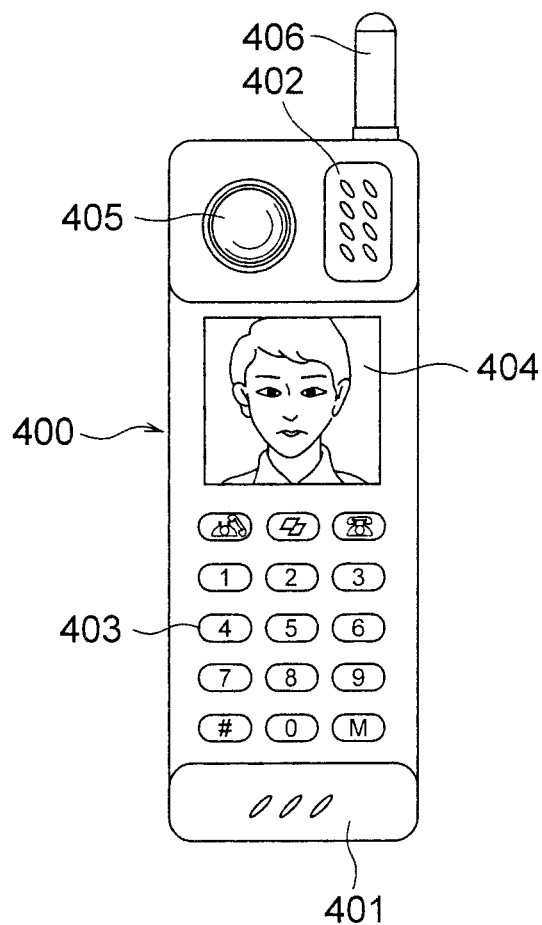
FIG. 17A, FIG. 17B, and FIG. 17C are diagrams showing a mobile telephone which is an example of an information processing apparatus in which, the optical system of the present invention is built-in as a photographic optical system, where.
Figure 17B:
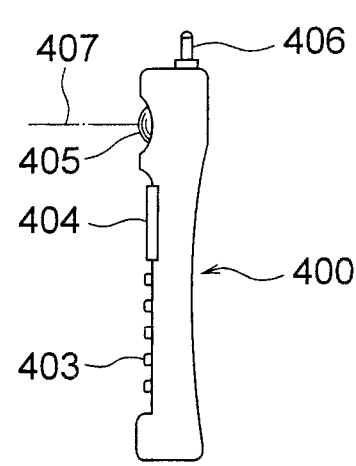
Figure 17C:
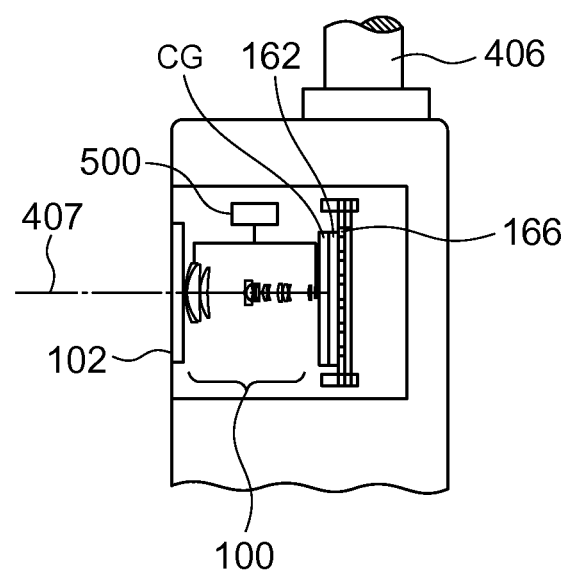

Next, a telephone which is an example of an information processing apparatus in which the image forming optical system of the present invention is built-in as a photographic optical system, particularly a portable telephone which is easy to carry is shown in FIG. 17A, FIG. 17B, and FIG. 17C. FIG. 17A is a front view of a portable telephone 400, FIG. 17B is a side view of the portable telephone 400, and FIG. 17C is a cross-sectional view of a photographic optical system 405. As shown in FIG. 17A to FIG. 17C, the portable telephone 400 includes a microphone section 401, a speaker section 402, an input button 403, monitor 404, the photographic optical system 405, an antenna 406, and a processing means.

Here, the microphone section 401 is for inputting a voice of the operator as information. The speaker section 402 is for outputting a voice of the communication counterpart. The input button 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first embodiment for example, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

The telephone includes an auto-focus mechanism 500 which is integrated with an objective optical system 100 (image pickup optical system). By installing the auto-focus mechanism 500, it is possible to focus at any object distance.

Moreover, it is desirable that the objective optical system 100 (image pickup optical system) and an electronic image pickup element chip 162 (electronic image pickup element) are integrated.

By integrating the electronic image pickup element, it is possible to convert an optical image captured by the image pickup optical system to an electric signal. Moreover, by selecting an electronic image pickup element which is capable of reducing a change in a brightness of an image in a central portion and a peripheral portion of the image, it is possible to provide a telephone (an image pickup apparatus) having a small size and an improved performance.

The present invention can have various modifications which fairly fall within the basic teaching herein set forth.

As it has been described above, the present invention is suitable for an image pickup optical system in which, various aberrations, particularly the coma aberration, are corrected favorably, and an image pickup apparatus in which the image pickup optical system is used.

According to the present invention, it is possible to provide a zoom lens in which various aberrations are corrected favorably while the zoom lens has a high zooming ratio, a wide angle of field, and a small F-value at the wide angle end, and an image pickup apparatus in which the zoom lens is used.

What is claimed is:
1. A zoom lens comprising in order from an object side:
a first lens group having a positive refractive power;
a second lens group having a negative refractive power;
a third lens group having a positive refractive power;
a fourth lens group having a positive refractive power; and
a last lens group having a positive refractive power, wherein
at the time of zooming from a wide angle end to a telephoto end, the first lens group is fixed, the second lens group moves toward a side of an image plane, the third lens group is fixed, and the fourth lens group moves, and
at the time of focusing, the fourth lens group moves, and
the zoom lens satisfies the following conditional expression (101)

$$0.20 < \log(\beta 34T/\beta 34W) < 0.9 \cdot \log \gamma \quad (101)$$

where,
$\beta 34W$ denotes a magnification of a combined system of the third lens group and the fourth lens group at the wide angle end,
$\beta 34T$ denotes a magnification of the combined system of the third lens group and the fourth lens group at the telephoto end,
fW denotes a focal length of the overall zoom lens system at the wide angle end,
fT denotes a focal length of the overall zoom lens system at the telephoto end, and
$\gamma = fT/fW > 7$, and
each of the magnification or the focal length is a magnification or a focal length at the time of infinite object point focusing.

2. The zoom lens according to claim 1, wherein the zoom lens satisfies the following conditional expression (102)

$$0.1 < |\beta 2W| < 0.30 \quad (102)$$

where,
$\beta 2W$ denotes a magnification of the second lens group at the wide angle end, and is a magnification at the time of infinite object point focusing.

3. The zoom lens according to claim 1, wherein the zoom lens satisfies the following conditional expression (103)

$$0.3 < \log(\beta 2T/\beta 2W)/\log \gamma < 0.8 \quad (103)$$

where,
$\beta 2W$ denotes a magnification of the second lens group at the wide angle end,
$\beta 2T$ denotes a magnification of the second lens group at the telephoto end,
fW denotes the focal length of the overall zoom lens system at the wide angle end,
fT denotes the focal length of the overall zoom lens system at the telephoto end, and
$\gamma = fT/fW > 7$, and
each of the magnification or the focal length is a magnification or a focal length at the time of infinite object point focusing.

4. The zoom lens according to claim 1, wherein the zoom lens satisfies the following conditional expression (104)

$$0.30 < |\beta 34W| < 0.70 \quad (104)$$

where,
$\beta 34W$ denotes the magnification of the combined system of the third lens group and the fourth lens group at the wide angle end, and is a magnification at the time of infinite object point focusing.

5. The zoom lens according to claim 1, wherein the zoom lens satisfies the following conditional expression (105)

$$1.10 < f34W/f34T < 2.00 \quad (105)$$

where,
$\beta 34W$ denotes the magnification of the combined system of the third lens group and the fourth lens group at the wide angle end,
$\beta 34T$ denotes the magnification of the combined system of the third lens group and the fourth lens group at the telephoto end, and each of the magnification or the focal length is a magnification or a focal length at the time of infinite object point focusing.

6. The zoom lens according to claim 1, wherein the zoom lens satisfies the following conditional expression (106)

$$-0.5 < fW/f123T < 0.10 \qquad (106)$$

where, fW denotes the focal length of the overall zoom lens system at the wide angle end, f123T denotes a focal length of a combined system from the first lens group up to the third lens group at the telephoto end, and each of fW and f123T is a focal length at the time of infinite object focusing.

7. The zoom lens according to claim 1, wherein the zoom lens satisfies the following conditional expression (107)

$$9 < f1/fW < 18 \qquad (107)$$

where, f1 denotes a focal length of the first lens group, and fW denotes the focal length of the overall zoom lens system at the wide angle end, and is the focal length at the time of infinite object point focusing.

8. The zoom lens according to claim 1, wherein the zoom lens satisfies the following conditional expression (108)

$$-0.18 < f2/f1 < -0.06 \qquad (108)$$

where, f1 denotes a focal length of the first lens group, and f2 denotes a focal length of the second lens group.

9. The zoom lens according to claim 1, wherein the zoom lens satisfies the following conditional expression (109)

$$4.0 < f4/fW < 10.0 \qquad (109)$$

where, f4 denotes a focal length of the fourth lens group, and fW denotes the focal length of the overall zoom lens system at the wide angle end, and is a focal length at the time of infinite object point focusing.

10. The zoom lens according to claim 1, wherein the zoom lens satisfies the following conditional expression (110)

$$-2.00 < ff4/f4 < -1.00 \qquad (110)$$

where, f4 denotes a focal length of the fourth lens group, and ff4 denotes a distance from an apex of a lens nearest to the object side of the fourth lens group up to a front-side focal position of the fourth lens group.

11. The zoom lens according to claim 1, wherein the fourth lens group includes in order from the object side, a lens component having a positive refractive power, and a lens component having a negative refractive power, and each of the lens components is one of a single lens and a cemented lens, and has two optical surfaces which are in contact with air.

12. The zoom lens according to claim 11, wherein the zoom lens satisfies the following conditional expression (111)

$$-0.3 < (R42F-R42R)/(R42F+R42R) < 0.6 \qquad (111)$$

where,

R42F denotes a paraxial radius of curvature of a surface nearest to the object side of the lens component having a negative refractive power in the fourth lens group, and R42R denotes a paraxial radius of curvature of a surface nearest to an image side of the lens component having a negative refractive power in the fourth lens group.

13. The zoom lens according to claim 11, wherein the lens component having a negative refractive power in the fourth lens group is a cemented lens, and the cemented lens includes in order from the object side, a single lens having a positive refractive power, and a single lens having a negative refractive power, and the zoom lens satisfies the following conditional expression (112)

$$-0.5 < (R422F+R422R)/(R422F-R422R) < 1.2 \qquad (112)$$

where,

R422F denotes a paraxial radius of curvature of a surface nearest to the object side of the single lens having a negative refractive power in the fourth lens group, and R422R denotes a paraxial radius of curvature of a surface nearest to an image side of the single lens having a negative refractive power in the fourth lens group.

14. The zoom lens according to claim 1, wherein the zoom lens satisfies the following conditional expression (113)

$$0.50 < fb3/f3 < 1.5 \qquad (113)$$

where, f3 denotes a focal length of the third lens group, and fb3 denotes a distance from an apex of a lens nearest to an image side of the third lens group up to a rear-side focal position of the third lens group.

15. The zoom lens according to claim 1, wherein the third lens group includes in order from the object side, two lens components namely, a lens component having a positive refractive power and a lens component having a negative refractive power, and the zoom lens satisfies the following conditional expression (114)

$$0.1 < (R32F-R32R)/(R32F+R32R) < 5.0 \qquad (114)$$

where,

R32F denotes a paraxial radius of curvature of a surface nearest to the object side of the lens component having a negative refractive power in the third lens group, and R32R denotes a paraxial radius of curvature of a surface nearest to an image side of the lens component having a negative refractive power in the third lens group, and each lens component is one of a single lens and a cemented lens, and has two optical surfaces which are in contact with air.

16. The zoom lens according to claim 1, wherein the last lens group includes a lens component having a positive refractive power, and the lens component is one of a single lens and a cemented lens, and has two optical surfaces which are in contact with air.

17. An image pickup apparatus comprising:

a zoom lens according to claim 1; and an image pickup element which is disposed at an image plane of the zoom lens.

18. A zoom lens comprising in order from an object side:

a first lens group having a positive refractive power;

a second lens group having a negative refractive power;

a third lens group having a positive refractive power;

a fourth lens group having a positive refractive power; and a last lens group having a positive refractive power, wherein at the time of zooming from a wide angle end to a telephoto end, the first lens group is fixed, the second lens group moves toward a side of an image plane, the third lens group is fixed, and the fourth lens group moves, and at the time of focusing, the fourth lens group moves, and the zoom lens satisfies the following conditional expressions (201) and (202)

$$0.35<(\beta34T/\beta34W)/(\beta2T/\beta2W)<1.2 \quad (201)$$

$$3.0<\beta2T/\beta2W<fT/fW \quad (202)$$

where,

β2W denotes a magnification of the second lens group at the wide angle end;

β2T denotes a magnification of the second lens group at the telephoto end,

β34W denotes a magnification of a combined system of the third lens group and the fourth lens group at the wide angle end, β34T denotes a magnification of the combined system of the third lens group and the fourth lens group at the telephoto end, fW denotes a focal length of the overall zoom lens system at the wide angle end, fT denotes a focal length of the overall zoom lens system at the telephoto end, fT/fW>7, and each of the magnification or the focal length is a magnification or a focal length at the time of infinite object point focusing.

19. The zoom lens according to claim 18, wherein the zoom lens satisfies the following conditional expression (203)

$$0.1<|\beta2W|<0.30 \quad (203)$$

where,

β2W denotes a magnification of the second lens group at the wide angle end, and is a magnification at the time of infinite object point focusing.

20. The zoom lens according to claim 18, wherein the zoom lens satisfies the following conditional expression (204)

$$0.7<|\beta2T|<2.0 \quad (204)$$

where,

β2T denotes a magnification of the second lens group at the telephoto end, and is a magnification at the time of infinite object point focusing.

21. The zoom lens according to claim 18, wherein the zoom lens satisfies the following conditional expression (205)

$$1.10<f34W/f34T<2.00 \quad (205)$$

where, f34W denotes a focal length of the combined system of the third lens group and the fourth lens group at the wide angle end, f34T denotes a focal length of the combined system of the third lens group and the fourth lens group at the telephoto end, and each of the focal lengths is a focal length at the time of infinite object point focusing.

22. The zoom lens according to claim 18, wherein the zoom lens satisfies the following conditional expression (206)

$$0.30<|\beta34W|<0.70 \quad (206)$$

where,

β34W denotes the magnification of the combined system of the third lens group and the fourth lens group at the wide angle end, and is a magnification at the time of infinite object point focusing.

23. The zoom lens according to claim 18, wherein the zoom lens satisfies the following conditional expression (207)

$$0.90<|\beta34T|<1.80 \quad (207)$$

where,

β34T denotes the magnification of the combined system of the third lens group and the fourth lens group at the telephoto end, and is a magnification at the time of infinite object point focusing.

24. The zoom lens according to claim 18, wherein a direction of movement of the fourth lens group at the time of zooming is toward the object side all the time.

25. The zoom lens according to claim 18, wherein the fourth lens group includes in order from the object side,
a lens component having a positive refractive power, and
a lens component having a negative refractive power, and each of the lens components is one of a single lens and a cemented lens, and has two optical surfaces which are in contact with air.

26. The zoom lens according to claim 25, wherein the zoom lens satisfies the following conditional expression (208)

$$-0.3<(R42F-R42R)/(R42F+R42R)<0.6 \quad (208)$$

where,

R42F denotes a paraxial radius of curvature of a surface nearest to the object side of the lens component having a negative refractive power in the fourth lens group, and R42R denotes a paraxial radius of curvature of a surface nearest to an image side of the lens component having a negative refractive power in the fourth lens group.

27. The zoom lens according to claim 25, wherein the lens component having a negative refractive power in the fourth lens group is a cemented lens, and the cemented lens includes in order from the object side, a single lens having a positive refractive power, and a single lens having a negative refractive power, and the zoom lens satisfies the following conditional expression (209)

$$-0.5<(R422F+R422R)/(R422F-R422R)<1.2 \quad (209)$$

where,

R422F denotes a paraxial radius of curvature of a surface nearest to the object side of the single lens having a negative refractive power in the fourth lens group, and R422R denotes a paraxial radius of curvature of a surface nearest to an image side of the single lens having a negative refractive power in the fourth lens group.

28. The zoom lens according to claim 18, wherein the third lens group includes in order from the object side, two lens components namely, a lens component having a positive refractive power and a lens component having a negative refractive power, and each lens component is one of a single lens and a cemented lens, and has two optical surfaces which are in contact with air.

29. The zoom lens according to claim 28, wherein the zoom lens satisfies the following conditional expression (210)

$$0.1<(R32F-R32R)/(R32F+R32R)<5.0 \quad (210)$$

where,

R32F denotes a paraxial radius of curvature of a surface nearest to the object side of the lens component having a negative refractive power in the third lens group, and R32R denotes a paraxial radius of curvature of a surface nearest to an image side of the lens component having a negative refractive power in the third lens group.

30. The zoom lens according to claim 18, wherein the last lens group includes a lens component having a positive refractive power, and the lens component has two optical surfaces which are in contact with air.

31. The zoom lens according to claim 30, wherein the zoom lens satisfies the following conditional expression (211)

$$0.70<|\beta FW|<0.98 \quad (211)$$

where,
βFW denotes a magnification of the last lens group at the wide angle end, and is a magnification at the time of infinite object point focusing.

32. The zoom lens according to claim 18 wherein the zoom lens satisfies the following conditional expression (212)

$$0.4<f4/fF<1.2 \quad (212)$$

where,
f4 denotes a focal length of the fourth lens group, and
fF denotes a focal length of the last lens group.

33. The zoom lens according to claim 18, wherein the zoom lens satisfies the following conditional expression (213)

$$0.40<f4/f3<1.00 \quad (213)$$

where,
f3 denotes a focal length of the third lens group, and
f4 denotes a focal length of the fourth lens group.

34. The zoom lens according to claim 18, wherein the zoom lens satisfies the following conditional expression (214)

$$0<f4/fW<10.0 \quad (214)$$

where,
f4 denotes a focal length of the fourth lens group, and
fW denotes the focal length of the overall zoom lens system at the wide angle end, and is a focal length at the time of infinite object point focusing.

35. The zoom lens according to claim 18, wherein the zoom lens satisfies the following conditional expression (215)

$$-2.00<ff4/f4<-1.00 \quad (215)$$

where,
f4 denotes a focal length of the fourth lens group, and
ff4 denotes a distance from an apex of a lens nearest to the object side of the fourth lens group up to a front-side focal position of the fourth lens group.

36. The zoom lens according to claim 18, wherein the zoom lens satisfies the following conditional expression (216)

$$0.50<fb3/f3<1.5 \quad (216)$$

where,
f3 denotes a focal length of the third lens group, and
fb3 denotes a distance from an apex of a lens nearest to an image side of the third lens group up to a rear-side focal position of the third lens group.

37. The zoom lens according to claim 18, wherein the zoom lens satisfies the following conditional expression (217)

$$9<f1/fW<18 \quad (217)$$

where,
f1 denotes a focal length of the first lens group, and
fW denotes the focal length of the overall zoom lens system at the wide angle end, and is the focal length at the time of infinite object point focusing.

38. The zoom lens according to claim 18, wherein the zoom lens satisfies the following conditional expression (218)

$$-0.5<fW/f123T<0.10 \quad (218)$$

where,
fW denotes the focal length of the overall zoom lens system at the wide angle end, f123T denotes a focal length of a combined system from the first lens group up to the third lens group at the telephoto end, and
each of fW and f123T is a focal length at the time of infinite object focusing.

39. An image pickup apparatus comprising:
a zoom lens according to claim 18; and
an image pickup element which is disposed on an image plane of the zoom lens.

40. A zoom lens comprising in order from an object side:
a first lens group having a positive refractive power;
a second lens group having a negative refractive power;
a third lens group having a positive refractive power;
a fourth lens group having a positive refractive power; and
a last lens group having a positive refractive power, wherein
at the time of zooming from a wide angle end to a telephoto end, the first lens group is fixed, the second lens group moves toward a side of an image plane, the third lens group is fixed, and the fourth lens group moves, and at the time of focusing, the fourth lens group moves, and
the second lens group includes in order from the object side, an object-side negative lens of which, a surface on an image side has a sharp curvature, a lens having a refractive power smaller than the refractive power of the overall second lens group, and a cemented lens of a negative lens and a positive lens, and
the zoom lens satisfies the following conditional expression (301)

$$0.07<|f2|/fT<0.35 \quad (301)$$

where,
f2 denotes a focal length of the second lens group, and
fT denotes a focal length of the overall zoom lens system at the telephoto end, and is a focal length at the time of infinite object point focusing.

41. The zoom lens according to claim 40, wherein the zoom lens satisfies the following conditional expression (302)

$$-0.18<f2/f1<-0.06 \quad (302)$$

where,
f1 denotes a focal length of the first lens group, and
f2 denotes a focal length of the second lens group.

42. The zoom lens according to claim 40, wherein the zoom lens satisfies the following conditional expression (303)

$$0.07<R21R/(fT\cdot\tan\omega W)<0.28 \quad (303)$$

where,
R21R denotes a paraxial radius of curvature of the image-side surface of the object-side negative lens in the second lens group,
fT denotes a focal length of the overall zoom lens system at the telephoto end, and is a focal length at the time of infinite object point focusing, and
ωW denotes the maximum half angle of field at the wide angle end (including distortion).

43. The zoom lens according to claim 40, wherein the zoom lens satisfies the following conditional expression (304)

$$-0.10<f21/f2B<0.25 \quad (304)$$

where,
f21 denotes a focal length of the object-side negative lens in the second lens group, and
f2B denotes a focal length of the cemented lens in the second lens group.

44. The zoom lens according to claim 40, wherein the zoom lens satisfies the following conditional expression (305)

$$-30 < v21-v23 < 15 \tag{305}$$

where,
v21 denotes Abbe's number for the object-side negative lens in the second lens group,
v23 denotes Abbe's number for the negative lens in the cemented lens in the second lens group, and
v24 denotes Abbe's number for the positive lens in the cemented lens in the second lens group, and v24≤24.

45. The zoom lens according to claim 40, wherein
the first lens group includes in order from the object side, a cemented lens of a negative lens and a positive lens, and a positive meniscus lens having a convex surface directed toward the object side, and
the zoom lens satisfies the following conditional expression (306)

$$-0.5 < R13R/R21F < 1.2 \tag{306}$$

where,
R13R denotes a paraxial radius of curvature of a surface nearest to the image side of the first lens group, and
R21F denotes a paraxial radius of curvature of a surface nearest to the object side of the second lens group.

46. The zoom lens according to claim 40, wherein
the first lens group includes in order from the object side, a cemented lens of a negative lens and a positive lens, and a positive meniscus lens having a convex surface directed toward the object side, and
the zoom lens satisfies the following conditional expression (307)

$$-1.6 < (R11F+R12R)/(R11F-R12R) < 0.6 \tag{307}$$

where,
R11F denotes a paraxial radius curvature of a surface nearest to the object side of the cemented lens in the first lens group, and
R12R denotes a paraxial radius of curvature of a surface nearest to the image side of the cemented lens in the first lens group.

47. The zoom lens according to claim 40, wherein the zoom lens satisfies the following conditional expression (308)

$$9 < f1/fW < 18 \tag{308}$$

where,
f1 denotes a focal length of the first lens group, and
fW denotes the focal length of the overall zoom lens system at the wide angle end, and is the focal length at the time of infinite object point focusing.

48. The zoom lens according to claim 40, wherein
the fourth lens group includes in order from the object side, a lens component having a positive refractive power, and a lens component having a negative refractive power, and
the zoom lens satisfies the following conditional expression (309)

$$-0.3 < (R42F-R42R)/(R42F+R42R) < 0.6 \tag{309}$$

where,
R42F denotes a paraxial radius of curvature of a surface nearest to the object side of the lens component having a negative refractive power in the fourth lens group,
R42R denotes a paraxial radius of curvature of a surface nearest to an image side of the lens component having a negative refractive power in the fourth lens group, and Each of lens components is one of a single lens and a cemented lens, and has two optical surfaces which are in contact with air.

49. The zoom lens according to claim 40, wherein
the lens component having a negative refractive power in the fourth lens group is a cemented lens, and
the cemented lens in the fourth lens group includes in order from the object side, a single lens having a positive refractive power, and a single lens having a negative refractive power, and
the zoom lens satisfies the following conditional expression (310)

$$-0.5 < (R422F+R422R)/(R422F-R422R) < 1.2 \tag{310}$$

where,
R422F denotes a paraxial radius of curvature of a surface nearest to the object side of the single lens having a negative refractive power in the fourth lens group, and
R422R denotes a paraxial radius of curvature of a surface nearest to an image side of the single lens having a negative refractive power in the fourth lens group.

50. The zoom lens according to claim 49, wherein
the lens component having a positive refractive power in the fourth lens group is a single lens, and
the zoom lens satisfies the following conditional expression (311)

$$-0.1 < (R41F+R41R)/(R41F-R41R) < 0.5 \tag{311}$$

where,
R41F denotes a paraxial radius of curvature of a surface nearest to the object side of the lens component having a positive refractive power in the fourth lens group, and
R41R denotes a paraxial radius of curvature of a surface nearest to the image side of the lens component having a positive refractive power in the fourth lens group.

51. The zoom lens according to one of claim 40, wherein
the third lens group includes in order from the object side, two lens components namely, a lens component having a positive refractive power and a lens component having a negative refractive power, and
the zoom lens satisfies the following conditional expression (312)

$$0.1 < (R32F-R32R)/(R32F+R32R) < 5.0 \tag{312}$$

where,
R32F denotes a paraxial radius of curvature of a surface nearest to the object side of the lens component having a negative refractive power in the third lens group,
R32R denotes a paraxial radius of curvature of a surface nearest to the image side of the lens component having a negative refractive power in the third lens group, and
each of the lens components is one of a single lens and a cemented lens, and has two optical surfaces which are in contact with air.

52. The zoom lens according to claim 40, wherein the zoom lens satisfies the following conditional expression (313)

$$0.30 < \log(\beta 2T/\beta 2W)/\log \gamma < 0.80 \tag{313}$$

where,
β2W denotes a magnification of the second lens group at the wide angle end,
β2T denotes a magnification of the second lens group at the telephoto end,
fW denotes the focal length of the overall zoom lens system at the wide angle end,
fT denotes the focal length of the overall zoom lens system at the telephoto end, and γ=fT/fW, and
each of the magnification or the focal length is a magnification or a focal length at the time of infinite object point focusing.

53. The zoom lens according to claim 40, wherein the zoom lens satisfies the following conditional expression (314)

$$0.1<|\beta 2W|<0.30 \tag{314}$$

where,
β2W denotes a magnification of the second lens group at the wide angle end, and is a magnification at the time of infinite object point focusing.

54. The zoom lens according to claim 40, wherein the zoom lens satisfies the following conditional expression (315)

$$0.20<\log(\beta 34T/\beta 34W)<0.9\cdot\log\gamma \tag{315}$$

where,
β34W denotes a magnification of a combined system of the third lens group and the fourth lens group at the wide angle end,
β34T denotes a magnification of the combined system of the third lens group and the fourth lens group at the telephoto end,
fW denotes a focal length of the overall zoom lens system at the wide angle end,
fT denotes a focal length of the overall zoom lens system at the telephoto end, and
γ=fT/fW>7, and
each of the magnification or the focal length is a magnification or a focal length at the time of infinite object point focusing.

55. The zoom lens according to claim 40, wherein the zoom lens satisfies the following conditional expression (316)

$$0.30<|\beta 34W|<0.70 \tag{316}$$

where,
β34W denotes the magnification of the combined system of the third lens group and the fourth lens group at the wide angle end, and is a magnification at the time of infinite object point focusing.

56. An image pickup apparatus comprising:
a zoom lens according to claim 40; and
an image pickup element which is disposed at an image plane of the zoom lens.

57. A zoom lens comprising in order from an object side:
a first lens group having a positive refractive power;
a second lens group having a negative refractive power;
a third lens group having a positive refractive power;
a fourth lens group having a positive refractive power; and
a last lens group having a positive refractive power, wherein
at the time of zooming from a wide angle end to a telephoto end, the first lens group is fixed, the second lens group moves toward a side of an image plane, the third lens group is fixed, the fourth lens group moves, and at the time of focusing, the fourth lens group moves, and
the fourth lens group includes in order from the object side, a lens component having a positive refractive power and a lens component having a negative refractive power, and
the zoom lens satisfies the following conditional expression (401)

$$-0.3<(R42F-R42R)/(R42F+R42R)<0.6 \tag{401}$$

where,
R42F denotes a paraxial radius of curvature of a surface nearest to the object side of the lens component having a negative refractive power in the fourth lens group,
R42R denotes a paraxial radius of curvature of a surface nearest to an image side of the lens component having a negative refractive power in the fourth lens group, and
each of the lens components is one of a single lens and a cemented lens, and has two optical surfaces which are in contact with air.

58. The zoom lens according to claim 57, wherein
the lens component having a negative refractive power in the fourth lens group is a cemented lens, and
the cemented lens in the fourth lens group includes in order from the object side, a single lens having a positive refractive power and a single lens having a negative refractive power, and
the zoom lens satisfies the following conditional expression (402)

$$-0.5<(R422F+R422R)/(R422F-R422R)<1.2 \tag{402}$$

where,
R422F denotes a paraxial radius of curvature of a surface nearest to the object side of the single lens having a negative refractive power in the fourth lens group, and
R422R denotes a paraxial radius of curvature of a surface nearest to an image side of the single lens having a negative refractive power in the fourth lens group.

59. The zoom lens according to claim 57, wherein
the lens component having a positive refractive power in the fourth lens group is a single lens, and
the zoom lens satisfies the following conditional expression (403)

$$-0.1<(R41F+R41R)/(R41F-R41R)<0.5 \tag{403}$$

where,
R41F denotes a paraxial radius of curvature of a surface nearest to the object side of the lens component having a positive refractive power in the fourth lens group, and
R41R denotes a paraxial radius of curvature of a surface nearest to the image side of the lens component having a positive refractive power in the fourth lens group.

60. The zoom lens according to claim 57, wherein the zoom lens satisfies the following conditional expression (404)

$$4.0<f4/fW<10.0 \tag{404}$$

where,
f4 denotes a focal length of the fourth lens group, and
fW denotes the focal length of the overall zoom lens system at the wide angle end, and is a focal length at the time of infinite object point focusing.

61. The zoom lens according to claim 57, wherein the zoom lens satisfies the following conditional expression (405)

$$-2.00<ff4/f4<-1.00 \tag{405}$$

where,
f4 denotes a focal length of the fourth lens group, and
ff4 denotes a distance from an apex of a lens nearest to the object side of the fourth lens group up to a front-side focal position of the fourth lens group.

62. The zoom lens according to claim 57, wherein the zoom lens satisfies the following conditional expression (406)

$$1.10<f34W/f34T<2.00 \tag{406}$$

where,
f34W denotes a focal length of a combined system of the third lens group and the fourth lens group at the wide angle end,
f34T denotes a focal length of the combined system of the third lens group and the fourth lens group at the telephoto end, and each focal length is a focal length at the time of infinite object point focusing.

63. The zoom lens according to claim 57, wherein the zoom lens satisfies the following conditional expression (407)

$$0.20<\log(\beta 34T/\beta 34W)<0.9\cdot\log\gamma \quad (407)$$

where,

β34W denotes a magnification of a combined system of the third lens group and the fourth lens group at the wide angle end, β34T denotes a magnification of the combined system of the third lens group and the fourth lens group at the telephoto end, fW denotes a focal length of the overall zoom lens system at the wide angle end, fT denotes a focal length of the overall zoom lens system at the telephoto end, and γ=fT/fW>7, and each of the magnification or the focal length is a magnification or a focal length at the time of infinite object point focusing.

64. The zoom lens according to claim 57, wherein the third lens group includes in order from the object side, two lens components namely, a lens component having a positive refractive power and a lens component having a negative refractive power, and the zoom lens satisfies the following conditional expression (408)

$$0.1<(R32F-R32R)/(R32F+R32R)<5.0 \quad (408)$$

where,

R32F denotes a paraxial radius of curvature of a surface nearest to the object side of the lens component having a negative refractive power in the third lens group, and R32R denotes a paraxial radius of curvature of a surface nearest to an image side of the lens component having a negative refractive power in the third lens group, and each lens component is one of a single lens and a cemented lens, and has two optical surfaces which are in contact with air.

65. The zoom lens according to claim 57, wherein the zoom lens satisfies the following conditional expression (409)

$$0.30<|\beta 34W|<0.70 \quad (409)$$

where,

β34W denotes the magnification of the combined system of the third lens group and the fourth lens group at the wide angle end, and is a magnification at the time of infinite object point focusing.

66. The zoom lens according to claim 57, wherein the zoom lens satisfies the following conditional expression (410)

$$0.70<|\beta FW|<0.98 \quad (410)$$

where,

βFW denotes a magnification of the last lens group at the wide angle end, and is a magnification at the time of infinite object point focusing.

67. The zoom lens according to claim 57, wherein the zoom lens satisfies the following conditional expression (411)

$$-0.18<f2/f1<-0.06 \quad (411)$$

where, f1 denotes a focal length of the first lens group, and f2 denotes a focal length of the second lens group.

68. The zoom lens according to claim 57, wherein the zoom lens satisfies the following conditional expression (412)

$$9<f1/fW<18 \quad (412)$$

where, f1 denotes a focal length of the first lens group, and fW denotes the focal length of the overall zoom lens system at the wide angle end, and is the focal length at the time of infinite object point focusing.

69. The zoom lens according to claim 57, wherein the zoom lens satisfies the following conditional expression (413)

$$0.30<\log(\beta 2T/\beta 2W)/\log\gamma<0.80 \quad (413)$$

where,

β2W denotes a magnification of the second lens group at the wide angle end,

β2T denotes a magnification of the second lens group at the telephoto end, fW denotes the focal length of the overall zoom lens system at the wide angle end, fT denotes the focal length of the overall zoom lens system at the telephoto end, and γ=fT/fW, and each of the magnification or the focal length is a magnification or a focal length at the time of infinite object point focusing.

70. The zoom lens according to claim 57, wherein the zoom lens satisfies the following conditional expression (414)

$$0.1<|\beta 2W|<0.30 \quad (414)$$

where,

β2W denotes a magnification of the second lens group at the wide angle end, and is a magnification at the time of infinite object point focusing.

71. The zoom lens according to claim 57, wherein the zoom lens satisfies the following conditional expression (415)

$$-0.5<fW/f123T<0.10 \quad (415)$$

where, fW denotes the focal length of the overall zoom lens system at the wide angle end, f123T denotes a focal length of a combined system from the first lens group up to the third lens group at the telephoto end, and each of fW and f123T is a focal length at the time of infinite object focusing.

72. An image pickup apparatus comprising:

a zoom lens according to claim 57; and an image pickup element which is disposed at an image plane of the zoom lens.

* * * * *

UNITED STATES PATENT AND TRADEMARK OFFICE
CERTIFICATE OF CORRECTION

PATENT NO. : 8,730,587 B2  
APPLICATION NO. : 13/488579  
DATED : May 20, 2014  
INVENTOR(S) : Ota et al.

Page 1 of 1

It is certified that error appears in the above-identified patent and that said Letters Patent is hereby corrected as shown below:

In the Specification

Column 2, line 36, change "(β34W)" to "β34W)";
Column 15, line 62, change "2T" to "β2T";
Column 17, line 49, change "(β34W)" to "β34W)";
Column 22, line 5, change "(205')" to "(205")";
Column 31, line 33, change "|f21" to "|f21|";
Column 57, line 30, change "/" to "]";
Column 57, lines 36-37, change "10⁻n" to "10⁻ⁿ"; and In the Claims Column 77, line 27, in claim 34, eq. (214), change "0<" to "4.0<".

Signed and Sealed this  
Eighteenth Day of November, 2014

Michelle K. Lee  
*Deputy Director of the United States Patent and Trademark Office*